US012719744B2

(12) United States Patent
Smith et al.

(10) Patent No.: US 12,719,744 B2
(45) Date of Patent: Aug. 25, 2026

(54) METHODS, SYSTEMS, ARTICLES OF MANUFACTURE AND APPARATUS TO MANAGE A SELF-ADAPTIVE HETEROGENEOUS EMERGENCY NETWORK (SHEN)

(71) Applicant: Intel Corporation, Santa Clara, CA (US)

(72) Inventors: Ned M. Smith, Beaverton, OR (US); Francesc Guim Bernat, Barcelona (ES); Satish Jha, Portland, OR (US); Vesh Raj Sharma Banjade, Portland, OR (US); Arvind Merwaday, Hillsboro, OR (US); S M Iftekharul Alam, Hillsboro, OR (US); Christian Maciocco, Portland, OR (US); Kshitij Arun Doshi, Tempe, AZ (US); Wei Mao, San Jose, CA (US); Rath Vannithamby, Portland, OR (US); Srikathyayani Srikanteswara, Portland, OR (US); Yi Zhang, San Jose, CA (US); Hao Feng, Hillsboro, OR (US); Nageen Himayat, Fremont, CA (US); Hosein Nikopour, San Jose, CA (US); Liuyang Yang, Vancouver, WA (US); Kathiravetpillai Sivanesan, Portland, OR (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,987

(22) Filed: Sep. 30, 2022

(65) Prior Publication Data

US 2023/0022409 A1 Jan. 26, 2023

(51) Int. Cl.
*H04L 41/0668* (2022.01)
*G06F 11/20* (2006.01)

(52) U.S. Cl.
CPC ...... *H04L 41/0668* (2013.01); *G06F 11/2025* (2013.01); *G06F 2201/85* (2013.01)

(58) Field of Classification Search
CPC .... G06F 11/2025; G06F 21/44; G06F 21/445; G06F 21/45; G06F 21/57; H04L 41/0654; H04L 41/0668; H04L 41/12; H04L 69/40
See application file for complete search history.

(56) References Cited

U.S. PATENT DOCUMENTS

| | | | | |
|---|---|---|---|---|
| 10,715,643 | B2 * | 7/2020 | Wagmann | G06F 11/1482 |
| 2003/0233551 | A1 * | 12/2003 | Kouznetsov | G06F 16/1837 707/E17.119 |
| 2019/0349733 | A1 * | 11/2019 | Nolan | H04L 45/20 |

OTHER PUBLICATIONS

Pierre Fraigniaud et al., "Local Conflict Coloring," Foundations of Computer Science (FOCS), IEEE 57th Annual Symposium, 2016, 23 Pages.

(Continued)

*Primary Examiner* — Michael Maskulinski
(74) *Attorney, Agent, or Firm* — Hanley, Flight & Zimmerman, LLC

(57) ABSTRACT

Methods, apparatus, systems, and articles of manufacture are disclosed to manage a self-adaptive heterogeneous emergency network. An example apparatus to establish recovery nodes includes failure detection circuitry to determine a node initiated a reset procedure, override circuitry to suppress a native recovery procedure of the node, formation circuitry to initiate a heterogeneous recovery procedure, and trust circuitry to measure a root of trust of the node. Further, the example apparatus instantiates the formation circuitry (Continued)

further to broadcast heterogeneous recovery packets, and activate listener ports for responses to the heterogeneous recovery packets.

25 Claims, 37 Drawing Sheets

(56) References Cited

OTHER PUBLICATIONS

Alessandro Panconesi, et al., "Some Simple Distributed Algorithms for Sparse Networks," Distributed Computing, vol. 14, Issue 2, Apr. 1, 2001, 4 Pages.
Leonid Barenboim et al., "Distributed graph coloring: Fundamentals and recent developments," Synthesis Lectures on Distributed Computing Theory, 2013, 160 Pages.

* cited by examiner

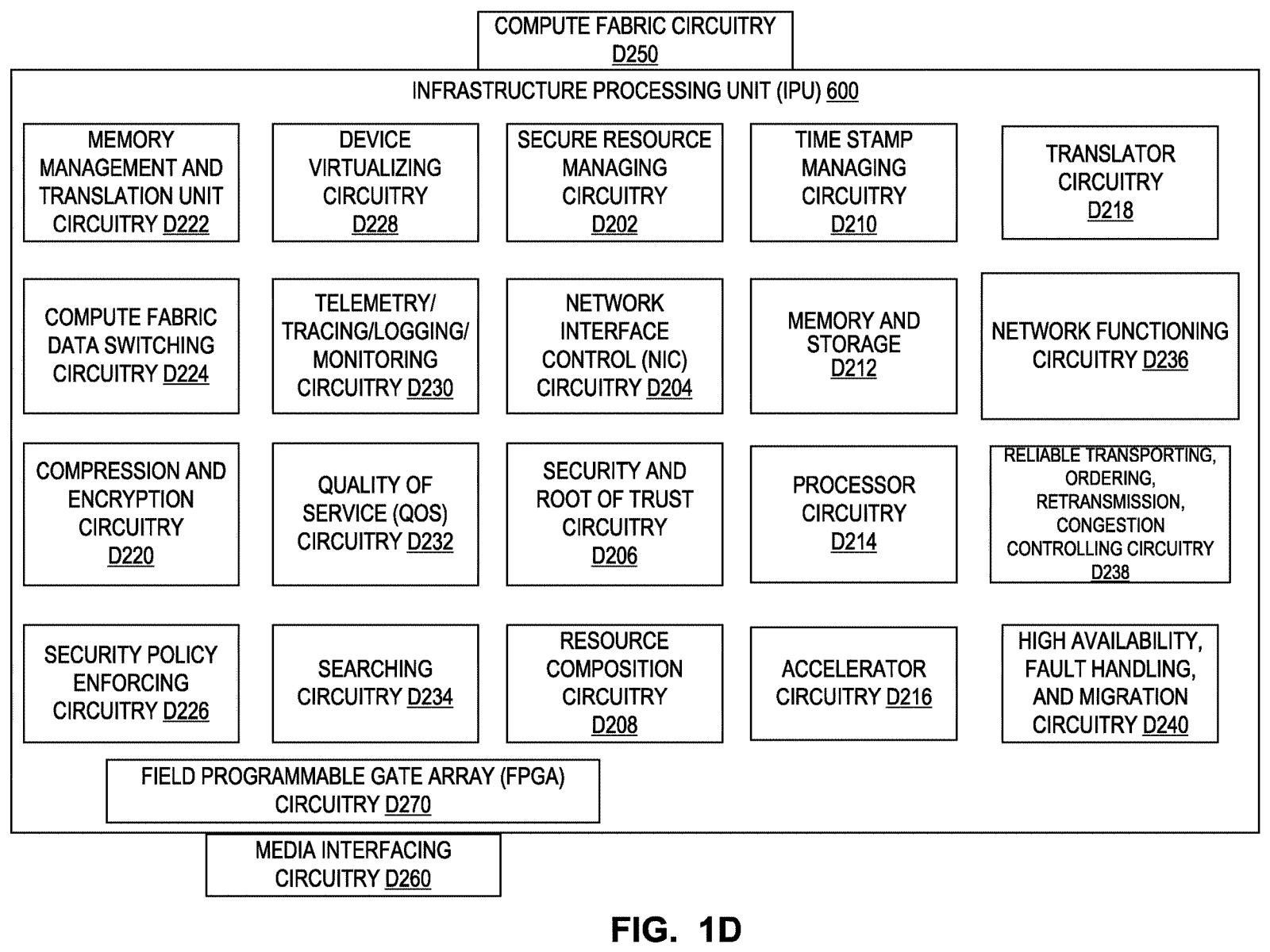

COMPUTE FABRIC CIRCUITRY D250

INFRASTRUCTURE PROCESSING UNIT (IPU) 600

MEMORY MANAGEMENT AND TRANSLATION UNIT CIRCUITRY D222

DEVICE VIRTUALIZING CIRCUITRY D228

SECURE RESOURCE MANAGING CIRCUITRY D202

TIME STAMP MANAGING CIRCUITRY D210

TRANSLATOR CIRCUITRY D218

COMPUTE FABRIC DATA SWITCHING CIRCUITRY D224

TELEMETRY/ TRACING/LOGGING/ MONITORING CIRCUITRY D230

NETWORK INTERFACE CONTROL (NIC) CIRCUITRY D204

MEMORY AND STORAGE D212

NETWORK FUNCTIONING CIRCUITRY D236

COMPRESSION AND ENCRYPTION CIRCUITRY D220

QUALITY OF SERVICE (QOS) CIRCUITRY D232

SECURITY AND ROOT OF TRUST CIRCUITRY D206

PROCESSOR CIRCUITRY D214

RELIABLE TRANSPORTING, ORDERING, RETRANSMISSION, CONGESTION CONTROLLING CIRCUITRY D238

SECURITY POLICY ENFORCING CIRCUITRY D226

SEARCHING CIRCUITRY D234

RESOURCE COMPOSITION CIRCUITRY D208

ACCELERATOR CIRCUITRY D216

HIGH AVAILABILITY, FAULT HANDLING, AND MIGRATION CIRCUITRY D240

FIELD PROGRAMMABLE GATE ARRAY (FPGA) CIRCUITRY D270

MEDIA INTERFACING CIRCUITRY D260

FIG. 1D

550
SENDER
554
APPLICATION
558
PAYLOAD PACKETS AND APP CONTROL MESSAGES
CONVERGENCE LAYER
590
SHEN SITUATION ANALYSIS CIRCUITRY
206
RAT Eg: 5G
552
562
PAYLOAD PACKETS AND RAT CONTROL MESSAGES
RECEIVER
556
APPLICATION
560
PAYLOAD PACKETS
CONVERGENCE LAYER
RAT Eg: 5G
552
562
552

770

METHODS, SYSTEMS, ARTICLES OF MANUFACTURE AND APPARATUS TO MANAGE A SELF-ADAPTIVE HETEROGENEOUS EMERGENCY NETWORK (SHEN)

FIELD OF THE DISCLOSURE

This disclosure relates generally to catastrophic network failures and, more particularly, to methods, systems, articles of manufacture and apparatus to manage a self-adaptive heterogeneous emergency network (SHEN).

BACKGROUND

In recent years, greater attention has been placed on fault events, attack events, failure events and/or outage events of networks. Such fault, attack, failure, outage (FAFO) events may coincide with emergencies and/or such FAFO events may be particularly problematic for emergency and/or high priority networks in which such events may cause further devastating results. In some examples, emergency networks are associated with rescue organizations (e.g., fire departments, police departments, etc.) and/or high priority networks (e.g., remote robotic control for surgical procedures).

BRIEF DESCRIPTION OF THE DRAWINGS

FIG. 1D is a schematic diagram of an example infrastructure processing unit (IPU).

In general, the same reference numbers will be used throughout the drawing(s) and accompanying written description to refer to the same or like parts. The figures are not to scale.

Figure 1A:
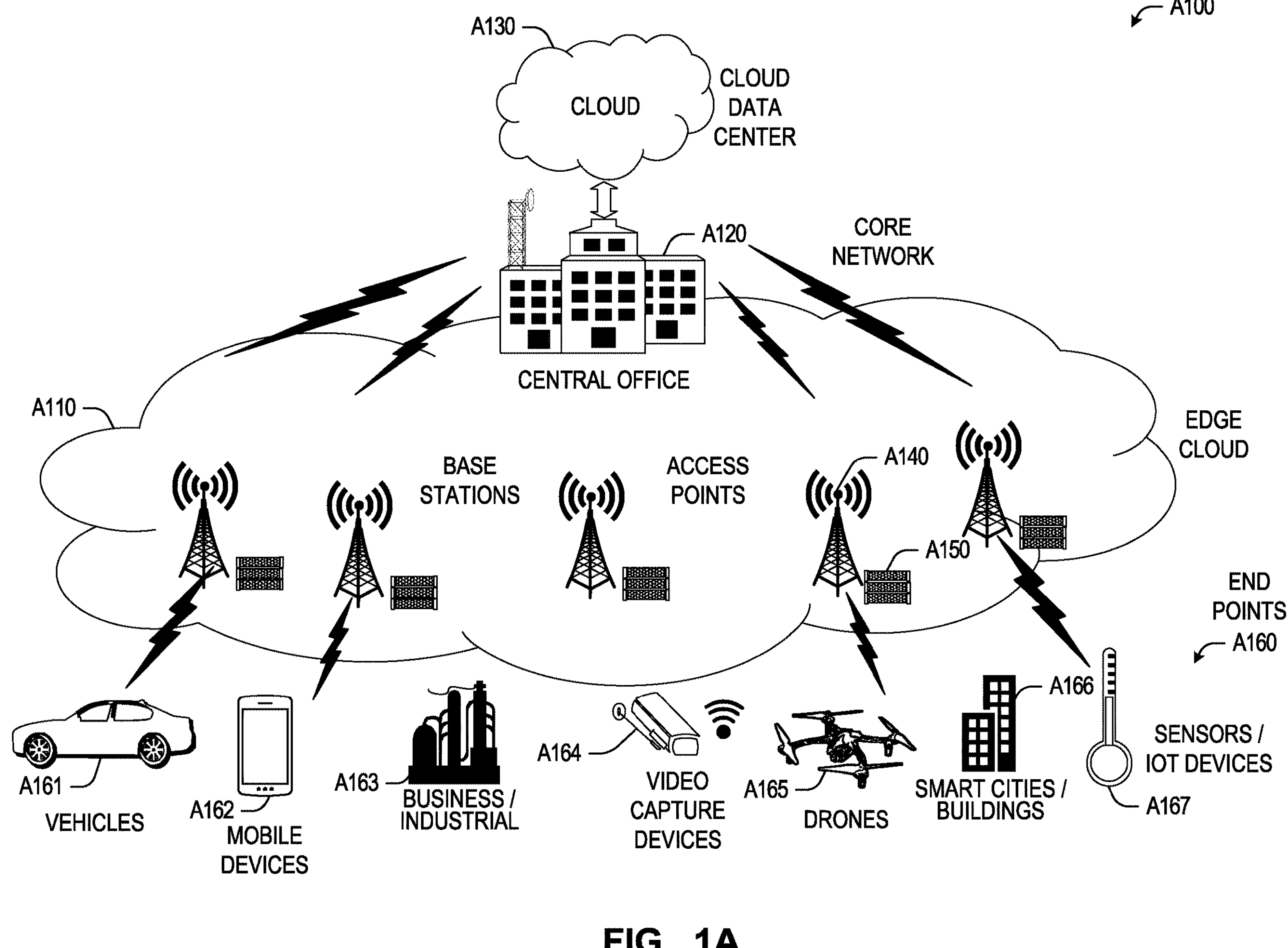
FIG. 1A illustrates an overview of an Edge cloud configuration for Edge computing.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Resiliency in emergency networks (e.g., Amber Alert networks, E-911 networks, Tsunami warning networks, reserved wireless spectrum networks, fault-tolerant systems, etc.) is a primary concern, particularly in dynamically evolving post-disaster recovery efforts (e.g., after fault, attack, failure, outage (FAFO) events). During such recovery scenarios, efforts to establish network functionality require resiliency and security in an autonomous manner. Recovery networks, when established by examples disclosed herein, may take advantage of any available resources available. This includes re-purposing network nodes (e.g., 5G/NextG network nodes) for tasks outside the scope of what they were originally intended to perform.

Traditional post-FAFO networks are typically dysfunctional with limited communications bandwidth, limited compute capacity, limited resources and/or limited power (e.g., due to power grid failure). Additionally, because networks typically include heterogeneous nodes from any number of different manufacturers, recovery protocols are not coordinated from node to node. Such disparity in network node types and/or network node protocols typically causes further network recovery uncertainty as these individual nodes attempt to implement their own recovery procedures, which results in further dynamic changes as these devices start coming back online.

Examples disclosed herein implement self-adaptive heterogeneous emergency network (SHEN) techniques, structure, resources and/or algorithms to exploit any number of available communication technologies (e.g., available 5G/NextG base-stations, cellular, WiFi, Satellite, device-to-device vehicular networks, Edge computing networks/nodes, unmanned aerial vehicles, Internet of Things (IoT) networks/devices, etc.). Examples disclosed herein proactively establish SHEN resources in anticipation of FAFO events, such that SHEN resources and/or techniques are initiated in response to detected failures within a SHEN-capable network.

Examples disclosed herein include different types of SHEN resource administration. An example SHEN technique includes intelligent/adaptive discovery (IAD) techniques, structure, resources and/or algorithms to discover neighboring network resources over any available communication medium (e.g., WiFi, cellular, satellite, optical, etc.), which ping and/or otherwise alert neighboring nodes to switch to a SHEN mode of operation (if not already switched). IAD examples disclosed herein, and as discussed in further detail below, reconstruct routing tables from nearest-neighbor discovery, and route emergency traffic based on emergency-mode prioritization techniques while adjusting discovery hop count instructions based on current network conditions, thereby avoiding further network congestion.

Another example SHEN technique disclosed in further detail below includes critical information exchange protocol (CIEP) techniques to form ad hoc networks from available nodes. Generally speaking, example CIEP resources mitigate potential interference across different node communication links, which may otherwise attempt to communicate at the same time as peer nodes. In some examples, SHEN techniques/resources disclosed herein leverage redundant linear packet coding techniques to balance network redundancy efforts with network resiliency goals.

Another example SHEN technique disclosed in further detail below includes situation-aware selective repetition (SSR) techniques to identify/discover available redundancies that improve a degree of network performance reliability in view of FAFO events and/or post-FAFO recovery situations where network behaviors continue to be dynamic.

Edge Computing

FIG. 1A is a block diagram A100 showing an overview of a configuration for Edge computing, which includes a layer of processing referred to in many of the following examples as an "Edge cloud". As shown, the Edge cloud A110 is co-located at an Edge location, such as an access point or base station A140, a local processing hub A150, or a central office A120, and thus may include multiple entities, devices, and equipment instances. The Edge cloud A110 is located much closer to the endpoint (consumer and producer) data sources A160 (e.g., autonomous vehicles A161, user equipment A162, business and industrial equipment A163, video capture devices A164, drones A165, smart cities and building devices A166, sensors and IoT devices A167, etc.) than the cloud data center A130. Compute, memory, and storage resources which are offered at the edges in the Edge cloud A110 are critical to providing ultra-low latency response times for services and functions used by the endpoint data sources A160 as well as reduce network backhaul traffic from the Edge cloud A110 toward cloud data center A130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 1B:
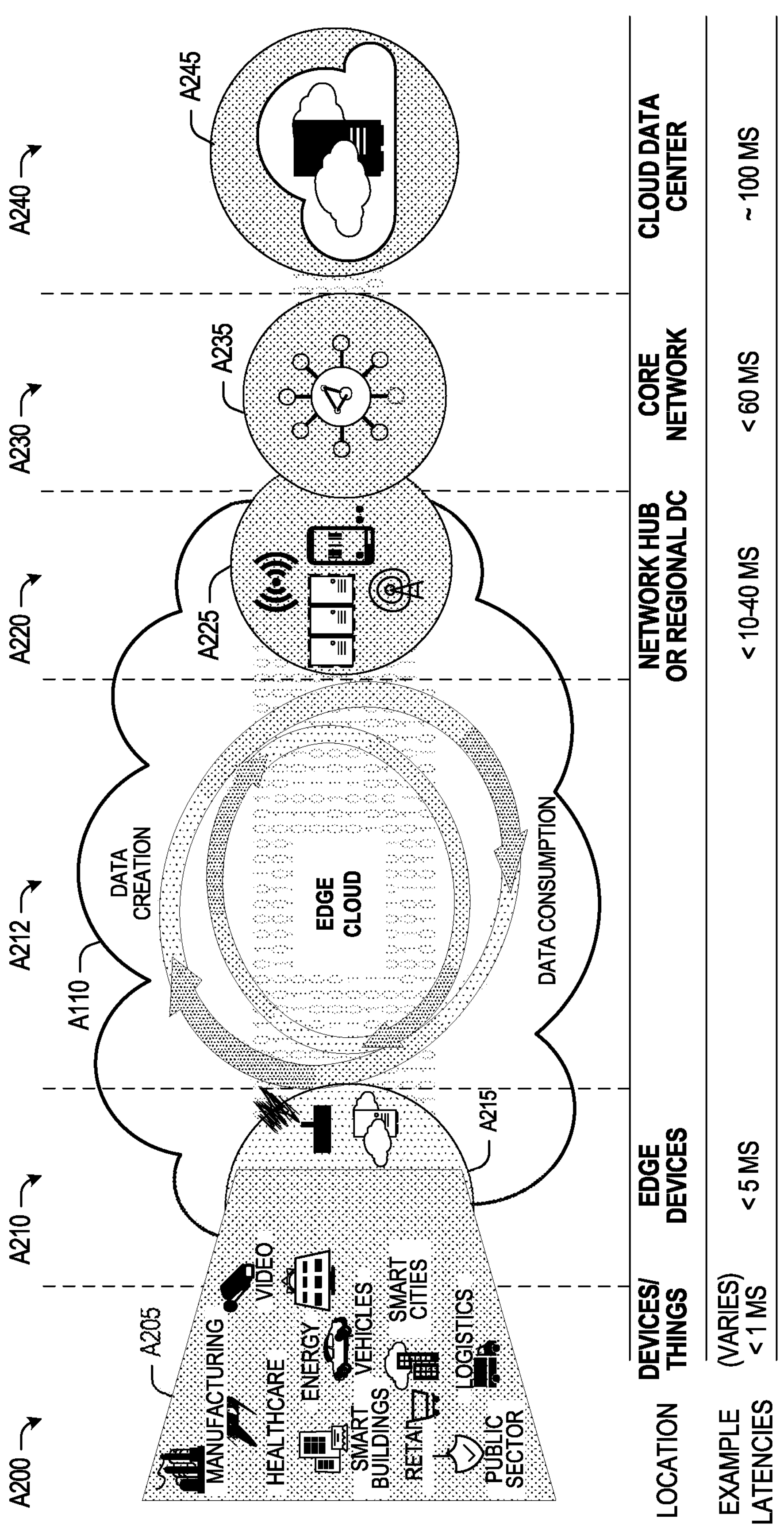
FIG. 1B illustrates operational layers among endpoints, an Edge cloud, and cloud computing environments.

FIG. 1B illustrates operational layers among endpoints, an Edge cloud, and cloud computing environments. Specifically, FIG. 1B depicts examples of computational use cases A205, utilizing the Edge cloud A110 among multiple illustrative layers of network computing. The layers begin at an endpoint (devices and things) layer A200, which accesses the Edge cloud A110 to conduct data creation, analysis, and data consumption activities. The Edge cloud A110 may span multiple network layers, such as an Edge devices layer A210 having gateways, on-premise servers, or network equipment (nodes A215) located in physically proximate Edge systems; a network access layer A220, encompassing base stations, radio processing units, network hubs, regional data centers (DC), or local network equipment (equipment A225); and any equipment, devices, or nodes located therebetween (in layer A212, not illustrated in detail). The network communications within the Edge cloud A110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer A200, under 5 ms at the Edge devices layer A210, to even between 10 to 40 ms when communicating with nodes at the network access layer A220. Beyond the Edge cloud A110 are core network A230 and cloud data center A240 layers, each with increasing latency (e.g., between 50-60 ms at the core network layer A230, to 100 or more ms at the cloud data center layer). As a result, operations at a core network data center A235 or a cloud data center A245, with latencies of at least 50 to 100 ms or more, will not be able to accomplish many time-critical functions of the use cases A205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center A235 or a cloud data center A245, a central office or content data network may be considered as being located within a "near Edge" layer ("near" to the cloud, having high latency values when communicating with the devices and endpoints of the use cases A205), whereas an access point, base station, on-premise server, or network gateway may be considered as located within a "far Edge" layer ("far" from the cloud, having low latency values when communicating with the devices and endpoints of the use cases A205). It will be understood that other categorizations of a particular network layer as constituting a "close", "local", "near", "middle", or "far" Edge may be based on latency, distance, number of network hops, or other measurable characteristics, as measured from a source in any of the network layers A200-A240.

The various use cases A205 may access resources under usage pressure from incoming streams, due to multiple services utilizing the Edge cloud. To achieve results with low latency, the services executed within the Edge cloud A110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud A110 may provide the ability to serve and respond to multiple applications of the use cases A205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud A110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud A110 (network layers A200-A240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud A110.

As such, the Edge cloud A110 is formed from network components and functional features operated by and within Edge gateway nodes, Edge aggregation nodes, or other Edge compute nodes among network layers A210-A230. The Edge cloud A110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud A110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud A110 may be servers, multi-tenant servers, appliance computing devices, and/or any other type of computing devices. For example, the Edge cloud A110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. DIB. The Edge cloud A110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 1C:
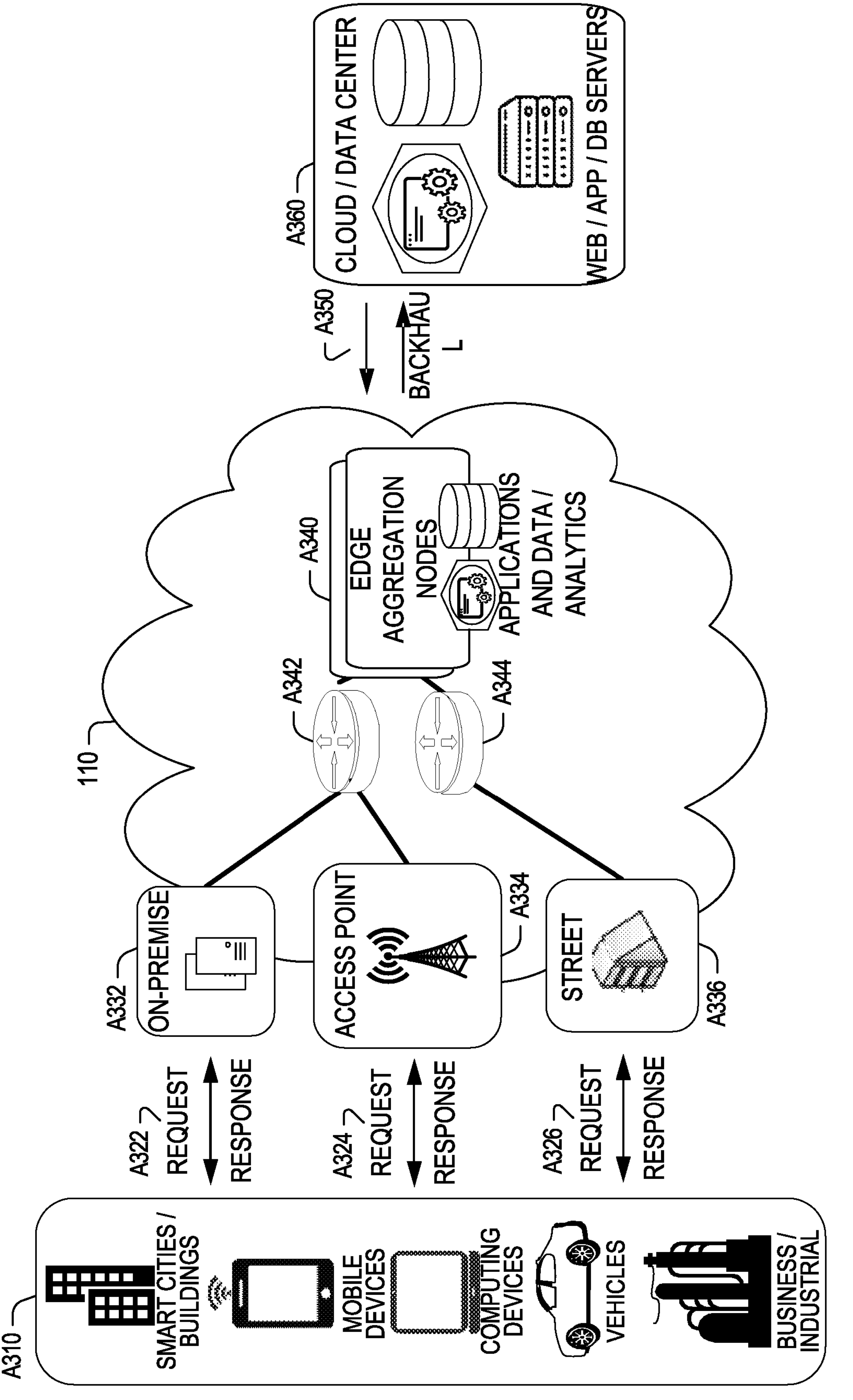
FIG. 1C illustrates an example approach for networking and services in an Edge computing system.

In FIG. 1C, various client endpoints A310 (in the form of mobile devices, computers, autonomous vehicles, business computing equipment, industrial processing equipment) exchange requests and responses that are specific to the type of endpoint network aggregation. For instance, client endpoints A310 may obtain network access via a wired broadband network, by exchanging requests and responses A322 through an on-premise network system A332. Some client endpoints A310, such as mobile computing devices, may obtain network access via a wireless broadband network, by exchanging requests and responses A324 through an access point (e.g., a cellular network tower) A334. Some client endpoints A310, such as autonomous vehicles may obtain network access for requests and responses A326 via a wireless vehicular network through a street-located network system A336. However, regardless of the type of network access, the TSP may deploy aggregation points A342, A344 within the Edge cloud A110 to aggregate traffic and requests. Thus, within the Edge cloud A110, the TSP may deploy various compute and storage resources, such as at Edge aggregation nodes A340, to provide requested content. The Edge aggregation nodes A340 and other systems of the Edge cloud A110 are connected to a cloud or data center A360, which uses a backhaul network A350 to fulfill higher-latency requests from a cloud/data center for websites, applications, database servers, etc. Additional or consolidated instances of the Edge aggregation nodes A340 and the aggregation points A342, A344, including those deployed on a single server framework, may also be present within the Edge cloud A110 or other areas of the TSP infrastructure.

Infrastructure Processing Unit (IPU)

FIG. 1D depicts an example of an infrastructure processing unit (IPU). Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 1D, the IPU D200 includes or otherwise accesses secure resource managing circuitry D202, network interface controller (NIC) circuitry D204, security and root of trust circuitry D206, resource composition circuitry D208, time stamp managing circuitry D210, memory and storage D212, processing circuitry D214, accelerator circuitry D216, and/or translator circuitry D218. Any number and/or combination of other structure(s) can be used such as but not limited to compression and encryption circuitry D220, memory management and translation unit circuitry D222, compute fabric data switching circuitry D224, security policy enforcing circuitry D226, device virtualizing circuitry D228, telemetry, tracing, logging and monitoring circuitry D230, quality of service circuitry D232, searching circuitry D234, network functioning circuitry (e.g., routing, firewall, load balancing, network address translating (NAT), etc.) D236, reliable transporting, ordering, retransmission, congestion controlling circuitry D238, and high availability, fault handling and migration circuitry D240 shown in FIG. 1D. Different examples can use one or more structures (components) of the example IPU D200 together or separately. For example, compression and encryption circuitry D220 can be used as a separate service or chained as part of a data flow with vSwitch and packet encryption.

In some examples, IPU D200 includes a field programmable gate array (FPGA) D270 structured to receive commands from an CPU, XPU, or application via an API and perform commands/tasks on behalf of the CPU, including workload management and offload or accelerator operations. The illustrated example of FIG. 1D may include any number of FPGAs configured and/or otherwise structured to perform any operations of any IPU described herein.

Example compute fabric circuitry D250 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry D260 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU D200, IPU D200 is a root of a system (e.g., rack of servers or data center) and manages compute resources (e.g., CPU, xPU, storage, memory, other IPUs, and so forth) in the IPU D200 and outside of the IPU D200. Different operations of an IPU are described below.

In some examples, the IPU D200 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU D200 is selected to perform a workload, secure resource managing circuitry D202 offloads work to a CPU, xPU, or other device and the IPU D200 accelerates connectivity of distributed runtimes, reduce latency, CPU and increases reliability.

In some examples, secure resource managing circuitry D202 runs a service mesh to decide what resource is to execute workload, and provide for L7 (application layer) and remote procedure call (RPC) traffic to bypass kernel altogether so that a user space application can communicate directly with the example IPU D200 (e.g., IPU D200 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited, to iSCSI, NVMe-OF, or CXL.

In some cases, the example IPU D200 dynamically selects itself to run a given workload (e.g., microservice) within a composable infrastructure including an IPU, xPU, CPU, storage, memory, and other devices in a node.

In some examples, communications transit through media interfacing circuitry D260 of the example IPU D200 through a NIC/smartNIC (for cross node communications) or loopback back to a local service on the same host. Communications through the example media interfacing circuitry D260 of the example IPU D200 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU D200 prioritizes its processing to minimize the stalling of the requesting application. In some examples, the IPU D200 schedules the prioritized message request issuing the event to execute a SQL query database and the example IPU constructs microservices that issue SQL queries and the queries are sent to the appropriate devices or services.

Satellite Connectivity

Figure 1E:
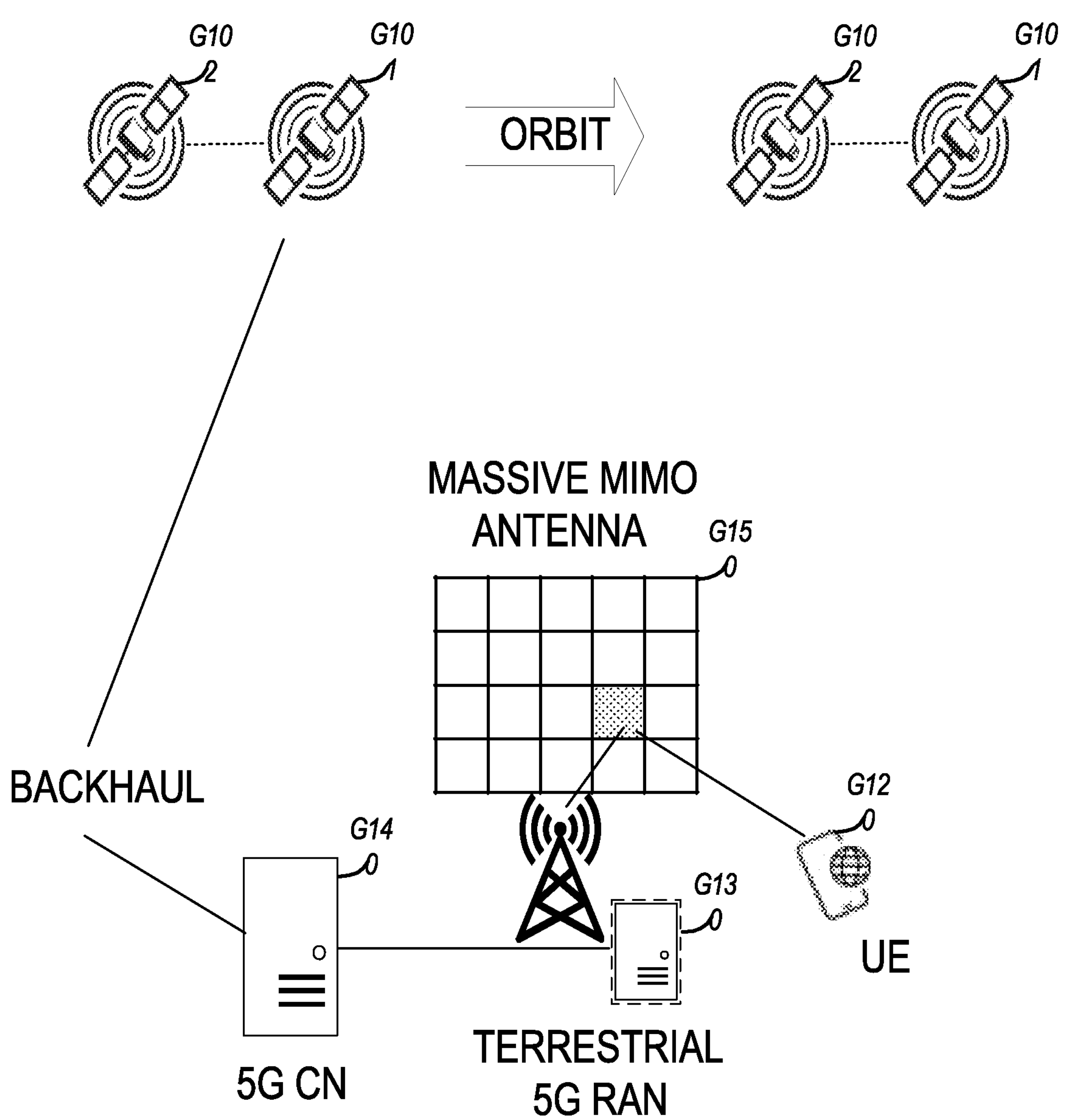
FIG. 1E illustrates network connectivity in non-terrestrial (satellite) and terrestrial (mobile cellular network) settings, according to an example.

FIG. 1E illustrates network connectivity in non-terrestrial (satellite) and terrestrial (mobile cellular network) settings, according to an example. As shown, a satellite constellation may include multiple satellites G101, G102, which are connected to each other and to one or more terrestrial networks. Specifically, the satellite constellation is connected to a backhaul network, which is in turn connected to a 5G core network G140. The 5G core network is used to support 5G communication operations at the satellite network and at a terrestrial 5G radio access network (RAN) G130.

FIG. 1E also depicts the use of the terrestrial 5G RAN G130, to provide radio connectivity to a user equipment (UE) G120 via a massive MIMO antenna G150. It will be understood that a variety of network communication components and units are not depicted in FIG. 1E for purposes of simplicity. With these basic entities in mind, the following techniques describe ways in which terrestrial and satellite networks can be extended for various Edge computing scenarios. Alternatively, the illustrated example of FIG. 1E may be applicable to other cellular technologies (e.g., 6G and the like).

Information Centric Networking (ICN)

Figure 1F:
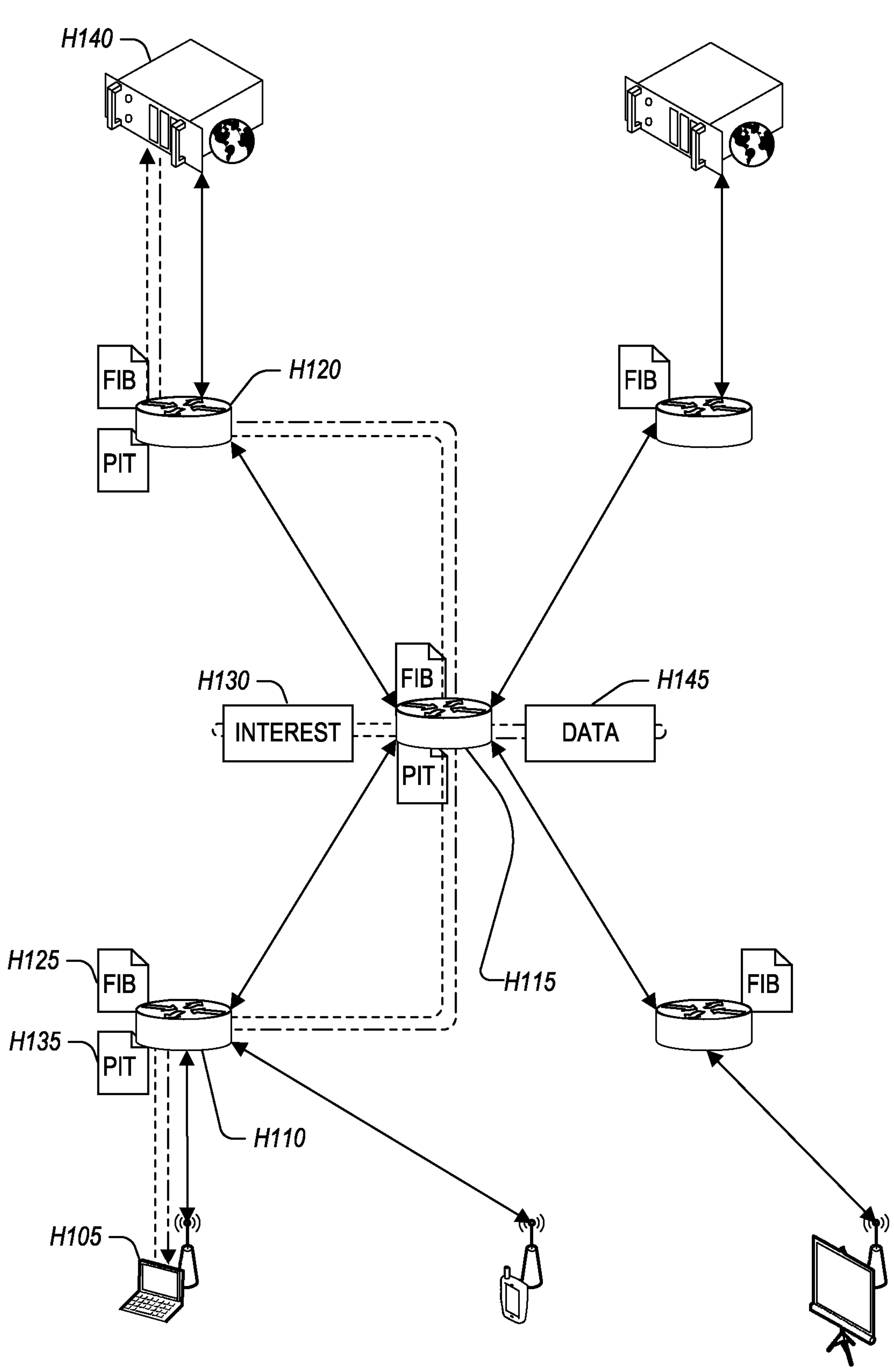
FIG. 1F illustrates an example information centric network (ICN), according to an example.

FIG. 1F illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device H105 (e.g., subscriber) requests named content from the network itself. The content request may be called an interest and transmitted via an interest packet H130. As the interest packet traverses network devices (e.g., network elements, routers, switches, hubs, etc.)—such as network elements H110, H115, and H120-*a* record of the interest is kept, for example, in a pending interest table (PIT) at each network element. Thus, network element H110 maintains an entry in its PIT H135 for the interest packet H130, network element H115 maintains the entry in its PIT, and network element H120 maintains the entry in its PIT.

When a device, such as publisher H140, that has content matching the name in the interest packet H130 is encountered, that device H140 may send a data packet H145 in response to the interest packet H130. Typically, the data packet H145 is tracked back through the network to the source (e.g., device H105) by following the traces of the interest packet H130 left in the network element PITs. Thus, the PIT H135 at each network element establishes a trail back to the subscriber H105 for the data packet H145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest H130 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet H130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest H130 to data cached in the ICN element. Thus, for example, if the data H145 named in the interest H130 is cached in network element H115, then the network element H115 will return the data H145 to the subscriber H105 via the network element H110. However, if the data H145 is not cached at network element H115, the network element H115 routes the interest H130 on (e.g., to network element H120). To facilitate routing, the network elements may use a forwarding information base H125 (FIB) to match named data to an interface (e.g., physical port) for the route. Thus, the FIB H125 operates much like a routing table on a traditional network device.

In an example, additional meta-data may be attached to the interest packet H130, the cached data, or the route (e.g., in the FIB H125), to provide an additional level of matching. For example, the data name may be specified as "www-.somedomain.com or videos or v8675309," but also include a version number- or timestamp, time range, endorsement, etc. In this example, the interest packet H130 may specify the desired name, the version number, or the version range. The matching may then locate routes or cached data matching the name and perform the additional comparison of meta-data or the like to arrive at an ultimate decision as to whether data or a route matches the interest packet H130 for respectively responding to the interest packet H130 with the data packet H145 or forwarding the interest packet H130.

ICN has advantages over host-based networking because the data segments are individually named. This enables aggressive caching throughout the network as a network element may provide a data packet H130 in response to an interest H130 as easily as an original author H140. Accordingly, it is less likely that the same segment of the network will transmit duplicates of the same data requested by different devices.

Fine grained encryption is another feature of many ICN networks. A typical data packet H145 includes a name for the data that matches the name in the interest packet H130. Further, the data packet H145 includes the requested data and may include additional information to filter similarly named data (e.g., by creation time, expiration time, version, etc.). To address malicious entities providing false information under the same name, the data packet H145 may also encrypt its contents with a publisher key or provide a cryptographic hash of the data and the name. Thus, knowing the key (e.g., from a certificate of an expected publisher H140) enables the recipient to ascertain whether the data is from that publisher H140. This technique also facilitates the aggressive caching of the data packets H145 throughout the network because each data packet H145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

SHEN Architecture

Figure 1G:
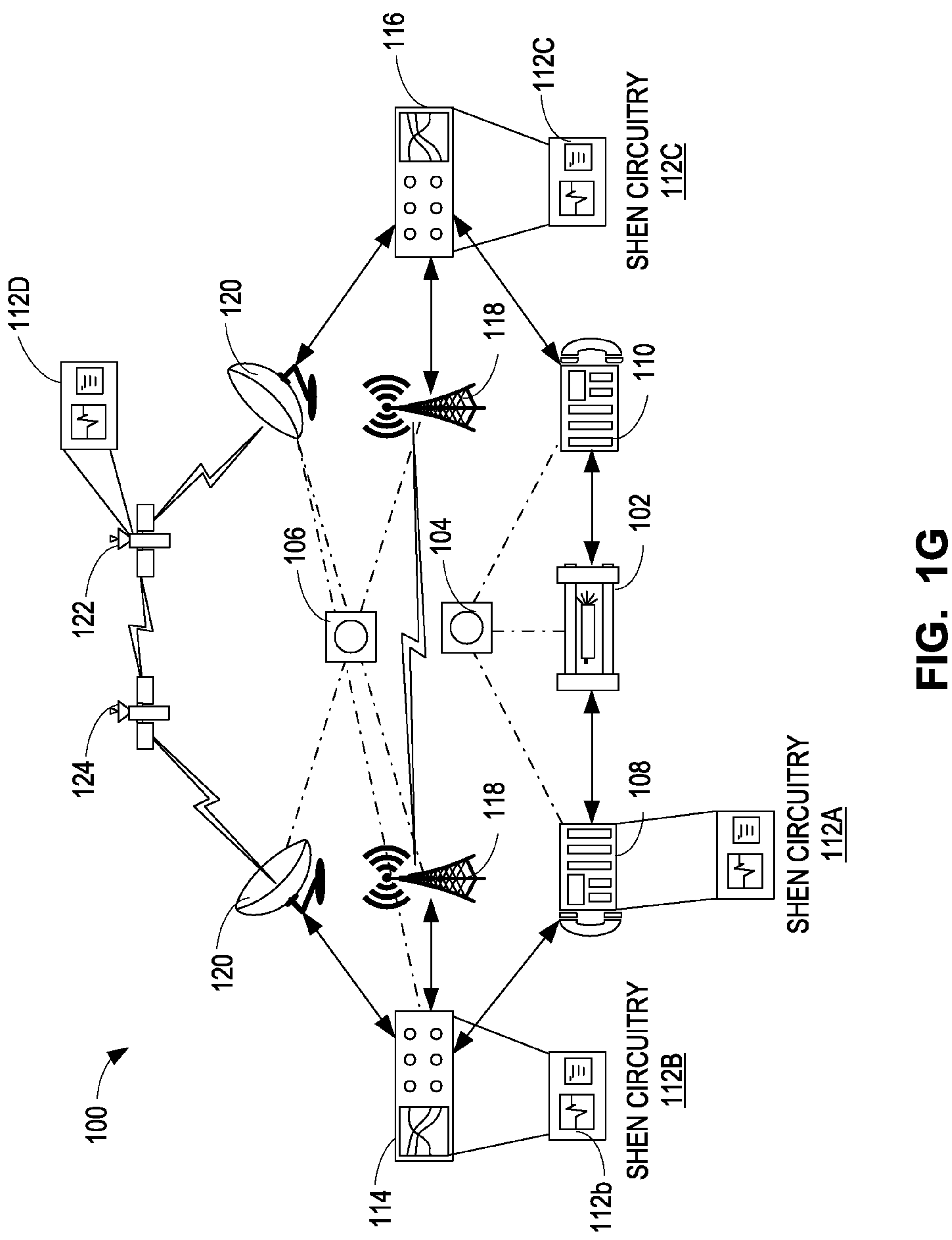
FIG. 1G is a schematic illustration of an example SHEN-enabled network, including SHEN circuitry constructed in accordance with the teachings of this disclosure.

FIG. 1G illustrates an example SHEN-enabled network 100. In the illustrated example of FIG. 1G, the SHEN-enabled network 100 includes 5G/6G resources, but examples disclosed herein are not limited thereto. The example SHEN-enabled network 100 includes an example terrestrial wire-line infrastructure 102, an example terrestrial wireless infrastructure 104 and an example extra-terrestrial wireless infrastructure 106. The example terrestrial wire-line infrastructure 102 includes any type of networking equipment, nodes, servers, cable infrastructure, etc. that is communicatively connected to remote infrastructure, such as a first wire-line node 108 and a second wire-line node 110. The example first wire-line node 108 includes example first SHEN circuitry 112*a* (e.g., the first wire-line node 108 is "SHEN capable"), while the example second wire-line node 110 does not include such SHEN circuitry. The example first wire-line node 108 is communicatively connected to any number and/or type of additional node(s), such as an example third node 114 that, in the illustrated example of FIG. 1G, facilitates services for all of the terrestrial wire-line infrastructure 102, the terrestrial wireless infrastructure 104, and the extra-terrestrial wireless infrastructure 106. Additionally, the example third node 114 is "SHEN capable" by virtue of example third SHEN circuitry 112*b*. An example fourth node 116 is substantially similar to the example third node 114, except that the fourth node 116 facilitates services for other portions of the example SHEN-enabled network 100. Additionally, the example fourth node 116 includes example fourth SHEN circuitry 112*c*.

The example terrestrial wireless infrastructure 104 is communicatively connected to any number of base stations 118, and the example extra-terrestrial wireless infrastructure 106 is communicatively connected to any number of satellite transceiver nodes 120. The example satellite transceiver nodes 120 are communicatively connected to a first satellite 122 and a second satellite 124, but examples are not limited to these two. In the illustrated example of FIG. 1G, the first satellite 122 includes fifth SHEN circuitry 112*d*.

The example SHEN-enabled network 100 instantiates SHEN formation, as described in further detail below, in response to detecting any one of the network nodes exhibiting a particular degree or type of failure. In some examples, relatively minor communication interruptions are considered to be a routine occurrence, in which native and/or otherwise default protocols associated with the network node will accommodate resolution of such issues. However, SHEN formation discovers available communication and/or compute nodes, assigns/reassigns roles to these nodes (e.g., an orchestrator node assignment, a relay node assignment, a local compute node assignment, a gateway to cloud node assignment, etc.), defines telemetry metrics to allow dynamic assessment of communication/compute capacities, and adjusts network operation/topology in an effort to recover from FAFO events. In some examples, SHEN formation occurs in response to a FAFO event or an event having performance metrics that satisfy a downtime threshold beyond expectations of nominal/expected operational values. In some examples, a type of failure or reset signal from a node is based on a quantity of available current communication channels as distinguished from a quantity of communication channels that are used during non-failure situations. In some examples, SHEN formation occurs on a scheduled, periodic, aperiodic and/or manual basis to prepare routing tables in the event of a future FAFO event.

In some examples, the SHEN-enabled network 100 constantly establishes one or more redundant networks that are able to take over relatively faster in response to a FAFO event. Any number of such candidate networks and/or alternate backhauls may be proactively established and/or otherwise maintained at a "ready" state, particularly in view of certain network types responsible for relatively important tasks.

While the illustrated example of FIG. 1G includes one SHEN-enabled network 100, examples disclosed herein are not limited thereto. In some examples, two or more SHENs may be created for a variety of reasons, such as a lack of interconnect between particular coverage areas, particular access type (e.g., wireless/wireline, WiFi/cellular) challenges, particular task support priorities (e.g., SHEN for only emergency services, particular task types, etc). As such, any particular node may participate in one or more SHENs, in which some nodes perform assigned tasks in view of dynamic conditions (e.g., nodes can be assigned/re-assigned to facilitate data management, control management, protocol conversion, data adaptation, security merging, traffic management, policy enforcement, etc.).

Figure 2:
FIG. 2 is a block diagram of additional detail corresponding to the example SHEN circuitry of FIG. 1G.

FIG. 2 illustrates additional detail of the example SHEN circuitry 112 of FIG. 1G. While the illustrated example of FIG. 1G includes several instances of the SHEN circuitry (e.g., 112*a*, 112*b*, 112*c* and 112*d*), further references to the example SHEN circuitry will refer to element 112. Generally speaking, the SHEN circuitry 112 may be located in any number of network nodes and cooperatively operate in a distributed manner. In the illustrated example of FIG. 2, the SHEN circuitry 112 includes example SHEN formation circuitry 202, example SHEN discovery circuitry 204, example SHEN situation awareness circuitry 206, and example SHEN exchange protocol circuitry 208. In some examples, particular network nodes that do not have SHEN circuitry 112 may receive, retrieve and/or otherwise obtain SHEN capabilities via an agent, such as a virtual function, a function-as-a-service (FaaS) (e.g., SHEN-as-a-service) that can be downloaded/uploaded as instructions to be executed by node resources (e.g., a node appliance, a node NIC, a node IPU, etc.). For instance, if a cloud service provider (CSP) typically operates as one of the nodes (e.g., a supernode) on a network that is experiencing FAFO events, but the CSP does not include SHEN circuitry 112, then examples disclosed herein enable SHEN functionality via virtualization in the event instructions are obtained by the CSP for installation on one or more hardware components thereon. In some examples, SHEN circuitry 112 may be packaged as software instructions stored on a memory device or hardware appliance that can be conveniently integrated with network nodes that are not initially SHEN-capable, such as by way of a USB dongle or other form factor.

In operation, and as described in further detail below, the example SHEN formation circuitry 202 detects the existence of or the onset of a critical failure within the network in which it operates. Additionally, the example SHEN formation circuitry 202 verifies that the node itself is trusted to implement recovery procedures before broadcasting recovery messages to any available nodes that the node is capable of communicating with. Recovery messages facilitate an ability to identify candidate nodes to help with the recovery effort, and the example SHEN formation circuitry 202 evaluates candidate node capabilities so that workloads can be processed by those nodes that are capable.

In operation, and as described in further detail below, the example SHEN discovery circuitry 204 instantiates IAD techniques described above to discover neighboring network resources. In some examples, the SHEN discovery circuitry 204 considers potential negative effects of discovery hop count values being too high (or low) for current network conditions, thereby avoiding added congestion effects to an already inundated network that is attempting to recover.

In operation, and as described in further detail below, the example SHEN situation analysis circuitry 206 is instantiated (e.g., instantiated by the example SHEN circuitry 112 and or the example SHEN formation circuitry 202) to identify/discover available redundancy opportunities that, if applied, improve network performance reliability during or after FAFO events. For instance, while redundancies may be implemented in any network, the SHEN situation analysis circuitry 206 calculates a cost/benefit (e.g., gain/loss function) based on several parameters, including an importance metric of the network to be recovered, a demand for workloads having a particular priority, and/or a current condition of available neighboring nodes and/or networks. Results of such situational analysis cause networks to operate more efficiently by de-prioritizing particular network types and/or tasks that are not "mission critical" during the recovery efforts. Additionally, results of such situational analysis reduce bandwidth degradation and/or network communication conflicts by removing recovery efforts on less-important tasks that would otherwise consume valuable yet scare resources during a post FAFO event.

In operation, and as described in further detail below, the example SHEN exchange protocol circuitry 208 is instantiated (e.g., instantiated by the example SHEN circuitry 112 and or the example SHEN formation circuitry 202) to form ad hoc networks from available nodes. In particular, the example SHEN exchange protocol circuitry 208 facilitates a manner (protocol) of organizing when particular nodes are permitted to transmit or receive, thereby reducing contention between nodes that would result in lost communication and/or wasted bandwidth caused by node re-transmission efforts when contention events occur.

SHEN Formation

Figure 3:
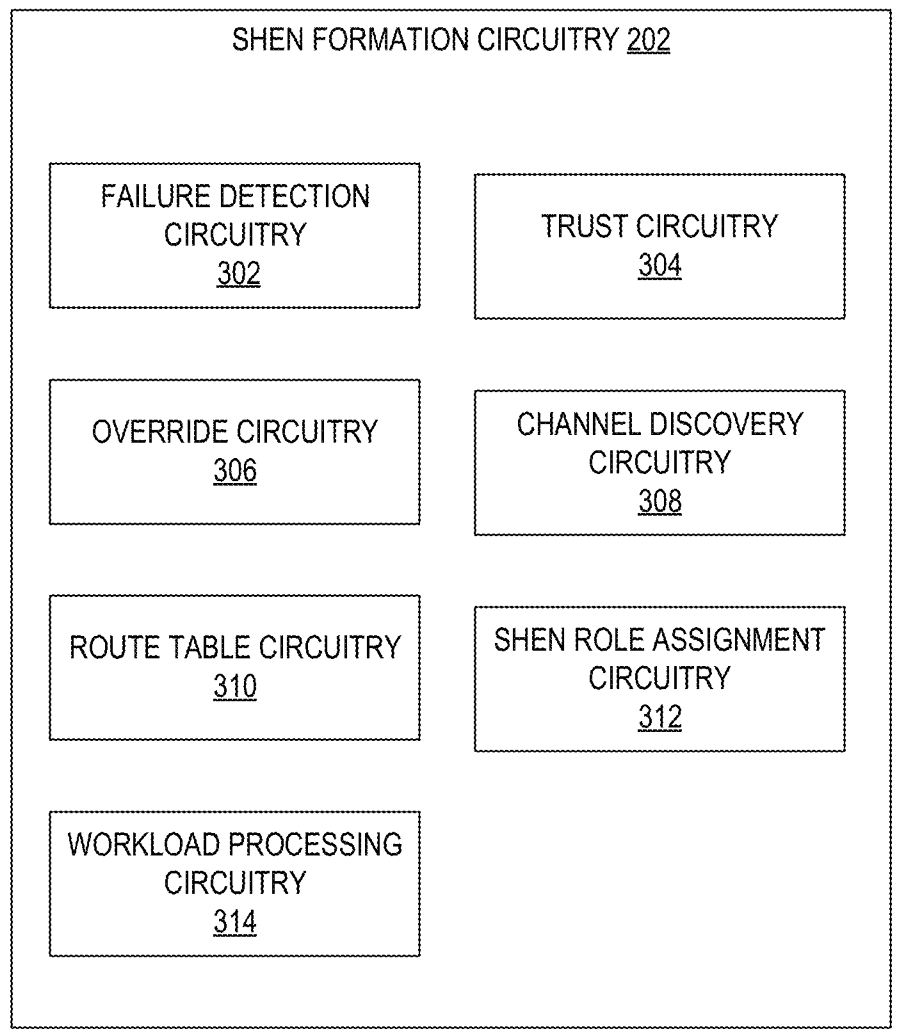
FIG. 3 is a block diagram of additional detail corresponding to example SHEN formation circuitry of FIG. 2.

FIG. 3 illustrates additional detail associated with the SHEN formation circuitry 202 of FIG. 2. In the illustrated example of FIG. 3, the SHEN formation circuitry 202 includes example failure detection circuitry 302, example trust circuitry 304, example override circuitry 306, example channel discovery circuitry 308, example route table circuitry 310, example SHEN role assignment circuitry 312, and example workload processing circuitry 314. In operation, the example failure detection circuitry 302 evaluates a node, such as the node on which the example SHEN circuitry 112 is at least one of installed or otherwise included, for conditions associated with a network failure or a recovery mode. Example circumstances that can cause the node (e.g., the example third node 114) to fail include lightning strikes, power failures, malicious hacking activities, etc. However, some failures are less or more severe than other failures. Examples disclosed herein distinguish, determine and/or otherwise identify a type of failure so that particular types of recovery procedures can be instantiated that will most efficiently bring a failed node back online. For example, in the event a first type of power failure or reset occurs, then native/default node recovery procedures may be the most efficient approach for recovery. In such a first type of power failure, there may not be a need for elevated security scrutiny and/or the power failure may be isolated to a single node (e.g., due to servicing, moving the node from one location to another, etc.). As such, instantiating elevated multi-node recovery procedures is unnecessary. On the other hand, in the event a second type of failure occurs (e.g., a power failure of a particular duration, a node failure in which peer nodes have been unresponsive for a threshold period of time and/or a threshold number of access attempts, etc.), then a more severe failure type has occurred that requires special recovery procedures. Failure to employ and/or otherwise instantiate such special recovery procedures (e.g., SHEN recovery procedures) may cause unnecessary recovery delay due to one or more peer nodes attempting their own recovery procedures without coordination with other peers that may be part of a larger failure condition. Accordingly, in response to identifying a particular type of failure, the SHEN formation circuitry 202 initiates SHEN mode for the affected node in some circumstances or permits default/native recovery procedures in other circumstances.

When such conditions of a severe type of failure are detected by the failure detection circuitry 302, the example trust circuitry 304 measures the node from a root-of-trust to generate an attestation report. In particular, because a cause of the failure is not necessarily known at the time it is detected by the failure detection circuitry 302, examples disclosed herein assume that at least one cause is due to malicious activity. While the occurrence of a failure may cause substantial network problems, such conditions do not justify entering SHEN mode and attempting recovery efforts without first verifying the node has not been compromised, particularly if such failures are caused by malicious actors.

In some examples the node will enter into its own (e.g., native/default) recovery procedure when a failure is detected, in which those native procedures may be architected and/or otherwise designed by the manufacturer of the node. As such, the native recovery procedures operate independently of other nodes that may also be implementing recovery procedures, some of which may conflict with other protocols and cause contention/interference. To reduce and/or otherwise prevent conflicts, the example override circuitry 306 overrides, interrupts and/or otherwise blocks native recovery procedures that may be initiated by the node experiencing the failure when the failure is of a particular type and/or severity. This ensures that recovery efforts occur with other nodes in a manner that is coordinated and secure.

The example channel discovery circuitry 308 determines if at least one network interface can be recovered. In some examples the affected node normally utilizes a wireless network interface, which might be non-functional due to the FAFO event. However, the channel discovery circuitry 308 scans and/or otherwise analyzes the node to determine if an available WiFi, Bluetooth®, Ethernet, 5G or satellite interface, etc., is still active. If so, the channel discovery circuitry 308 broadcasts SHEN packets along any available interface to any available nodes that are connected thereto. The example SHEN packets are sometimes referred to herein as SHEN alive packets or heterogeneous recovery packets that disseminate requests for other nodes to activate a SHEN mode in the event they also include example SHEN circuitry 112. In some examples, the heterogeneous recovery packets include recovery override instructions to be received by any peer nodes that are able to receive communications. In particular, example recovery override instructions embedded into the heterogeneous recovery packets by the SHEN circuitry 112 cause receiving SHEN-capable peers to instantiate a type of reset procedure (or a type of failure response) that bypasses and/or otherwise overrides the native recovery procedures that the peer node might have. In some examples, if a native recovery procedure has already started, examples disclosed herein enable termination, deactivation and/or otherwise disable such native procedures from further operation. As such, the peer nodes no longer need to evaluate a type of failure in the network on their own and can, instead, proceed directly to recovery procedures consistent with SHEN procedures that work in concert to recover from FAFO events.

In the event one or more other nodes successfully receive the SHEN alive packets, the example channel discovery circuitry 308 opens listener ports on the node to receive confirmation that these other nodes might be able to participate in recovery efforts. In some examples, particular ports are opened based on port information embedded in the SHEN alive packets. The example channel discovery circuitry 308 may receive responses from any number of candidate nodes, some of which have SHEN capabilities while others do not. To distinguish SHEN capable nodes from SHEN non-capable nodes, the SHEN alive packets may include a request that any responses provided include particular information to identify such capabilities. Such responses indicate and/or otherwise identify if the peer node supports and/or is otherwise compatible with heterogeneous recovery procedures (e.g., SHEN procedures). In some examples, SHEN non-capable nodes may still be useful for recovery efforts, but caution must be maintained with all candidate node responses to the SHEN alive packet distribution because one or more of the responses may originate from a malicious actor.

While the node that distributed, broadcast and/or otherwise multicast the SHEN alive packets was previously attested to a root of trust, similar assurances of trust must be performed on all candidate nodes responding to the SHEN alive packets. The example trust circuitry 304 attests candidate peers and if trusted, the example route table circuitry 310 adds those peers to a SHEN route table. However, candidate peers that fail attestation procedures are added to a route table containing peer identifiers that are either not trusted or SHEN non-capable. In some examples, when a peer node is determined to be SHEN non-capable and/or otherwise incapable of heterogeneous recovery procedures, the trust circuitry 304 stops, prohibits and/or otherwise discontinues further communication attempts with that node to conserve bandwidth resources for a struggling network that requires recovery. Because the SHEN alive packets are sent by the node to solicit recovery help, other SHEN capable peers are subsequently expected to do the same. In an effort to improve the efficiency of where on an available channel to search for such resources, the route table circuitry 310 broadcasts the routing tables for the benefit of other SHEN capable nodes still operating after the FAFO event. The example route table circuitry 310 generates and broadcasts different types of route (routing) tables including, but not limited to recovery node routing tables to identify particular nodes that support SHEN recovery procedures and non-recovery node routing tables to identify particular nodes that do not support and/or are otherwise incompatible with heterogeneous recovery procedures.

At this point in the illustrated example of FIG. 3, the affected node has been measured (and/or otherwise verified as having an safe trust status) to generate an attestation report, SHEN alive packets have been broadcast and/or otherwise transmitted, trusted candidate SHEN capable nodes have been identified and deemed trustworthy, and routing tables to that effect have been broadcast by the node. The example SHEN role assignment circuitry 312 can now begin assigning roles to the node and/or request that neighboring nodes take on particular roles needed for the recovery effort, which is sometimes referred to herein as orchestration. Roles for nodes during a recovery effort can include, but are not limited to, routing roles for nodes to process network traffic requests, security roles for nodes to facilitate one or more security tasks (e.g., measurement, attestation report generation, trust anchor management for remote node attestation, etc.), telemetry roles for nodes to determine current network conditions, computational roles for nodes to process particular computing/rendering tasks (e.g., image recognition, artificial intelligence algorithms, etc.). Because the nodes of a SHEN capable network may be heterogeneous, respective nodes may have varying capabilities, some of which are well suited for needed tasks in the recovery effort.

The example SHEN role assignment circuitry 312 retrieves telemetry from peer nodes as well as responds to peer nodes when telemetry requests are made. Stated differently, the SHEN role assignment circuitry 312 facilitates the ability to learn what other nodes are capable of and also shares with those nodes what capabilities the affected node is capable of. For any selected peer node under evaluation, the SHEN role assignment circuitry 312 determines whether it is capable of hosting a particular SHEN role that the recovery effort might need. For those peer nodes that have some particular capabilities, the SHEN role assignment circuitry 312 delegates a new role/responsibility to that particular peer node.

After all peer nodes have been evaluated, the example workload processing circuitry 314 listens for workload requests. In the event a workload request arrives that is not SHEN related, that particular non-SHEN workload is assigned a low priority for allocation to a node for processing. Stated differently, SHEN related workloads take priority for completion in view of the fragile nature of a network recovering from a catastrophic event. For SHEN related workload requests, the workload processing circuitry 314 determines whether that workload can be processed and/or otherwise executed locally while satisfying particular timing or latency sensitive requirements and/or service level agreement (SLA) requirements, and/or based on whether the local node has the requisite processing capabilities for the requested workload. If so, the workload is processed locally, otherwise the workload processing circuitry 314 determines that the local node is either incapable of satisfying workload requirements, or that the workload is busy.

In some examples, when the local node is inundated or otherwise currently incapable of satisfying workload requirements, the workload processing circuitry 314 determines whether the workload requires orchestration services and whether a peer (remote) node is capable of providing such services. If so, the workload is sent to the peer node. If not, the workload processing circuitry 314 continues the search and determines whether the workload requires processing services and whether a peer (remote) node is capable of providing such services. For example, processing services may include an ability to measure light curtain data and rapidly respond to safety shield activation in the event the workload is associated with a factory operation. In some examples, the workload processing circuitry 314 determines whether the workload requires routing services and whether a peer node is capable of providing such services. For instance, some nodes may be specifically designed for hardware-based routing services that are tailored to process large volumes of routing data quickly. Such a specifically designed node may be an idea choice for the workload versus a different type of node that may have abundant processing capabilities, but would process routing data with relatively slower software-based approaches. As such, the workload processing circuitry 314 applies criteria to match particular workload needs with corresponding nodes that have the capabilities to process the workload in a more efficient manner.

SHEN Discovery

As discussed above, intelligent/adaptive discovery (IAD) examples disclosed herein discover neighboring network resources over any available communication medium/channel (e.g., WiFi, cellular, satellite, optical, etc.). Discovery information/results permit routing table construction and/or updated reconstruction in view of the dynamic nature of recovering networks, and adjust discovery hop count procedures based on current network conditions. Nodes that are equipped with SHEN functionality perform endpoint and route discovery over any available link (e.g., medium, channel, etc.), and such nodes broadcast their SHEN availability/capability after SHEN circuitry 112 corresponding to at least one node of the affected network takes over control. Unlike default or native discovery broadcasts of nodes without SHEN capabilities (or SHEN capabilities that have not yet been instantiated), SHEN broadcast procedures do not flood the available links with discovery requests that might otherwise cause broadcast storms that clog up scarce network resources. Instead, SHEN nodes facilitate and/or otherwise instantiate discovery in a manner independent of normal/native operational mode discovery of the node.

SHEN capable nodes listen on as many simultaneous channels (e.g., links, such as WiFi, 5G, Ethernet, etc.) as respective nodes allow (e.g., particular nodes may have varying types of network interface cards and/or radios), and the example SHEN discovery circuitry 204 controls and/or otherwise manages a hop count or hop depth of discovery messages that are broadcast, thereby improving bandwidth utilization efficiency and/or avoiding broadcast storms by inadvertently inundating already burdened nodes and/or channels associated with those nodes. When a neighbor node has been discovered, the pair of nodes negotiate to assign communication frequencies and/or capacities on alternate channels from the one used for discovery purposes, unless the channel used for discovery has the capabilities to service communication requests.

SHEN nodes may use predefined and/or preconfigured frequencies for neighbor advertisement and discovery, but examples disclosed herein are not limited to such preconfigured parameters. In some examples, frequencies refer to a physical layer, or a MAC layer, or a network layer that is allocated to a recovery effort (e.g., allocated for SHEN recovery in response to FAFO events). In some examples, a nearest neighbor is determined based on signal strength from one or more frequencies, or a hop count where network routing protocols define hops. In some examples where ICN or NDN is employed, hop count refers to a number of ICN nodes that are traversed to find other resources and/or services (e.g., SHEN resources/services). While preconfigured frequencies may be appropriate during initial phases of network recovery when neighboring information is scarce, subsequently learned information permits adjustment of such parameters in view of several factors, including current or changing network conditions, a number of discovered neighbors and their capabilities, and particular characteristics of the location within which the nodes operate. For instance, high rise buildings, apartment complexes and/or densely populated areas experience a greater degree of interference or potential interference, thus nodes may need increase hop counts across available receive channels/frequencies to discover neighbors in a more efficient manner.

Generally speaking, IAD examples disclosed herein broadcast discovery messages within a particular number of hops from the originating node to discover and/or otherwise learn about available resources of the network. The originating SHEN node typically sets a hop count limit (e.g., a hop depth) for the discovery interest message (e.g., a discovery interest packet, such as by way of a named data network (NDN) approach, but examples disclosed herein are not limited thereto) to limit the discovery scope. Such limits are in view of network conditions that may be constantly changing after one or more FAFO events, so the discovery interest packet (message) may propagate at different hop counts in different directions in an adaptive/dynamic manner. In some examples, the SHEN discovery circuitry 204 may determine that some paths can tolerate more hops if those particular links/channels are in relatively good condition (e.g., links/channels that satisfy a threshold congestion metric). In some examples, the SHEN discovery circuitry 204 determines that particular links/channels exhibit packet drops when those corresponding paths are congested or have unstable connectivity.

Figure 4A:
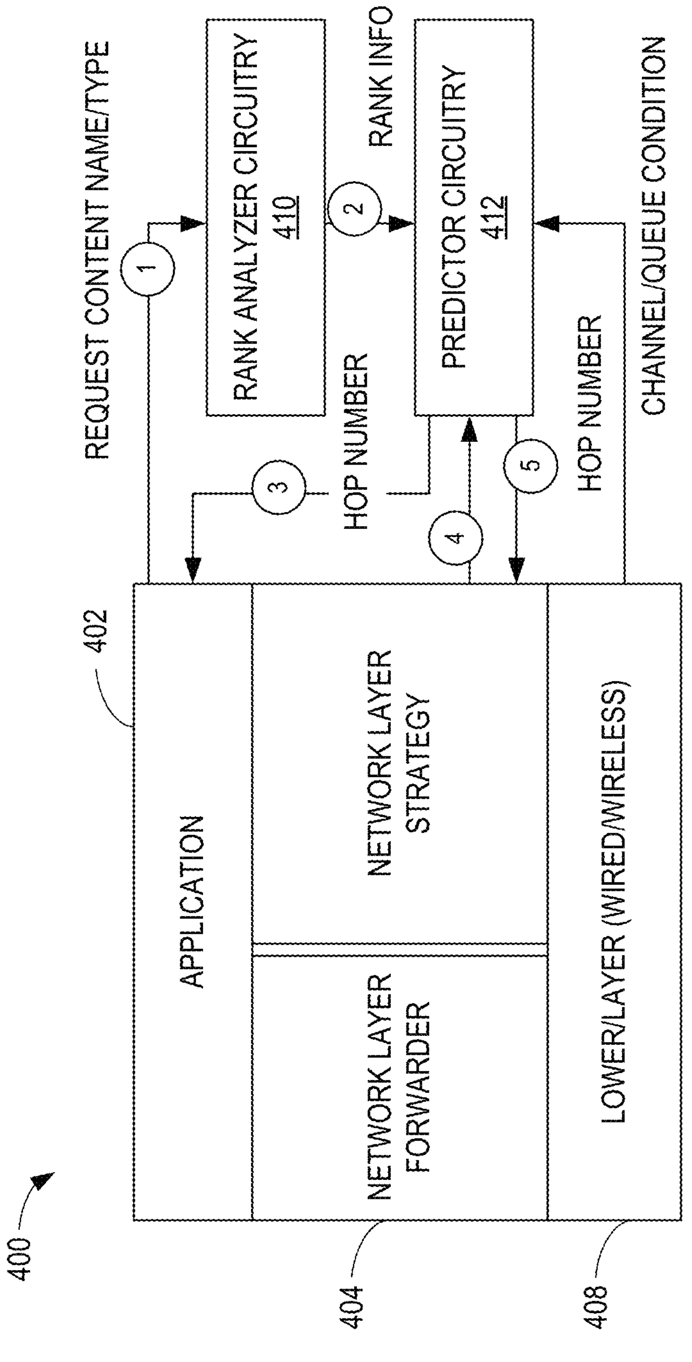
FIG. 4A is a schematic diagram of example intelligent adaptive discovery.

FIG. 4A illustrates an example IAD framework 400. In the illustrated example of FIG. 4A, the IAD framework 400 includes an example application layer 402, an example network layer forwarder 404, an example network layer strategy 406, and an example lower layer 408. The illustrated example of FIG. 4A also includes example rank analyzer circuitry 410 and example predictor circuitry 412. In operation, the example network layer forwarder 404 adaptively varies a number of hops for a discovery interest packet for particular links/channels (e.g., having corresponding directions of propagation to other candidate nodes to discover). Each participating SHEN node continues updating discovery information, which may include link status information, queue length information (e.g., a metric of congestion). Discovery may occur in a periodic manner to appreciate trend information of the different links/channels, in which previous discovery information is compared to current discovery information. In particular, dynamic adjustment(s) to a hop count may be applied to prevent discovery efforts from actually causing further congestion problems.

The example rank analyzer circuitry 410 considers any type of ranking metric, such as Network Alert Level (NAL) profile ranking information. For instance, emergency services within SHEN nodes and/or across two or more SHEN nodes may have profile rankings based on NAL standards (e.g., green, blue, yellow, orange, red, etc.), in which only critical operation(s) take place at a red level. The example rank analyzer circuitry 410 may also consider ranking metrics corresponding to Safety Integrity Level (SIL) ranking standards. Generally speaking, relatively high SIL ranking levels are indicative of networks, nodes and/or processes that are deemed more important, such as those relating to safety and security. Discovery of services corresponding to relatively high SIL and/or high NAL rankings are assigned by the example rank analyzer circuitry 410 with a relatively higher priority and will be processed above all other discovery requests at respective SHEN nodes, and will also be allocated a relatively higher number of hops (e.g., a deeper hop count value) to discover such important services. In some examples, the rank analyzer circuitry 410 identifies the peer nodes along a path of nodes associated with the predicted hop count. As such, a particular SIL and/or NAL ranking value for a single node does not bias a calculation of the hop count most appropriate for a network. Because the example IAD framework 400 samples wireless channel conditions as well as ranking metrics (e.g., SIL ranking information, NAL ranking information), the most critical discoverable resources are prioritized over relatively less critical resource discovery requests.

Returning to the illustrated example of FIG. 4A, in response to a discovery request from the example application layer 402, the example rank analyzer 410 calculates ranking information corresponding to requested resources (see circle label "1"). Generally speaking, each SHEN capable node responds to a FAFO event by first assessing a health of a local system (node) and then assesses a health of other SHEN nodes discovered nearby (or accessible). Nodes negotiates roles where particular nodes with greater and/or specific resources may take on additional roles as compared to other nodes having fewer or generic resources. As such, a network configured and/or otherwise negotiated in view of SHEN formation, discovery and role assignment will have a topology much different than native non-cooperative networks with heterogeneous nodes.

The example predictor circuitry 412 applies collected information from the example lower layer 408, such as an average hop link status over a prior time period (e.g., the last 500 mS), to predict a hop number for the discovery effort (see circle label "2"). Other collected information may include, but is not limited to a neighbor quantity, a queue length of the query node and/or neighboring nodes, and historical discovery result(s). Additionally, the example predictor circuitry 412 applies the rank information to predict the hop number. Output from the example predictor circuitry 412 is sent back to the example application 402 (see circle label "3"), in which the output is assessed by the example network layer forwarder 404 and/or the example network layer strategy 406 so that one or more desired/candidate links/channels can be selected for forwarding. The candidate/desired links/channel information is sent to the example predictor circuitry 412 (see circle label "4") so that rule-based, machine learning (ML) and/or artificial intelligence (AI) techniques can be applied (e.g., gain/loss function(s)) can calculate and/or otherwise generate a hop prediction value corresponding to particular ones of the candidate/desired links. These values are sent to the example network layer forwarder 404 (see circle label "5") for forwarding in a manner consistent with the predicted hop strategy. In some examples, the example application 402 embeds the hop number value in the discovery message to inform subsequent SHEN nodes of the propagation strategy, which affords those subsequent SHEN nodes an opportunity of overwriting this hop value in the event network conditions and/or ranking information suggests that modifications are appropriate. For instance, subsequent SHEN nodes may be experiencing particularly inconsistent network node behaviors that might suggest a further reduction in the hop count.

Figure 4B:
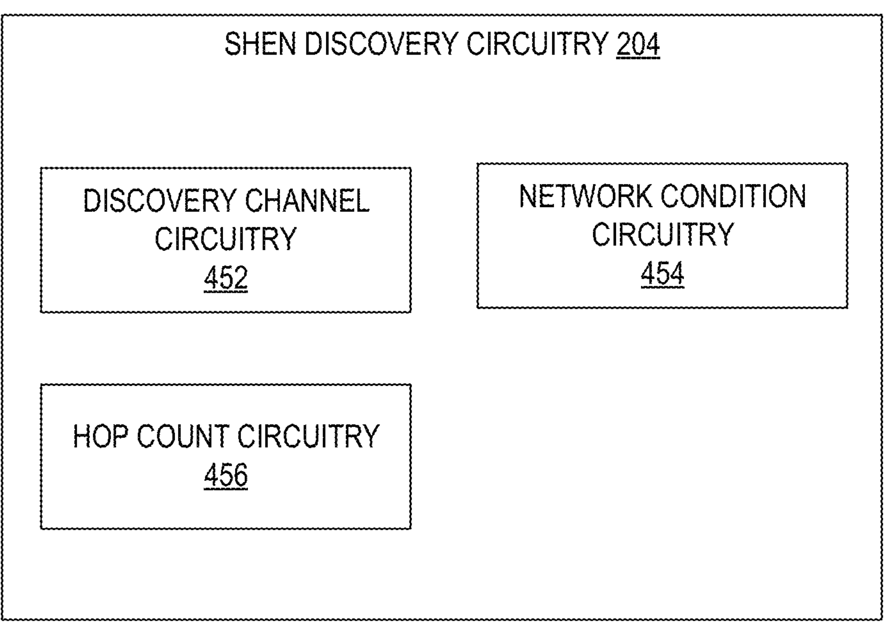
FIG. 4B is a block diagram of additional detail corresponding to example SHEN discovery circuitry of FIG. 2.

FIG. 4B illustrates additional detail corresponding to the example SHEN discovery circuitry 204 of FIG. 2. In the illustrated example of FIG. 4B, the SHEN discovery circuitry 204 includes example discovery channel circuitry 452, example network condition circuitry 454 and example hop count circuitry 456. In operation, the example discovery channel circuitry 452 determines whether any discovery broadcast requests have occurred. As described above, such requests typically occur in response to a catastrophic event in which SHEN mode activation requests have been instigated in response thereto. If so, the example discovery channel circuitry 452 determines if the node that is to initiate the request has a default discovery channel designation, and whether that designation is still functional after the catastrophe. If not, the example discovery channel circuitry 452 analyzes the node and/or interfaces that are part of the node (e.g., NIC, radios, satellite links, Ethernet, etc.) to search for alternative channels to try.

In the event the example discovery channel circuitry 452 identifies an available discovery channel, the example network condition circuitry 454 determines rank information corresponding to requested services or nodes. As described above, the network condition circuitry 454 may check, calculate, retrieve, receive, analyze and/or otherwise determine a NAL or a SIL. In some examples, NAL ranking values might start at red (e.g., a metric indicative of severe) prior to recovery efforts, but may improve as recovery efforts proceed, thereby allowing dynamic adjustment of hop count prediction. In some examples, SIL rankings correspond to procedures or systems with a particular probability of failure, which may be indicative of relatively more complex systems for mission critical services. The example network condition circuitry 454 determines a channel condition, and the example override circuitry 306 (see FIG. 3) is invoked to suppress, block, prevent, terminate and/or otherwise override default hop count settings that might be applied by native protocols of the node when sending a discovery packet. Stated differently, rather than employ default hop counts that are devoid of other information, parameters and/or metrics associated with current conditions, examples disclosed herein generate/predict hop count values based on objective metrics corresponding to current conditions of the dynamic environment.

The example hop count circuitry 456 calculates a hop count prediction and builds a discovery packet with that hop count value embedded therein. In some examples, the hop count circuitry 456 also embeds available information corresponding to SIL ranking that may be used by neighboring nodes when deciding on their own hop count values to implement during the discovery process. The example hop count circuitry 456 transmits the discovery packet and the SHEN discovery circuitry 204 determines whether to reassess the current hop count value being used. In some examples, reassessment may occur on a relatively frequent basis when network conditions are unstable or changing within threshold metrics. On the other hand, when recovery efforts begin to take effect and network performance metrics are more stable (less transient), the SHEN discovery circuitry 204 instantiates reassessment on a relatively less frequent basis.

SHEN Situational Analysis

As described above, the example SHEN situation analysis circuitry 206 identifies and/or otherwise discovers available redundancy opportunities that, if applied, improve network performance reliability during or after FAFO events. Typical production network redundancy strategies apply time-based redundancy techniques, frequency-based redundancy techniques, distance-based redundancy techniques, code domain-based redundancy techniques, and/or techniques that utilize two or more communication mediums (channels). However, these typical production network redundancy strategies are applied in a uniform manner across an entire workload execution flow and do not consider current situational context or the possibility that such current situational context may change substantially from time to time (particularly during post FAFO recovery efforts). For example, in remote surgery environments, reliability of video streaming for a remote surgeon must be very high during the surgical procedure, but such reliability requirements diminish for non-surgical tasks of the network. Traditional redundancy approaches fail to conserve valuable network resources in view of this dynamic environment and cause unnecessary waste.

Examples disclosed herein facilitate situation-aware selective repetition (SSR) for data packets with redundancy over two or more radio/media/channels, and may take advantage of time-based, frequency-based, distance-based and/or code-based redundancy techniques for such data packets. Reliability requirements are dynamically determined by the example SHEN situation analysis circuitry 206 to permit dynamic and/or otherwise adaptive repetition parameters in view of a similarly dynamic network and/or network use status.

Example SSR disclosed herein considers redundancy opportunities for one or more radio access technologies (RATs) and/or landline (e.g., Ethernet) links available to the affected node. Varying types of packet repetition are employed by the SHEN situation analysis circuitry across such available RATs and/or landlines. The example SHEN situation analysis circuitry 206 considers several inputs including situation information from applications, application quality of service (QoS) information, connectivity information corresponding to types of RATs (e.g., cellular, WiFi, Ethernet, combinations thereof) and channel condition information. Output from the example SHEN situation analysis circuitry 206 includes repetition parameters, such as types of channels to utilize, which messages to repeat, whether to repeat via a time domain, a frequency domain, a space domain, a code domain, or a combination thereof.

Figure 5A:
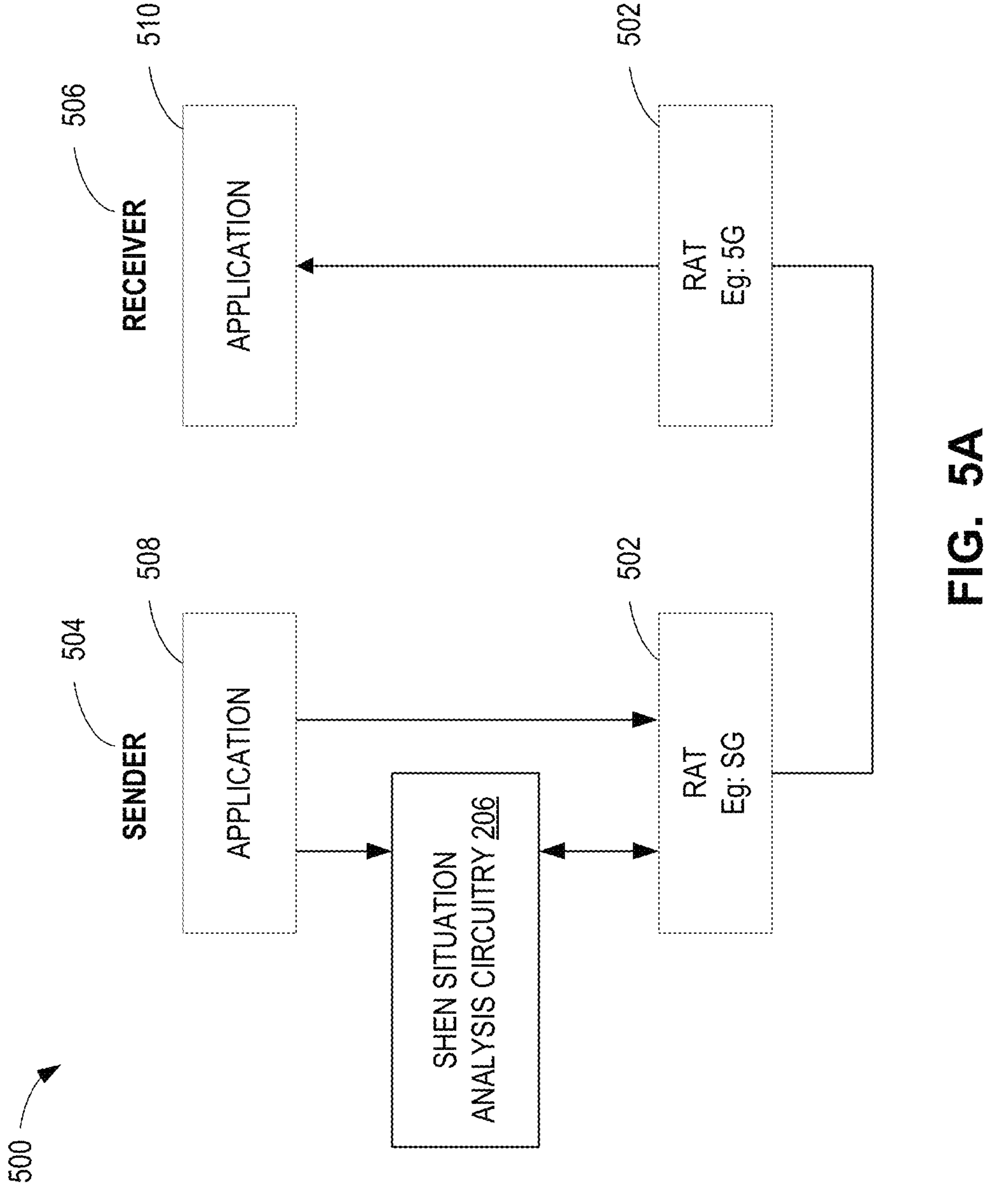
FIGS. 5A and 5B are schematic diagrams of example situational analysis frameworks.

FIG. 5A illustrates an example SSR system 500 having a single RAT 502. As discussed in further detail below, example SSR systems are not limited to a single RAT. In the illustrated example of FIG. 5A, the SSR system 500 includes a sender node 504, which represents a SHEN network node that is to send packet information to a receiver node 506. The sender node 504 and the receiver node 506 include respective applications 508 and 510, respectively, that transmit and consume data packet information. The example sender node 504 includes the example SHEN situation analysis circuitry 206 to process control signals from the application 508 regarding QoS requirements, situational information, etc. Based on this control signal information, the example SHEN situation analysis circuitry 206 transmits and/or otherwise controls the corresponding RAT 502 behavior regarding data packet repetition behavior.

The example application 508 may include middleware, a service layer, etc. to send packets to the RAT 502, and the example control message information may include flow identifier information, QoS requirement information, current situation parameter information and/or identifiers of packets sent to the example RAT 502. Depending on the type of RAT (e.g., 5G), the example SHEN situation analysis circuitry 206 particular layer schedule behaviors, such as a MAC layer scheduler in gNodeB (gNB).

Figure 5B:
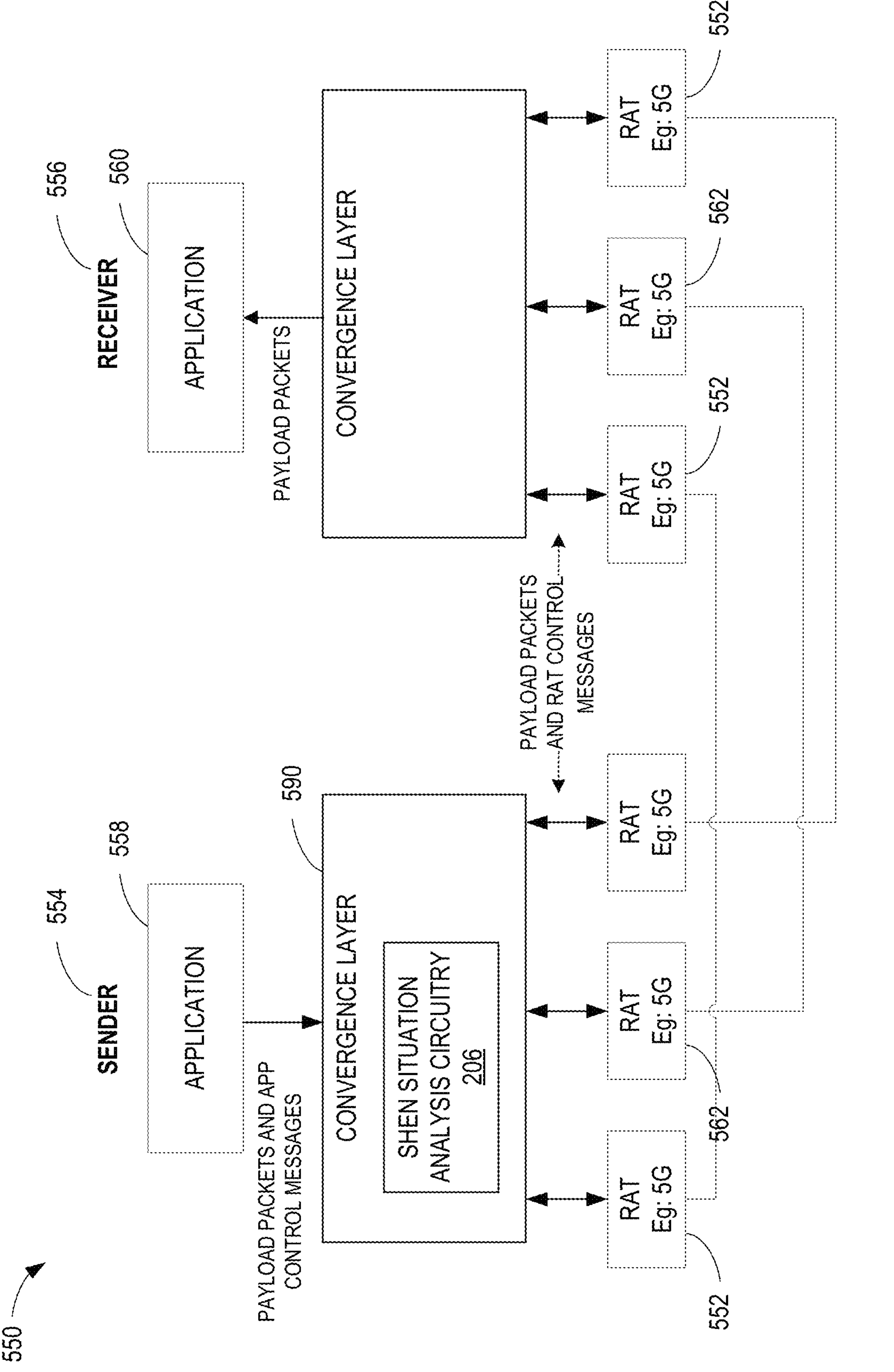

FIG. 5B illustrates an example SSR system 550 having multiple RATs, which include an example 5G RAT 552 and an example WiFi RAT 562. In the illustrated example of FIG. 5B, the SSR system 550 includes a sender node 554 and a receiver node 556 similar to those discussed in connection with FIG. 5A. The sender node 554 and the receiver node 556 include respective applications 558 and 560, respectively. The example sender node 554 includes the example SHEN situation analysis circuitry 206 that, in some examples, operates within an example convergence layer 590, which may assist with sending and receiving messages and/or control signals to any number of available RATs. In some examples, the convergence layer 590 provides high-level APIs to the application(s) 558, 560. In some examples, the convergence layer embeds and/or otherwise adds header fields that convey control information to a receiver-side convergence layer, which may further identify and/or otherwise distinguish initial packets from repeated packets. In some examples, the SHEN situation analysis circuitry 206 monitors a status of original and subsequently sent repetitive packets to confirm which packet sets are ultimately received. For instance, if some original and/or repetitive packets are ultimately not received by the example receiver node, then the SHEN situation analysis circuitry 206 can determine to refrain from using a particular RAT under the assumption that it lacks reliability sufficient to satisfy particular QoS requirements.

Figure 6:
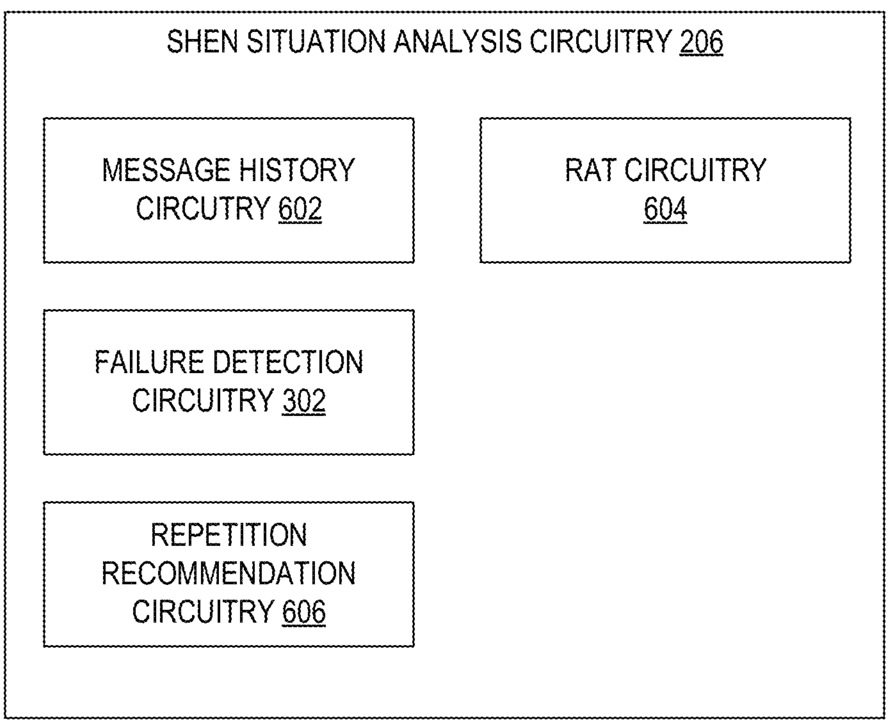
FIG. 6 is a block diagram of additional detail corresponding to example SHEN situation analysis circuitry of FIG. 2.

FIG. 6 illustrates additional detail of the example SHEN situation analysis circuitry 206 of FIG. 2. In the illustrated example of FIG. 6, the SHEN situation analysis circuitry 206 includes an example message history circuitry 602, the example failure detection circuitry 302 (see FIG. 3), the example override circuitry 306 (see FIG. 3), example radio access technology (RAT) circuitry 604, and example repetition recommendation circuitry 606.

In operation, the example message history circuitry 602 stores one or more messages in a memory, which is performed preferably during instances where no FAFO has occurred. Generally speaking, examples disclosed herein realize the benefit of knowing typical network node behaviors and/or the types of services they perform. This type of situational information is neglected in traditional network operations. Such information reveals "clues" before any future FAFO event may occur. For instance, historical message information may reveal (e.g., via header information) that the network node was typically involved in streaming services (e.g., a particular task type) for entertainment purposes, thereby indicative of services that may not be considered high priority or mission critical. In some examples, historical message information may reveal the network node was primarily involved in surgical video information for remote robotic control having a particular QoS to be satisfied for patient safety, suggesting that redundancy efforts should be bolstered for particular task types.

The example failure detection circuitry 302 determines whether a catastrophe or some sort of failure has occurred and, if not, the example override circuitry 306 maintains default messaging techniques for the node. However, in response to detecting a failure mode, the example override circuitry 306 suppresses, disables and/or otherwise blocks native/default messaging techniques for the node so that SHEN-based messaging techniques can be applied that are capable of coordinating with other SHEN nodes that attempt to assist in post-FAFO recovery messaging efforts. The example message history circuitry 602 retrieves a pre-failure message and parses it to determine situation information that the node may be associated with. Additionally, the example message history circuitry 602 parses the pre-failure message for any indication of QoS requirements that may have been in use prior to the failure.

The example RAT circuitry 604 determines available RATs associated with the node as well as particular conditions for those RATs. Based on (a) available RATs, (b) RAT conditions and (c) expected situational needs for the node, the example repetition recommendation circuitry 606 calculates a message transmission RAT type (e.g., 5G, WiFi, etc.) and a message repetition procedure (e.g., time-domain, frequency domain, space domain, code domain, combinations thereof). In some examples, the repetition recommendation circuitry 606 includes gain/loss algorithms, rule-based algorithms and/or AI/ML techniques to generate and/or otherwise calculate the recommendations.

In the event the recommendation includes two or more RATs for the node of interest, the example repetition recommendation circuitry 606 embeds the repetition information in a message header so that receiver nodes are made aware of the different channels on which messages are expected to arrive. The example SHEN situation analysis circuitry 206 initiates message transmission corresponding to the recommendation(s) and the example RAT circuitry 604 determines whether one or more of the RATs is non-responsive. If so, such as if a particular RAT is a NIC that was damaged by an electrical surge, the example RAT circuitry 604 removes the RAT from consideration for messaging options and a new strategy may be calculated in a manner similar to that disclosed above (but without considering the damaged RAT).

Because post SHEN recovery efforts are transient and network behaviors may change drastically, the example SHEN situation analysis circuitry 206 determines whether the failure conditions should be reassessed. If not, such as if a threshold reassessment time is ten seconds, the existing messaging technique is maintained, otherwise a reassessment procedure is initiated.

Critical Information Exchange Protocol (CIEP)

As discussed above, after a failure occurs typical recovery procedures for nodes may attempt to immediately broadcast messages in an attempt to recover lost peers. Unfortunately, such well-intended efforts cause additional problems in the event they all commence at the same time, thereby creating interference between devices that transmit at the same time (or wait to receive at the same time).

While some traditional network communication protocols include a contention process during normal operations, such contention techniques (e.g., managed by an access point) can help to marshal/control communications among nodes. However, ad-hoc networks cannot take advantage of such centrally located contention resources. In particular, because typical communication infrastructure failures lose many of the resiliency benefits, ad-hoc networks are a necessary starting point for recovery to maintain basic connectivity and efficient message exchange. Examples disclosed herein enable critical information can still be exchanged in a reliable manner even after a catastrophic failure.

Figure 7A:
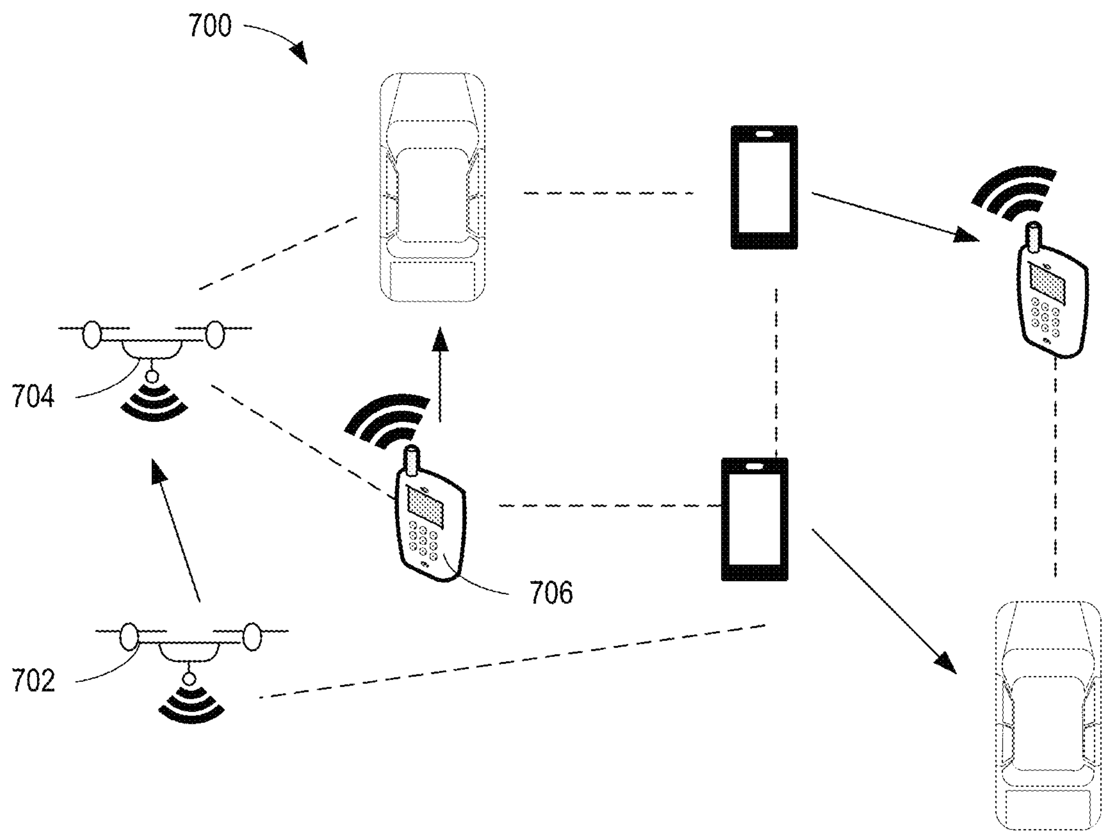
FIG. 7A is an example ad-hoc network formed by the example SHEN circuitry of FIG. 2 to recover a network.

FIG. 7A illustrates an example ad-hoc network 700 generated after a catastrophic failure, in which the network 700 employs CIEP using directional transmission. In the illustrated example of FIG. 7A, each network node has one radio module (one RAT), but in practice the nodes may each have any number of radio and/or terrestrial links that can perform half-duplex or full-duplex transmission between each other. However, in emergency recovery situations, to reduce power consumption, increase transmission distances, improve transmission security, and mitigate interference across different links, examples disclosed herein utilize directional transmission for data communication (e.g., by using directional antennas or antenna arrays with beamforming techniques).

In the illustrated example of FIG. 7A, a first drone 702 (lower drone) and a second drone 704 (upper drone) compete with each other, which is a problem if they want to talk to each other at the same time. Additionally, if the second drone 704 wants to talk with the first drone 702 while that second drone is already talking to a first mobile device 706, then additional conflict will result.

After network discovery (e.g., either initial or continuous), all network nodes are assumed to have knowledge/awareness of neighboring nodes, but such nodes still have no agreement of when to transmit versus when to receive. Examples disclosed herein employ coloring protocols to efficiently configure nodes for fast information exchange/dissemination. Example coloring protocols disclosed herein operate in a distributed manner on each node and transmits data across them using synchronized time slots for a predefined duration.

Figure 7B:
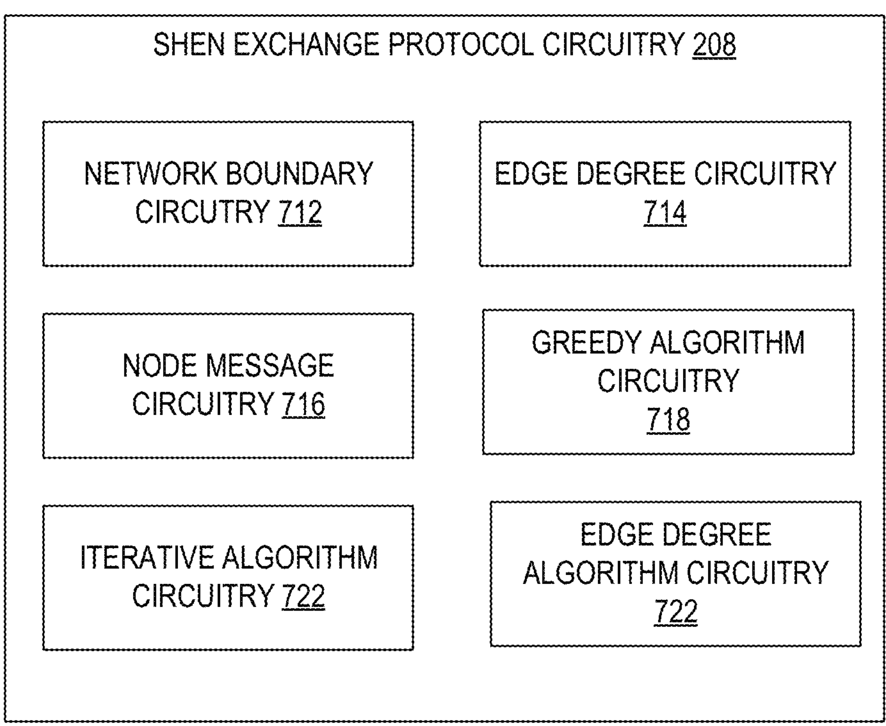
FIG. 7B is a block diagram of additional detail corresponding to example SHEN exchange protocol circuitry of FIG. 2.

FIG. 7B illustrates additional detail corresponding to the example SHEN exchange protocol circuitry 208 to assign node communication protocol instructions to nodes of a network. In the illustrated example of FIG. 7B, the SHEN exchange protocol circuitry 208 includes example network boundary circuitry 712, example edge degree circuitry 714, example message circuitry 716, example greedy algorithm circuitry 718, example iterative algorithm circuitry 720, and example edge degree algorithm circuitry 722.

In operation, the example network boundary circuitry 712 determines whether a candidate network to be analyzed and/or otherwise studied has a known network boundary. In other words, some networks have an observable quantity of nodes that make up the entirety of that network, while some networks are newly formed and/or forming in response to a prior FAFO event, at which time the exact quantity of nodes is unknown or otherwise not yet determined. The example network boundary circuitry 712 may determine whether a particular network has a known network boundary (e.g., a discrete and steady-state quantity of identified nodes) based on whether a node count value has been maintained for a threshold period of time. For example, if a network node count is a first value at a first time and a second value at a second time, in which the duration in between the first and second times is relatively short, then this is an indication that the network is still transient. However, when that duration persists for a threshold period of time without a node count value changing, this is an indication that the network may no longer be transient. Despite the particular stage of any network or recovering network, examples disclosed herein facilitate a manner of orchestrating the nodes in a communication protocol that reduces congestion and/or interference. In the event the example network boundary circuitry 712 knows the details of the network boundary (e.g., a node count for the network), an alternating algorithm is instantiated to make an initial attempt at assigning each node a particular color such that communication to other connected nodes occurs without conflict. As used herein, a node "color" is a parameter of the node that designates conditions for which it is allowed to one of transmit messages (packets of data) or receive messages. Stated differently, a node color corresponds to a particular node time slot such that the node having a particular node time slot value will only be allowed to transmit during its designated time slot. While examples disclosed herein refer to a node color, any type of parameter may be used, such as a register bit (e.g., zero/one), an alphanumeric value (e.g., "T" for transmit mode and "R" for receive mode), a time slot value, etc.

Figure 7C:
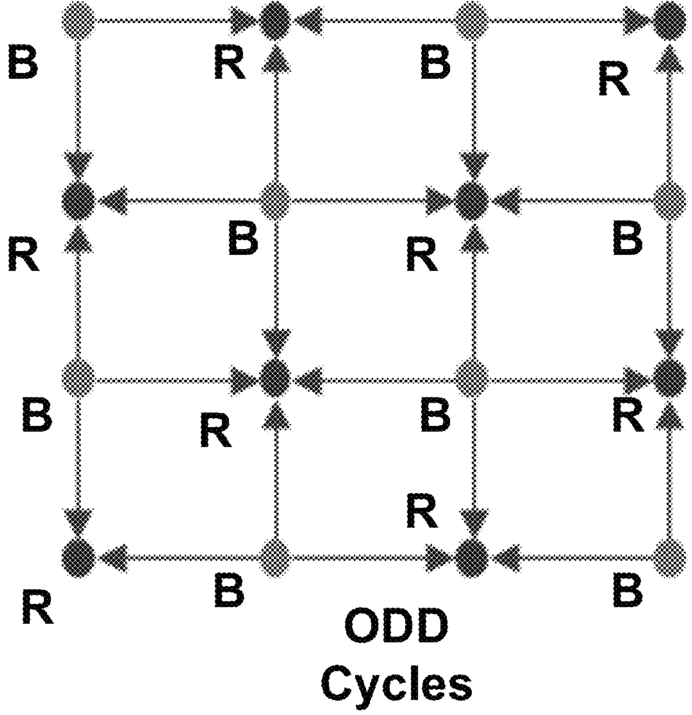
FIG. 7C is an illustration of example bipartite graphs.
Figure 7C:
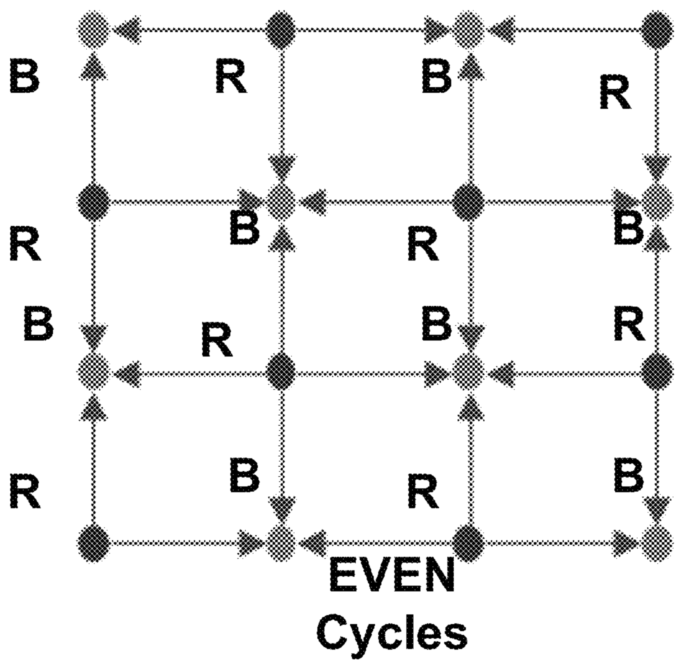

In some examples, networks to be analyzed/studied can be represented as graphs. When a network includes a particular number of nodes that have communication links (edges) to other nodes in a manner that allows each connected node to transmit while the other node listens, a bipartite graph results. FIG. 7C illustrates example bipartite graphs (networks) that designate communication cycles (e.g., time slot values, also referred to herein as "colors") in which a first group of nodes is allowed to transmit while a second group of nodes is allowed to receive, and during a subsequent communication cycle (e.g., a subsequent color) the transmit/receive permissions are reversed. In the illustrated example of FIG. 7C, an odd cycles arrangement (the top graph) includes a first group of nodes designated as blue "B" and a second group of nodes designated as red "R". During a first cycle (and all subsequent odd cycles) of communication, the blue "B" nodes are allowed to transmit messages to the red "R" nodes. During a second cycle (and all subsequent even cycles) of communication, the red "R" nodes are allowed to transmit messages to the blue "B" nodes. Because every blue node has an edge connected to an opposite (e.g., red "R") color, there are no conflicts in which a particular node attempts to transmit to another node that also attempts to transmit during the same cycle. This circumstance is referred to as a bipartite graph/network.

New and/or recovering nodes do not yet have such color assignments, so if a recovering node attempts to utilize its native and/or otherwise default recovery communication protocol after a FAFO event, it may cause conflict with other nodes due to the lack of synchronization. To eliminate that concern, the example node message circuitry 716 begins network analysis by assigning each node a random color (e.g., a random node time slot value). The node message circuitry 716 sends, from a query node (e.g., an assigner node), a message to a neighbor node (e.g., a first neighbor node in a network that could have any number of connected edges to the query node), in which the message includes identification (ID) information and determines whether the receiving node is of an opposite color. In some examples, two or more assigner nodes may initially take on the responsibility of node color assignment, which may result in conflict if left unresolved. As such, examples disclosed herein designate and/or otherwise establish one of the first or second assigner nodes (e.g., query nodes) as a controller for assignment purposes. In some examples, a distributed control system (DCS) and/or DCS algorithm is instantiated to designate the controller.

If node colors are opposite, then the node message circuitry 716 (or in some examples the exchange protocol circuitry 208) maintains the originally-assigned node colors for the sending/receiving node. However, if both nodes are of the same color, then a conflict could result if those original color settings are maintained. As such, the node message circuitry 716 sets the node with the smaller ID value to its originally assigned color, and flips (e.g., switch, change, reverse) the other node color assignment so that the nodes having a common link are of opposite colors.

There are some examples in which a network arrangement includes unresolved conflict. That is, despite the efforts to assign nodes particular colors that do not conflict (e.g., in an effort to establish a bipartite graph/network), some nodes may include two or more links to other nodes that also have the same color assignment. To address such circumstances, the example node messaging circuitry 716 determines whether to apply a greedy algorithm or an iterative algorithm to the network under study. In particular, the node messaging circuitry 716 may decide which algorithm to pursue based on whether one or more nodes of the network are observed to have a same ID value.

In the event the example node messaging circuitry 716 selects the greedy algorithm in view of one or more instances of node ID parity, neighbor messages are received and analyzed to determine if a smaller ID value can be determined from one of those messages. If so, the example greedy algorithm circuitry 718 keeps and/or otherwise selects the received message having the relatively smaller ID value and the node message circuitry 716 assigns a node color as the opposite of the kept message. However, if the node message circuitry 716 cannot determine which one of the received messages has a relatively smaller ID value associated with its node, then it next attempts to determine which one of the received messages was received earliest. If so, the greedy algorithm circuitry 718 keeps the earliest arriving message and then the node message circuitry 716 assigns the node color as the opposite of the kept message. In the event the node message circuitry 716 cannot determine which message arrived earliest, then the greedy algorithm circuitry 718 keeps a random message before the node message circuitry 716 assigns the node color as the opposite of the kept message.

Figure 7D:
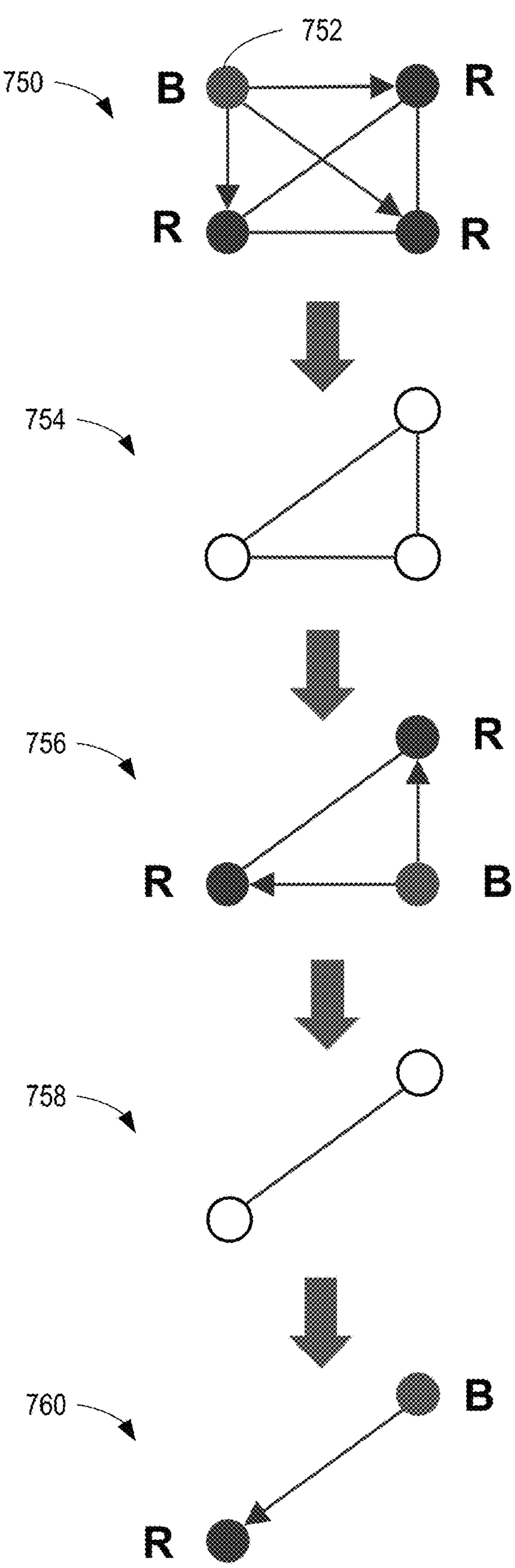
FIG. 7D is an illustration of example non-bipartite graphs.

When the node message circuitry 716 determines a threshold quantity of network sections that are non-bipartite, the iterative algorithm circuitry 720 begins a process of disaggregating a portion of the network that is non-bipartite. FIG. 7D illustrates an example non-bipartite network section 750. In particular, even after one node is assigned a particular color, assigning the opposite color on its connected nodes still results in some of those other nodes having edges connected to nodes of the same color, which would cause a communication conflict if a communication cycle were initiated. To remedy this conflict, the example iterative algorithm circuitry 720 establishes edge directions (see arrowheads) for a first layer 750 from blue "B" to red "R" after assigning one node as blue "B" 752. Lines between nodes without arrowheads are indicative of remaining conflicts that are to be resolved later. However, at least the first layer 750 includes viable links in which the example node message circuitry 716 exchanges information (e.g., payload).

The example node message circuitry 716 determines whether there are remaining non-bipartite sections of the first layer 750. In particular, the example iterative algorithm circuitry 720 removes the prior established edge directions (arrowheads) to reveal remaining non-bipartite components/nodes 754. Note that at this time there have been no link directions determined because there has not yet been any node color reassignment. The example node message circuitry 716 inserts a color for one node and assigns all remaining nodes an opposite color, as shown by an example second layer 756. The example node message circuitry 716 exchanges message information in view of any non-conflicting nodes and again determines whether there are remaining non-bipartite sections of the node portion being evaluated. In the illustrated example of FIG. 7D, the iterative algorithm circuitry 720 removes the previously identified edge directions to reveal any remaining non-bipartite components nodes, which are shown as an example third layer 758. Similar to above, the node message circuitry 716 inserts a color for one node and assigns any remaining node(s) the opposite color 760 and then permits message exchanges.

Figure 7E:
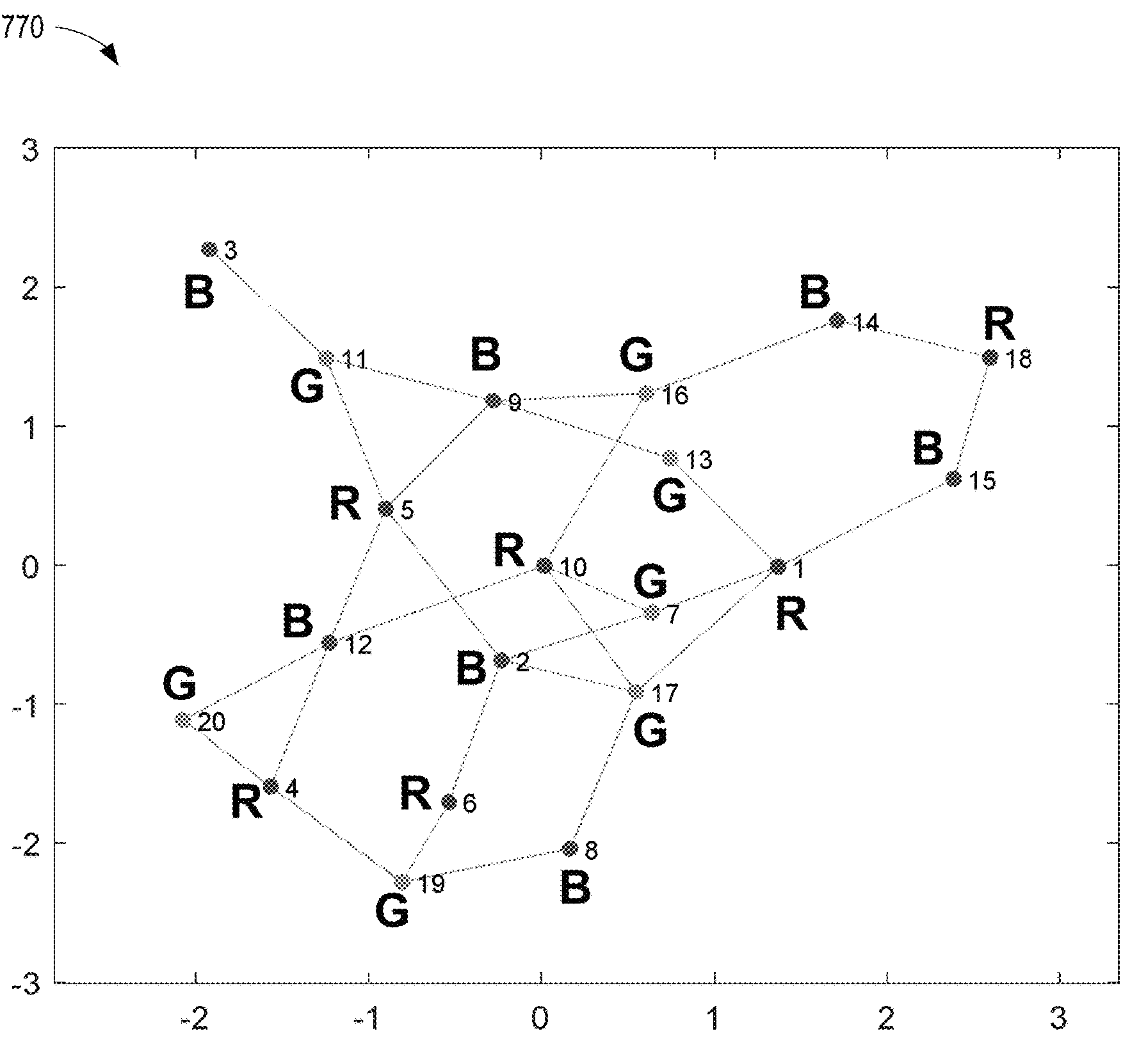
FIG. 7E is an illustration of an example network having colored nodes.

As described above, for circumstances in which the node boundary is unknown, the example SHEN exchange protocol circuitry 208 instantiates an edge degree algorithm to assign each node a particular color. FIG. 7E is an example network shown as a graph 770, in which a total number of nodes is not known. As such, the illustrated example of FIG. 7E shows only those nodes of the network that are currently known and/or otherwise observed, but transient node ebb and flow may occur to change the total node count. The example edge degree algorithm circuitry 722 determines a maximum degree value ($\Delta$) of the observable network. As used herein, a degree value ($\Delta$) of a network represents a largest number of edges that any node of the observable network may have. In the illustrated example of FIG. 7E, the maximum degree value ($\Delta$) is four (4). For instance, node number nine (9) of FIG. 7E illustrates four separate edges connected thereto.

The example edge degree algorithm circuitry 722 sets a number of candidate colors to assign to the network 770 as the maximum degree value ($\Delta$) plus 1→($\Delta$+1). In particular, the example edge degree algorithm circuitry 722 guarantees that ($\Delta$+1) colors (e.g., blue, green, red, purple) assigned to the nodes of a network will not experience a non-bipartite conflict situation. In some examples, less than ($\Delta$+1) colors can be assigned, depending on particular edge connections of any network under review. As described above, each particular color is associated with a particular time slot that, when active) permits that node color to behave as a transmitter while all other nodes operate as receivers, thereby preventing conflict and communication loss. To begin the assignment process, the example node message circuitry 716 selects a first node and assigns one of the ($\Delta$+1) colors. In the illustrated example of FIG. 7E, the node message circuitry 716 selects node number three (3) and assigns a color blue (e.g., one of five colors that is based on the maximum degree value ($\Delta$) of 4. The node message circuitry 716 determines whether the selected node has an adjacent node(s) and assigns it a different color. In the illustrated example of FIG. 7E, the adjacent node is node number eleven (11) and assigns it green. Because node number three (3) only has one edge, the node message circuitry 716 moves on to the next node (in this case, node eleven (11)) to repeat the analysis.

In this example, node number eleven (11) includes two edges, and it has already been assigned the color green as described above. As such, the node message circuitry 716 selects one of the two nodes (e.g., randomly) and assigns it any other color than green. For instance, node number nine (9) is assigned blue, then node number five (5) is assigned any other color than the two colors already used (i.e., in this case blue and green). As such, node number five (5) is assigned red. The process continues to each grouping of nodes having edges until all known and/or otherwise available nodes have been analyzed and assigned a color. In some examples, the aforementioned process can be applied by using a number of colors equal to the maximum degree value ($\Delta$). In the illustrated example of FIG. 7E, the aforementioned process prioritizes utilization of three initial colors of blue, green and red during the analysis. Because no conflicts occurred, the example network 770 of FIG. 7E is a special network configuration in which the full five (5) colors was not needed to guarantee bipartite results.

Returning to the illustrated example of FIG. 2, FIG. 2 is a block diagram of SHEN circuitry 112 to do manage self-adaptive heterogeneous emergency networks. The SHEN circuitry 112 of FIG. 2 may be instantiated (e.g., creating an instance of, bring into being for any length of time, materialize, implement, etc.) by processor circuitry such as a central processing unit executing instructions. Additionally or alternatively, the SHEN circuitry 112 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 (and FIGS. 3, 4A, 4B, 5B, 6 and 7B) may be implemented by microprocessor circuitry executing instructions to implement one or more virtual machines and/or containers.

In some examples, the SHEN circuitry 112, the SHEN formation circuitry 202, and/or the corresponding circuitry of FIG. 3, is instantiated by processor circuitry executing SHEN formation instructions and/or configured to perform operations such as those represented by the flowcharts of FIGS. 8A through 8E. In some examples, the SHEN circuitry 112, the SHEN discovery circuitry 204, and/or the corresponding circuitry of FIGS. 4A and 4B, is instantiated by processor circuitry executing SHEN discovery instructions and/or configured to perform operations such as those represented by the flowcharts of FIG. 9. In some examples, the SHEN circuitry 112, the SHEN situation analysis circuitry 206, and/or the corresponding circuitry of FIG. 6, is instantiated by processor circuitry executing SHEN situation analysis instructions and/or configured to perform the operations such as those represented by the flowcharts of FIGS. 10A-10C. In some examples, the SHEN circuitry 112, the SHEN exchange protocol circuitry 208, and/or the corresponding circuitry of FIG. 7B, is instantiated by processor circuitry executing SHEN exchange protocol instructions and/or configured to perform the operations such as those represented by the flowcharts of FIGS. 11A-11E.

In some examples, the SHEN circuitry 112 includes means for SHEN formation. For example, the means for SHEN formation may be implemented by SHEN formation circuitry 202. In some examples, the SHEN circuitry 112 includes means for SHEN discovery. For example, the means for SHEN discovery may be implemented by SHEN discovery circuitry 204. In some examples, the SHEN circuitry 112 includes means for SHEN situation analysis. For example, the means for SHEN situation analysis may be implemented by SHEN situation analysis circuitry 206. In some examples, the SHEN circuitry 112 includes means for SHEN exchange protocol. For example, the means for SHEN exchange protocol may be implemented by SHEN exchange protocol circuitry 208.

In some examples, the SHEN formation circuitry 202 includes means for failure detection, means for trust, means for override, means for channel discovery, means for route table generation, means for role assignment, and means for workload processing. For example, the aforementioned means may be implemented by, respectively, the failure detection circuitry 302, the trust circuitry 304, the override circuitry 306, the channel discovery circuitry 308, the route table circuitry 310, the SHEN role assignment circuitry 312, and the workload processing circuitry.

In some examples, the SHEN discovery circuitry includes means for discovering channels, means for determining network conditions, and means for hop count calculations. For example, the aforementioned means may be implemented by, respectively, the discovery channel circuitry 452, the network condition circuitry 454 and the hop count circuitry 456.

In some examples, the SHEN situation analysis circuitry 206 includes means for message history management, means for radio access technology (RAT) determination, and means for repetition recommendation. For example, the aforementioned means may be implemented by, respectively, the message history circuitry 602, the RAT circuitry 604, and the repetition recommendation circuitry 606.

In some examples, the SHEN exchange protocol circuitry 208 includes means for network boundary determination, means for edge degree determination, means for node messaging, means for greedy algorithm implementation, means for iterative algorithm implementation and means for edge degree algorithm implementation. For example, the aforementioned means may be implemented by, respectively, the network boundary circuitry 712, the edge degree circuitry 714, the node message circuitry 716, the greedy algorithm circuitry 718, the iterative algorithm circuitry 720 and the edge degree algorithm circuitry 722.

Figure 12:
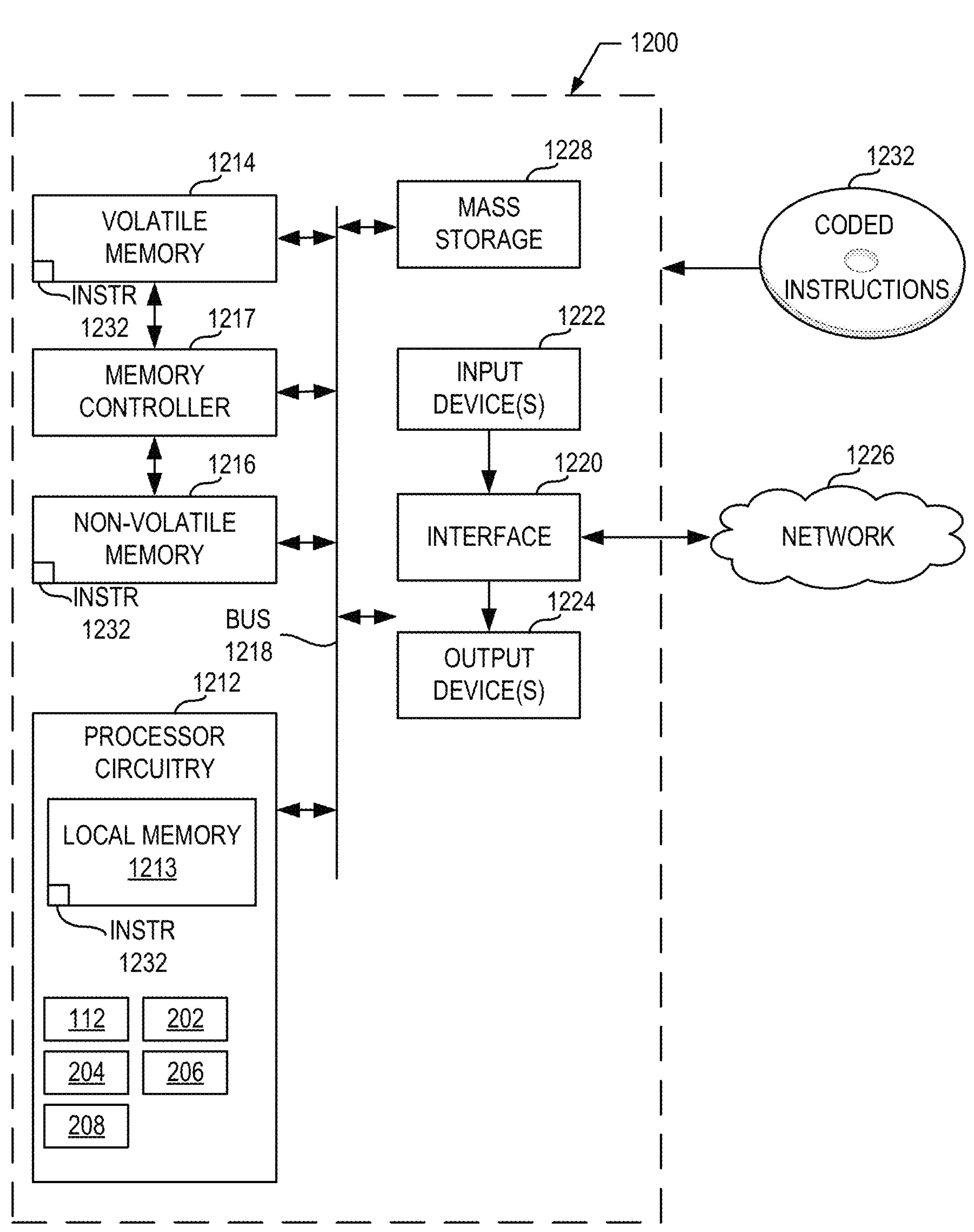
FIG. 12 is a block diagram of an example processing platform including processor circuitry structured to execute the example machine readable instructions and/or the example operations of FIGS. 8A-8E, 9, 10A-10C and 11A-11E to implement the SHEN circuitry of FIGS. 1 and 2.

In some examples, the aforementioned circuitry may be instantiated by processor circuitry such as the example processor circuitry 1212 of FIG. 12. For instance, the aforementioned circuitry may be instantiated by the example microprocessor 1300 of FIG. 13 executing machine executable instructions such as those implemented by at least blocks of flowcharts disclosed herein. In some examples, the aforementioned circuitry may be instantiated by hardware logic circuitry, which may be implemented by an ASIC, XPU, or the FPGA circuitry 1400 of FIG. 14 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example SHEN circuitry 112 of FIGS. 1 and 2 is illustrated in FIGS. 2, 3, 4A, 4B, 5A, 5B, 6 and 7B, one or more of the elements, processes, and/or devices illustrated in FIGS. 2, 3, 4A, 4B, 5A, 5B, 6 and 7B may be combined, divided, re-arranged, omitted, eliminated, and/or implemented in any other way. Further, the example failure detection circuitry 302, the example trust circuitry 304, the example override circuitry 306, the example channel discovery circuitry 308, the example route table circuitry 310, the example SHEN role assignment circuitry 312, the example workload processing circuitry 314, the example rank analyzer circuitry 410, the example predictor circuitry 412, the example discovery channel circuitry 452, the example network condition circuitry 454, the example hop count circuitry 456, the example message history circuitry 602, the example RAT circuitry 604, the example repetition recommendation circuitry 606, the example network boundary circuitry 712, the example edge degree circuitry 714, the example node message circuitry 716, the example greedy algorithm circuitry 718, the example iterative algorithm circuitry 720, the example edge degree algorithm circuitry 722, the example SHEN formation circuitry 202, the example SHEN discovery circuitry 204, the example SHEN situation analysis circuitry 206, the example SHEN exchange protocol circuitry 208, and/or, more generally, the example SHEN circuitry 112 of FIGS. 1, 2, 3, 4A, 4B, 5A, 5B, 6 and 7B may be implemented by hardware alone or by hardware in combination with software and/or firmware. Thus, for example, any of the example failure detection circuitry 302, the example trust circuitry 304, the example override circuitry 306, the example channel discovery circuitry 308, the example route table circuitry 310, the example SHEN role assignment circuitry 312, the example workload processing circuitry 314, the example rank analyzer circuitry 410, the example predictor circuitry 412, the example discovery channel circuitry 452, the example network condition circuitry 454, the example hop count circuitry 456, the example message history circuitry 602, the example RAT circuitry 604, the example repetition recommendation circuitry 606, the example network boundary circuitry 712, the example edge degree circuitry 714, the example node message circuitry 716, the example greedy algorithm circuitry 718, the example iterative algorithm circuitry 720, the example edge degree algorithm circuitry 722, the example SHEN formation circuitry 202, the example SHEN discovery circuitry 204, the example SHEN situation analysis circuitry 206, the example SHEN exchange protocol circuitry 208, and/or, more generally, the example SHEN circuitry 112 of FIGS. 1, 2, 3, 4A, 4B, 5A, 5B, 6 and 7B could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example SHEN circuitry 112 of FIGS. 1, 2, 3, 4A, 4B, 5A, 5B, 6 and 7B may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed to configure processor circuitry to implement the SHEN circuitry 112 of FIGS. 1, 2, 3, 4A, 4B, 5A, 5B, 6 and 7B, are shown in FIGS. 8A-8E, 9, 10A-10C and 11A-11E. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The programs may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated herein, many other methods of implementing the example SHEN circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8A-8E, 9, 10A-10C and 11A-11E may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8A:
FIGS. 8A-8E are flowcharts representative of example machine readable instructions and/or example operations that may be executed by example processing circuitry to implement the SHEN formation circuitry of FIG. 2.
Figure 8A:
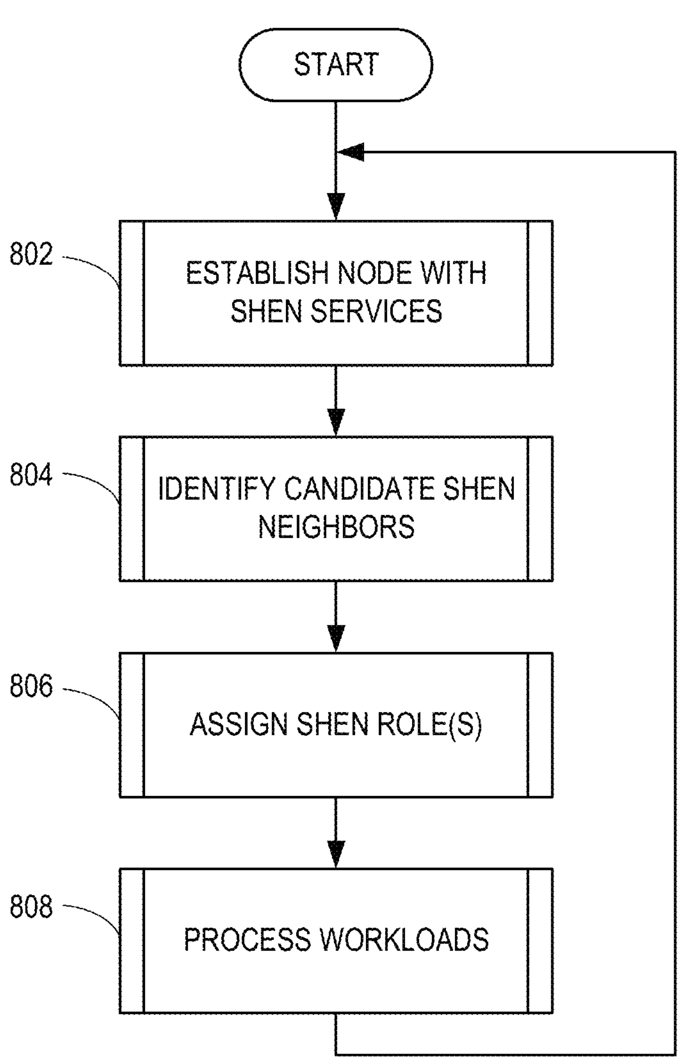

FIG. 8A is a flowchart representative of example machine readable instructions and/or example operations 800 that may be executed and/or instantiated by processor circuitry to establish a SHEN-capable node. The machine readable instructions and/or the operations 800 of FIG. 8A begin at block 802, at which the example SHEN formation circuitry 202 establishes a node of interest with SHEN services, as discussed above and in further detail below. Because SHEN services solicit and utilize available neighboring resources in the effort to recover from a failure, the example SHEN formation circuitry 202 identifies candidate SHEN neighbors (block 804), assigns SHEN roles to identified SHEN neighbors (block 806), and processes workloads (block 808).

Figure 8B:
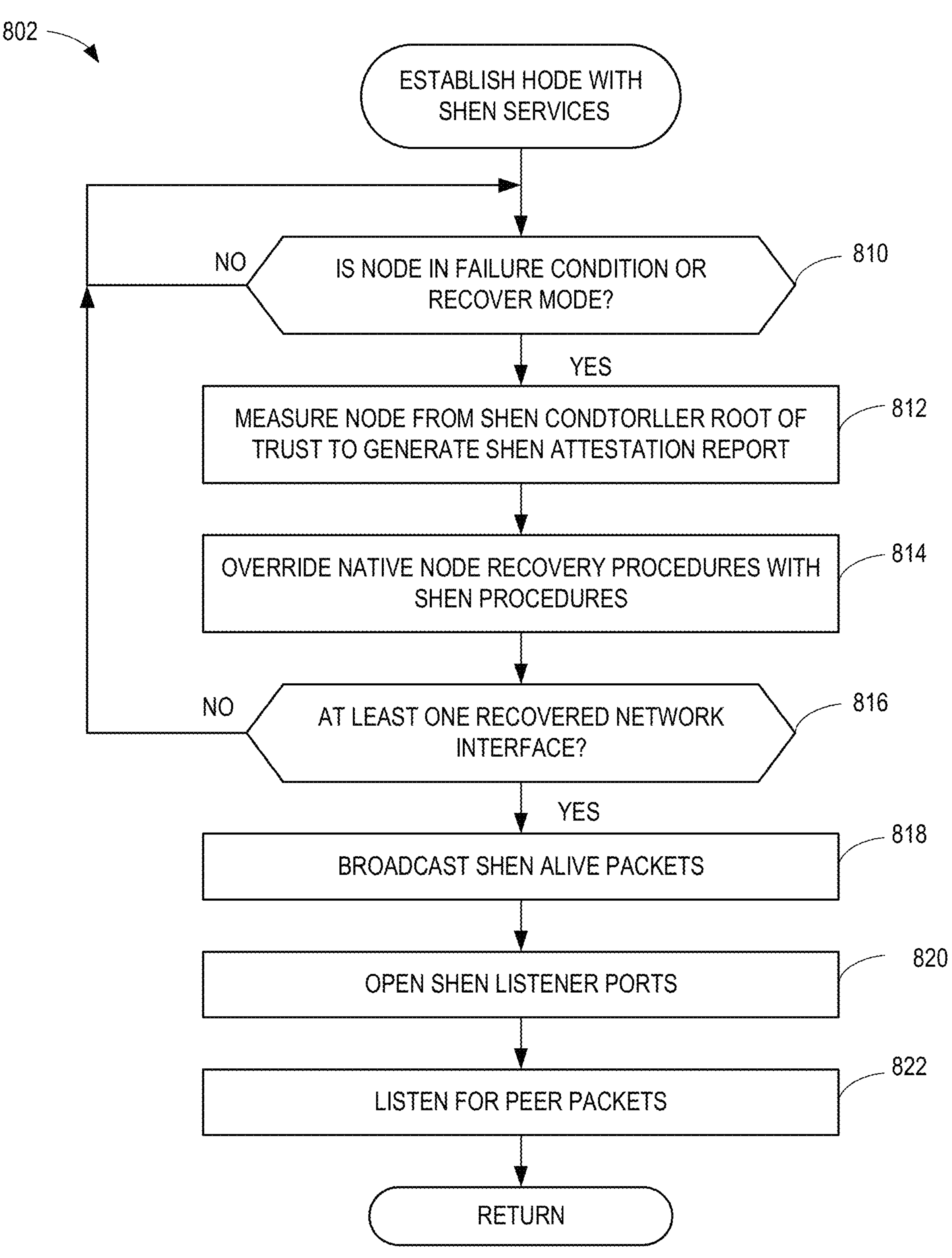

FIG. 8B illustrates additional detail corresponding to establishing a node with SHEN services (block 802). In the illustrated example of FIG. 8B, the SHEN circuitry 112 determines if a node being evaluated is in a failure condition or a recovery mode (block 801). If not, the example process 802 of FIG. 8B continues to monitor for such a condition, otherwise the example trust circuitry 304 measures the node of interest from a SHEN root of trust to generate a SHEN attestation report (block 812). The example override circuitry 306 overrides, interrupts and/or otherwise blocks native recovery procedures that may be initiated by the node experiencing the failure (block 814). As described above, native recovery procedures may exhibit behaviors that are inconsistent with neighboring SHEN nodes that attempt to operate in unison to recover a failed and/or struggling network.

The example channel discovery circuitry 308 determines if at least one network interface can be recovered (block 816). If not, the recovery process is likely in very early stages and/or the node has been severely damaged and may not have the ability to communicate. However, if at least one interface can be recovered (block 816), the channel discovery circuitry 308 broadcasts SHEN alive packets along the discovered interface (block 818), opens listener ports in anticipation of receiving responses to the broadcasts (block 820), and listens for candidate peer node packets (block 822).

Figure 8C:
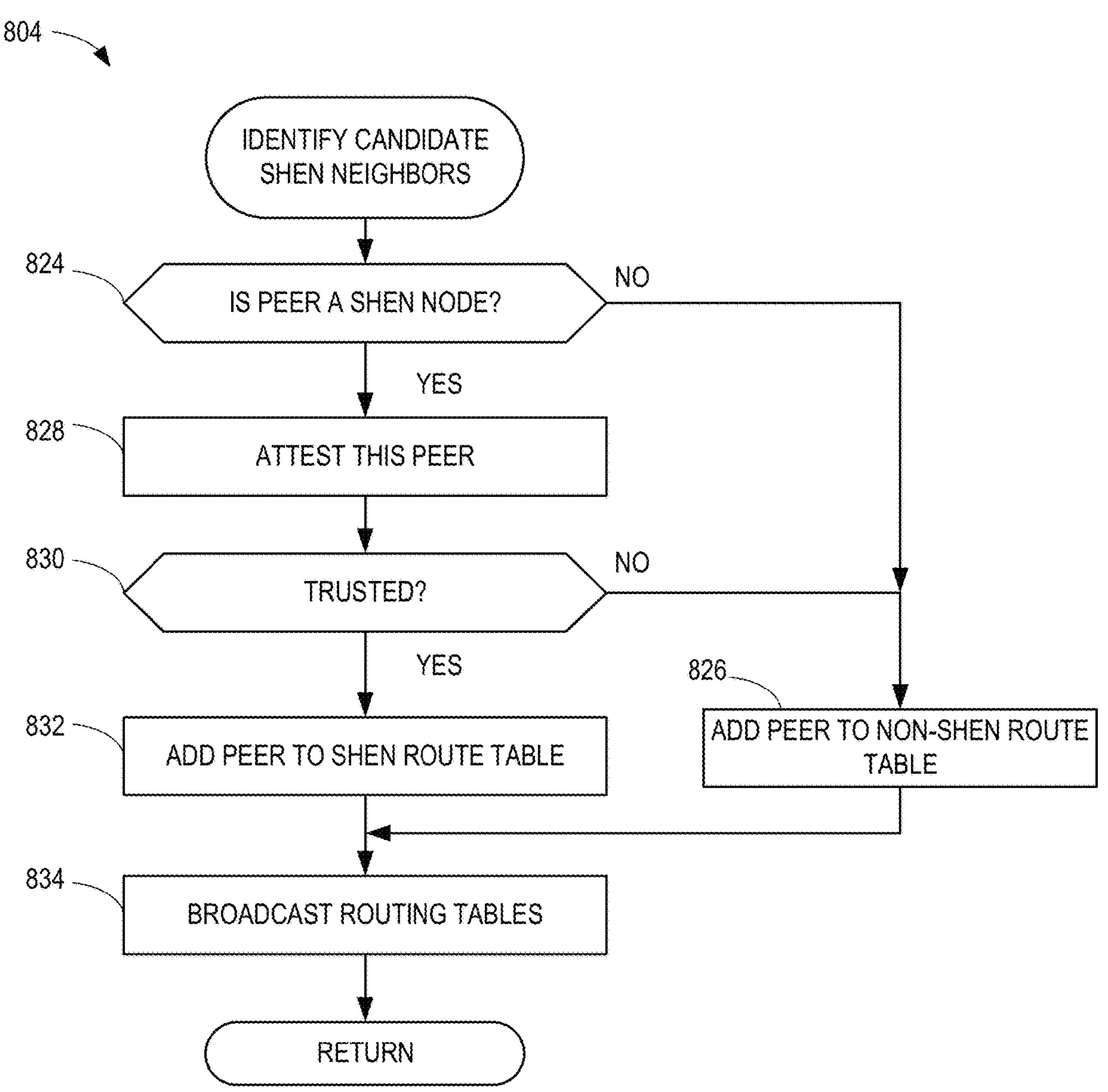

FIG. 8C illustrates additional detail corresponding to identifying candidate SHEN neighbors (block 804) of FIG. 8A. In the illustrated example of FIG. 8C, the channel discovery circuitry 308 determines whether a candidate neighbor is SHEN capable (e.g., a SHEN node) (block 824). If not, the neighbor is identified as non-SHEN capable and the route table circuitry 310 adds this information to a non-SHEN route table (block 826). However, if the neighbor is identified as SHEN capable (block 824), the example trust circuitry 304 attests the peer (block 828) and, if trusted (block 830), the route table circuitry 310 adds this peer/neighbor information to a SHEN capable route table (block 832). The example route table circuitry 310 broadcasts the routing tables to any available nodes/neighbors (block 834) so that the network builds additional insight into available resources for the recovery effort.

Figure 8D:
Figure 8D:
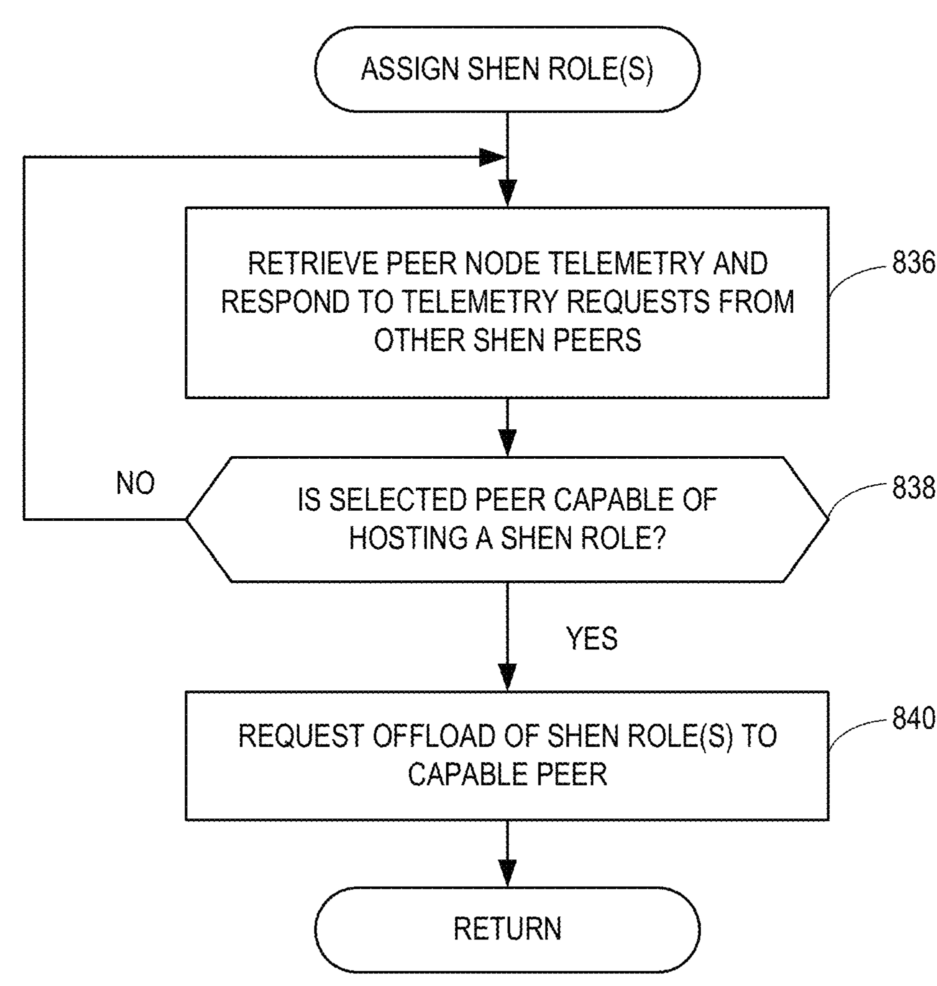

FIG. 8D illustrates additional detail corresponding to assigning SHEN roles (block 806) of FIG. 8A. In the illustrated example of FIG. 8D, the role assignment circuitry 312 retrieves peer node telemetry and responds to telemetry requests from neighboring nodes (block 836). The example SHEN role assignment circuitry 312 determines whether a selected peer of interest is capable of hosting one or more SHEN roles (tasks) (block 838) and, if not, the example process 806 of FIG. 8D continues to evaluate other peer nodes that may be within range of communication. However, in the event the example SHEN role assignment circuitry 312 determines that the selected peer of interest is capable of hosing one or more SHEN roles (block 838), the peer is offloaded and/or otherwise delegated a role to execute (block 840).

Figure 8E:
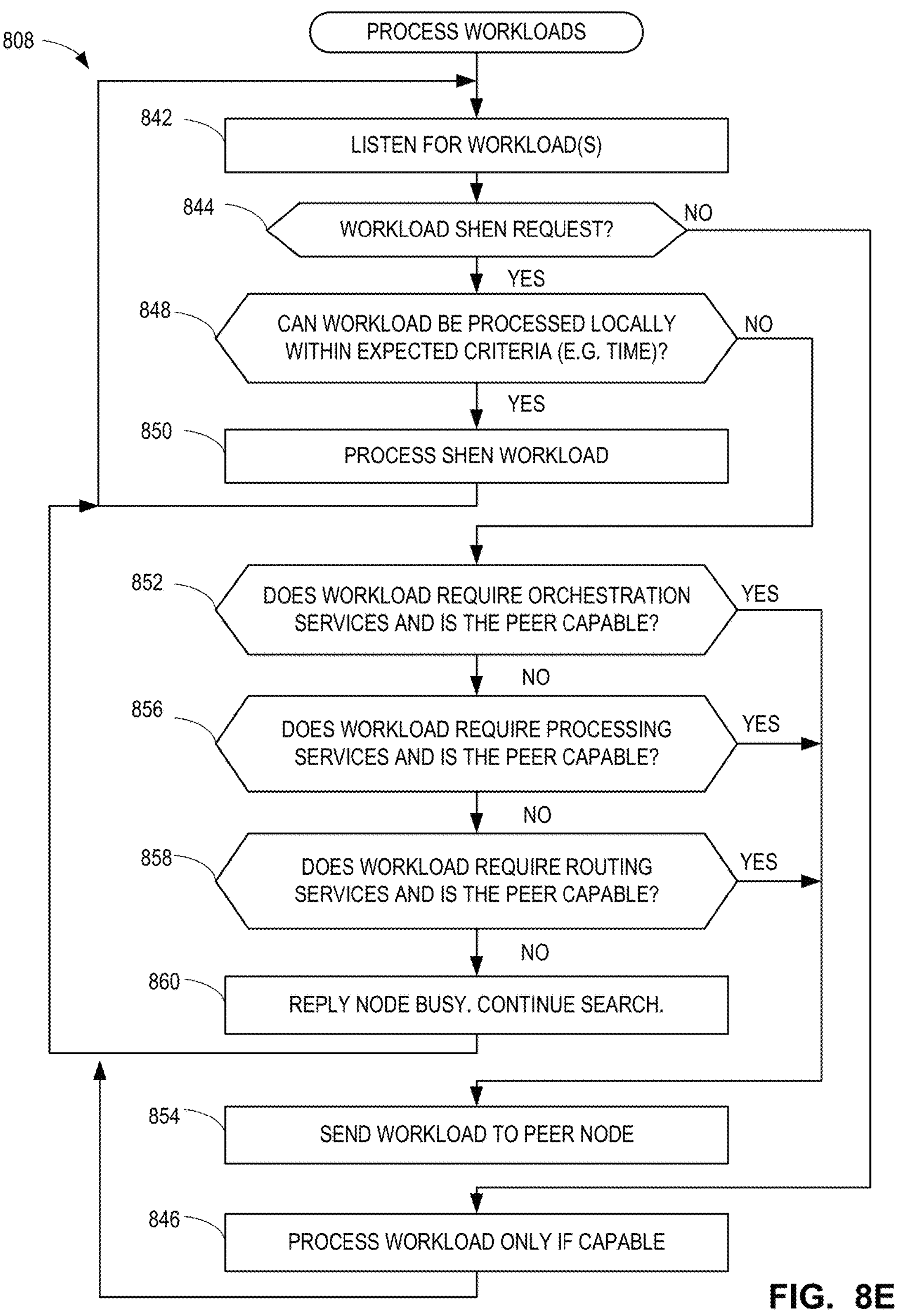

FIG. 8E illustrates additional detail corresponding to processing workloads (block 808) of FIG. 8A. In the illustrated example of FIG. 8E, the workload processing circuitry 314 listens for workload requests (block 842) and determines whether received workload requests are associated with a SHEN-type request (block 844). If not, then the workload is not considered a priority and is processed only if all other relatively higher priority SHEN-type requests have been assigned and/or otherwise completed (block 846). However, if the workload processing circuitry 314 determines that the workload request is of a SHEN-type (block 844), then it determines whether that SHEN workload can be processed locally within expected criteria (e.g., a particular time to complete, a particular resolution of output data, etc.) (block 848). If so, then the local node processes the SHEN workload (block 850), otherwise the workload processing circuitry 314 determines whether the workload requires orchestration services and whether a peer is capable of such services. (block 852). If so, then the workload is sent to that capable peer (block 854). However, because each candidate neighboring node may have varying capabilities, the workload processing circuitry 314 continues to evaluate candidate capabilities by determining whether the workload requires particular processing services (e.g., video processing, image processing, matrix math, etc.) and whether the peer is capable of such services (block 856). If so, the workload is sent to that capable peer (block 854), otherwise the workload processing circuitry 314 continues to evaluate candidate capabilities by determining whether the workload requires routing services and if the peer is capable of such services (block 858). If so, the workload I sent to that capable peer (block 854), otherwise the workload processing circuitry provides an indication that there are no nodes available to handle the requested workload (block 860).

Figure 9:
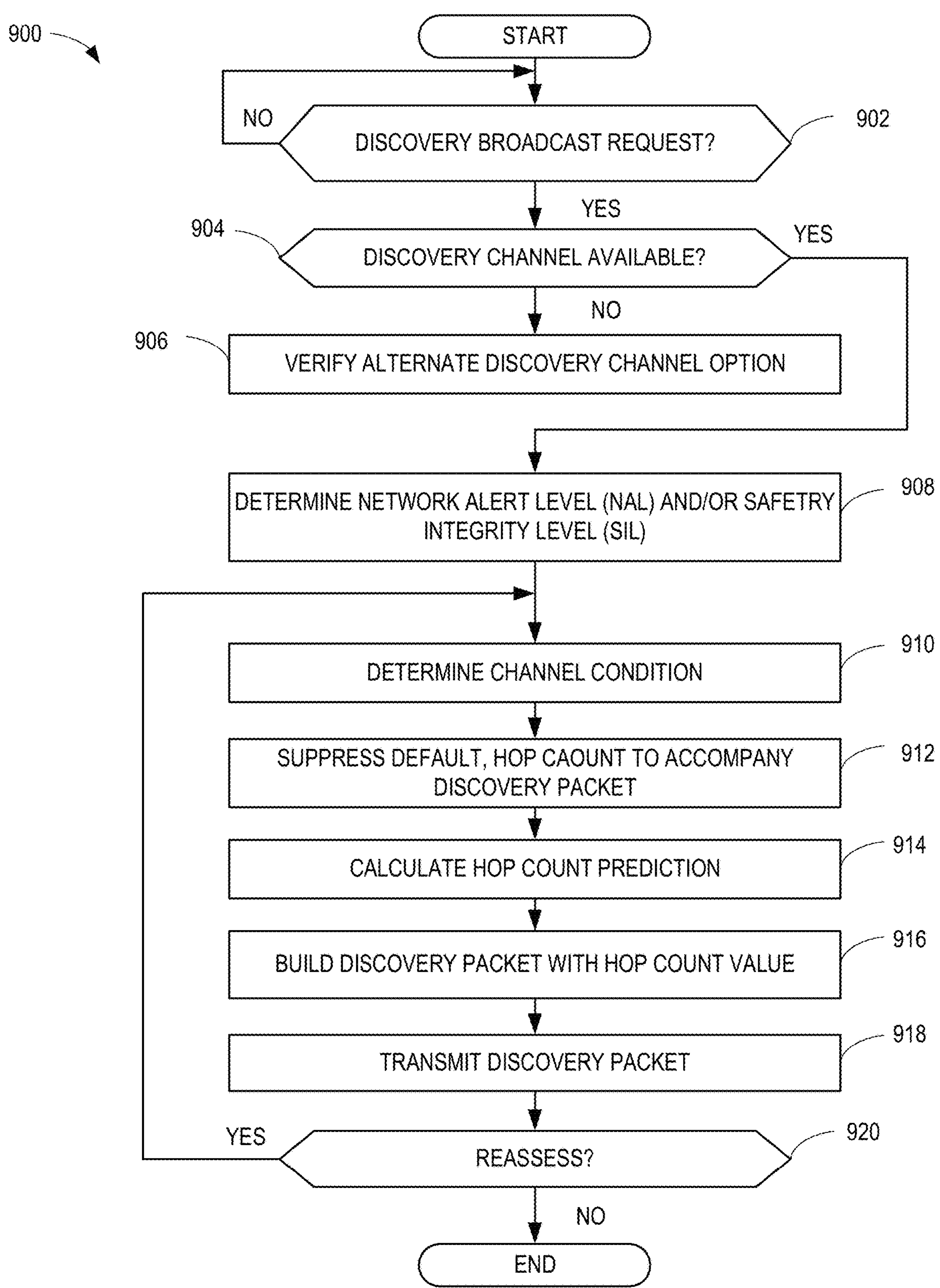
FIG. 9 is a flowchart representative of example machine readable instructions and/or example operations that may be executed by example processing circuitry to implement the SHEN discovery circuitry of FIG. 2.

FIG. 9 is a flowchart representative of example machine readable instructions and/or example operations 900 that may be executed and/or instantiated by processor circuitry to facilitate intelligent/adaptive discovery (IAD) techniques, as described above. In the illustrated example of FIG. 9, the SHEN discovery circuitry 204 determines if a discovery broadcast request has occurred (block 902), and if so, determines whether a discovery channel is known and/or otherwise available (block 904). If not, the node may query interfaces for any other available channel (block 906) before invoking the network condition circuitry 454 to determine rank information corresponding to requested services or nodes (block 908), such as NAL and/or SIL level information.

The network condition circuitry 454 determines a channel condition (block 910), and the override circuitry 306 is invoked to suppress any default hop count procedures that may be in place (e.g., non-SHEN related procedures) (block 912). As described above, if default hop count procedures have already been initiated, examples disclosed herein may terminate further propagation of such hop count values in favor of hop count values based on current conditions. The example hop count circuitry 456 calculates a hop count prediction based on current conditions and rank level information (block 914) and embeds this information in one or more discovery packets (block 916) which are transmitted as discovery packets (block 918). Because recovering networks exhibit transient behaviors in view of unstable conditions, the example SHEN discovery circuitry 204 determines whether to reassess the current hop count value(s) being applied (block 920).

Figure 10A:
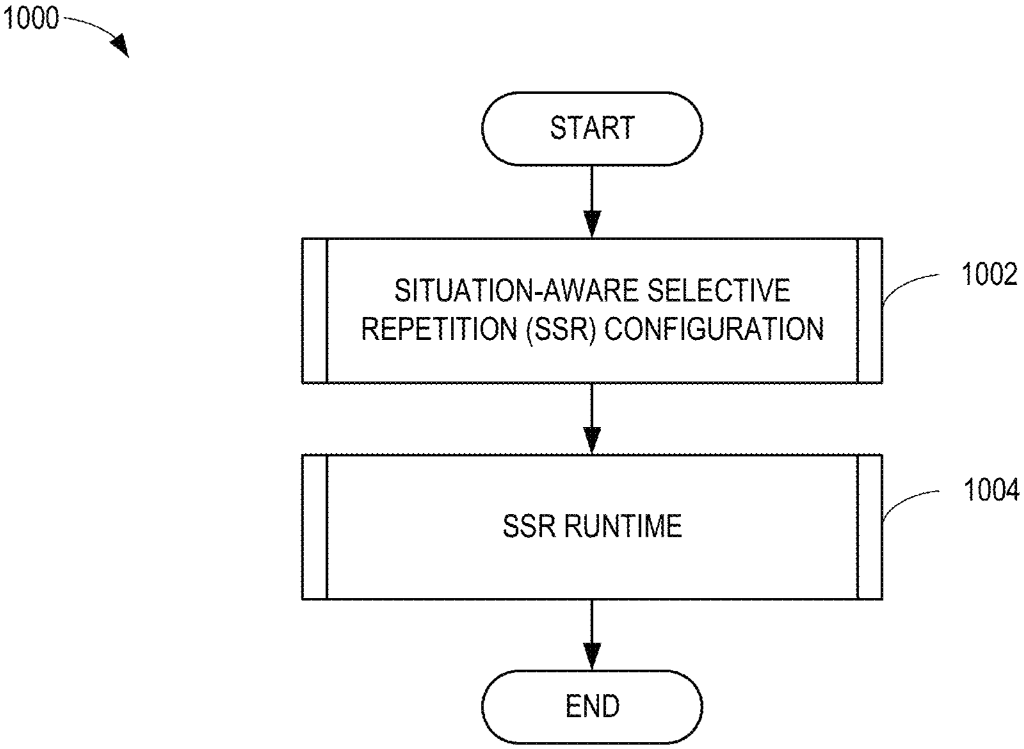
FIGS. 10A-10C are flowcharts representative of example machine readable instructions and/or example operations that may be executed by example processing circuitry to implement the SHEN situational analysis circuitry of FIG. 2.

FIG. 10A is a flowchart representative of example machine readable instructions and/or example operations 1000 that may be executed and/or instantiated by processor circuitry to discover redundancy opportunities to improve network performance reliability during or after FAFO events. In the illustrated example of FIG. 10A, the SHEN situation analysis circuitry 206 instantiates situation-aware selective repetition (SSR) procedures (block 1002) and, when instantiated and/or otherwise evaluated, instantiates an SSR runtime (block 1004).

Figure 10B:
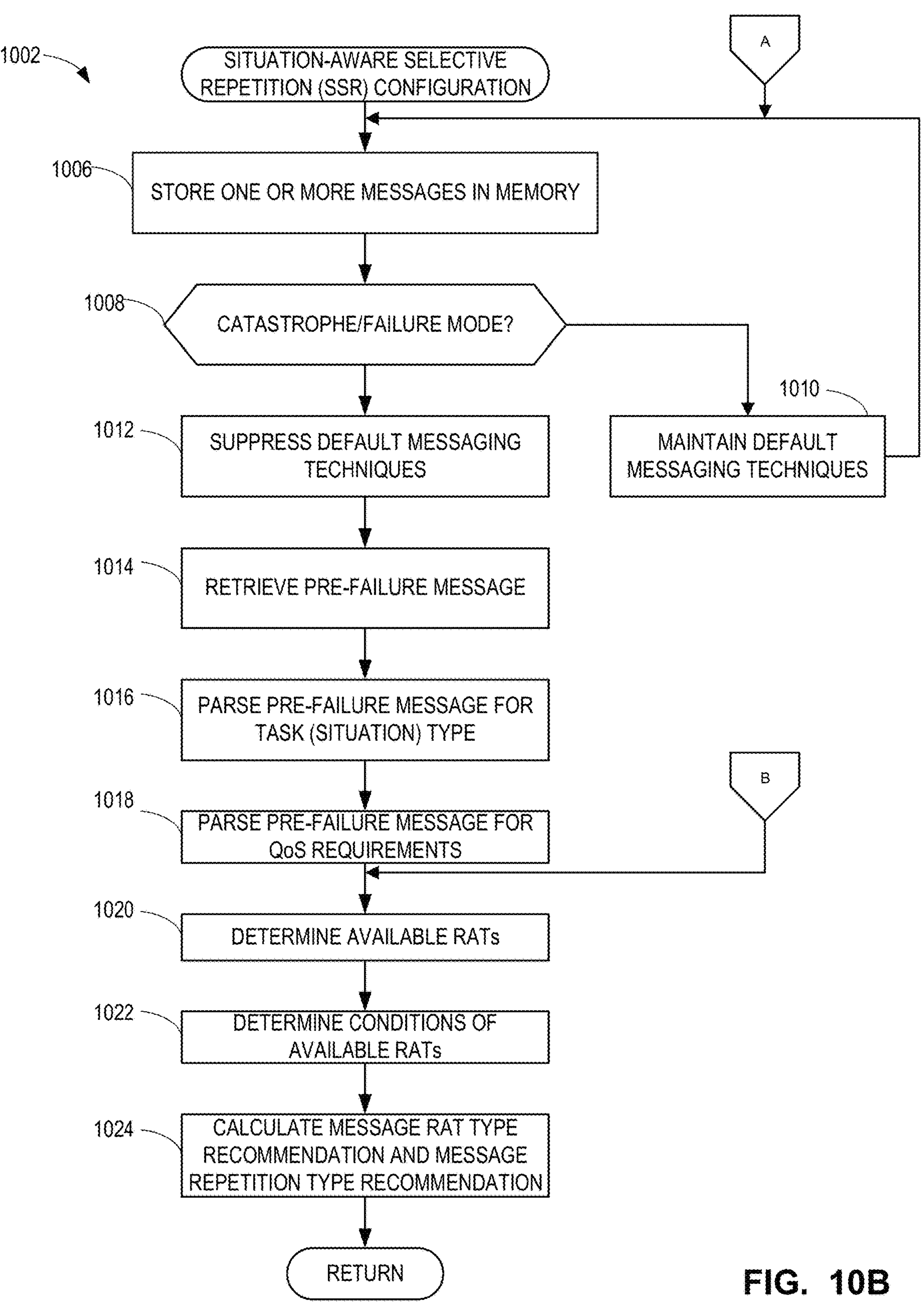

FIG. 10B illustrates additional detail corresponding to SSR configuration (block 1002) of FIG. 10A. In the illustrated example of FIG. 10B, the message history circuitry 602 stores one or more messages in a memory (block 1006). As described above, such historically stored messages are typically obtained during instances where no FAFO has occurred, which may reveal some insight into the typical situation that a particular node is expected to experience. The example failure detection circuitry 302 determines whether a catastrophe or some sort of failure has occurred (block 1008) and, if not, the override circuitry 306 maintains default messaging techniques for the node (block 1010). However, in response to detecting a failure mode (block 1008), the example override circuitry 306 suppresses, disables and/or otherwise blocks native/default messaging techniques for the node (block 1012) so that SHEN-based messaging techniques can be applied that are capable of coordinating with other SHEN nodes that attempt to assist in post-FAFO recovery messaging efforts. The example message history circuitry 602 retrieves a pre-failure message (block 1014) and parses it to determine situation information that the node may be associated with (block 1016). In some examples, the message history circuitry 602 parses header information to identify application types. In some examples, the message history circuitry 602 parses a received message to identify payload data types, such as payloads containing video data, image data, voice data, numeric data, etc. Such payload type identification may reveal a relative importance of the node behavior, such as high quality, low latency video payload data associated with remote surgery procedures. Additionally, the example message history circuitry 602 parses the pre-failure message for any indication of QoS requirements that may have been in use prior to the failure (block 1018).

The example RAT circuitry 604 determines available RATs associated with the node (block 1020) as well as particular conditions for those RATs (block 1022). Based on (a) available RATs, (b) RAT conditions and (c) expected situational needs for the node, the example repetition recommendation circuitry 606 calculates a message transmission RAT type (e.g., 5G, WiFi, etc.) and a message repetition procedure (e.g., time-domain, frequency domain, space domain, code domain, combinations thereof) (block 1024).

Figure 10C:
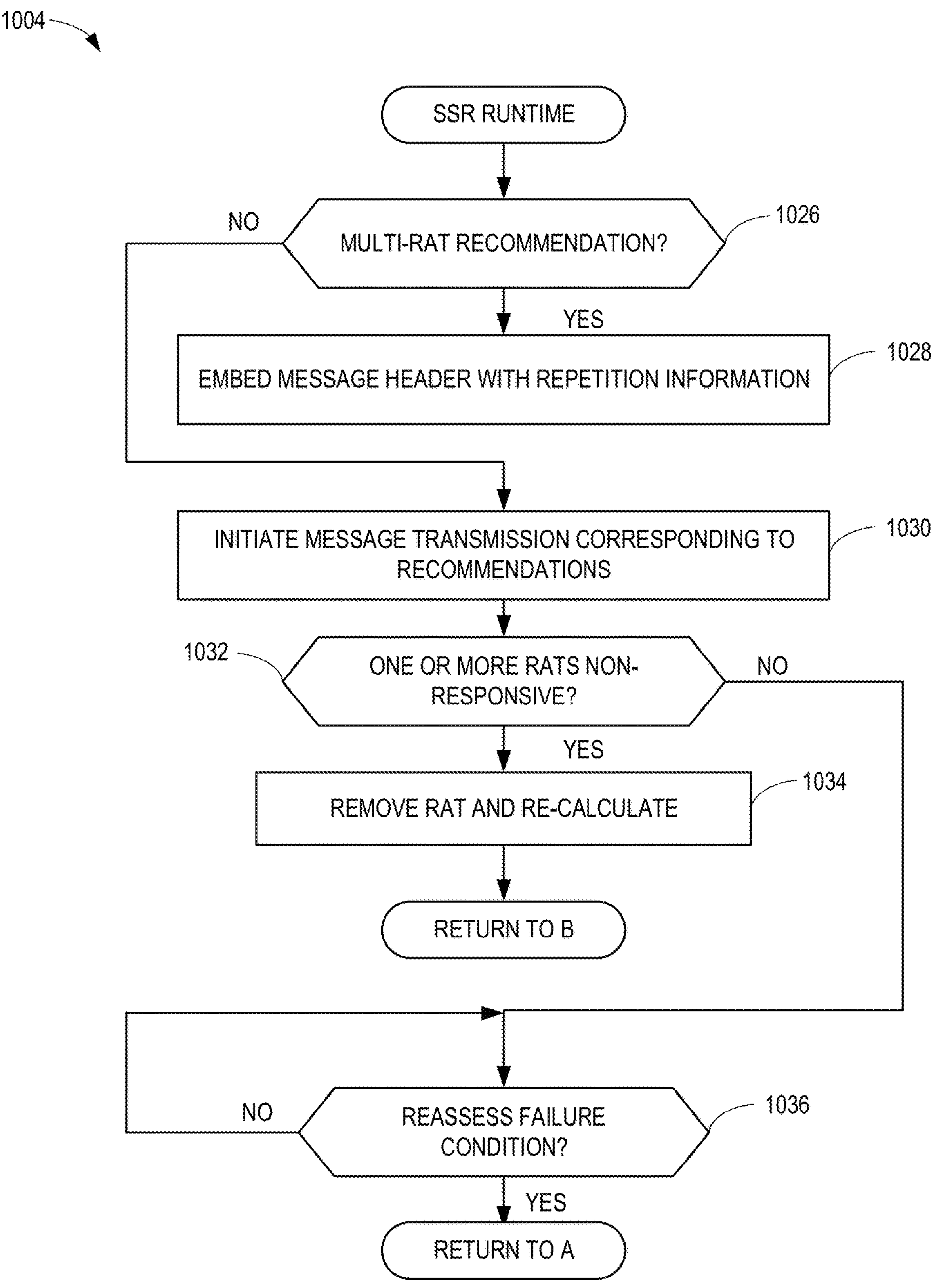

FIG. 10C illustrates additional details corresponding to SSR runtime (block 1004) of FIG. 10A. In the illustrated example of FIG. 10C, the repetition recommendation circuitry 606 determines whether a multi-RAT recommendation has occurred (block 1026). If so, the repetition recommendation circuitry 606 embeds a message header with the repetition information for the benefit of future receiver nodes and how they handle communications (block 1028). In either case, the SHEN situation analysis circuitry 206 initiates message transmission corresponding to the recommendation(s) (block 1030) and determines whether one or more of the RATs is non-responsive (block 1032). If so, such as if a particular RAT is a NIC that was damaged by an electrical surge, the example RAT circuitry 604 removes the RAT from consideration for messaging options (block 1034) and a new strategy may be calculated in a manner similar to that disclosed above (but without considering the damaged RAT). Control then returns to block 1020 to determine if any RATs are available. However, if RATs are responsive (block 1034), the example SHEN situation analysis circuitry 206 determines whether the failure conditions should be reassessed (block 1036). If so, control returns to block 1006. If not, such as if a threshold reassessment time is ten seconds, the existing messaging technique is maintained, otherwise a reassessment procedure is initiated.

Figure 11A:
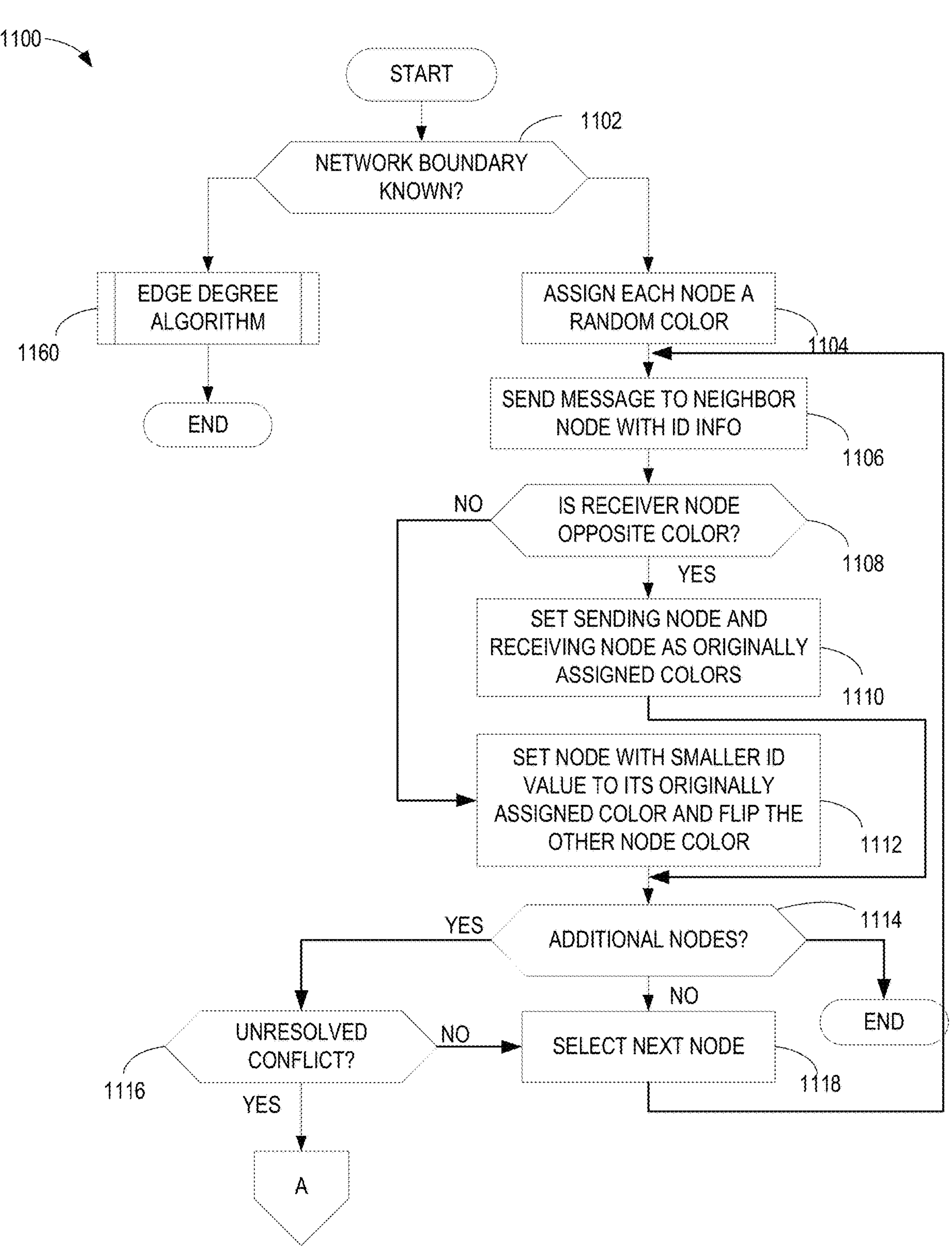
FIGS. 11A-11E are flowcharts representative of example machine readable instructions and/or example operations that may be executed by example processing circuitry to implement the SHEN exchange protocol circuitry of FIG. 2.

FIG. 11A is a flowchart representative of example machine readable instructions and/or example operations 1100 that may be executed and/or instantiated by processor circuitry to reduce conflict and node-to-node interference during network recovery efforts. In the illustrated example of FIG. 11A, network boundary circuitry 712 determines whether a candidate network to be analyzed has a known network boundary (block 1102). In the event the example network boundary circuitry 712 knows the details of the network boundary (e.g., a node count for the network) (block 1102), an alternating algorithm is instantiated to make an initial attempt at assigning each node a particular color such that communication to other connected nodes occurs without conflict. The example node message circuitry 716 assigns each node a random color (block 1104), and sends a message to a neighbor node, in which the message includes identification (ID) information (block 1106) and determines whether the receiving node is of an opposite color (block 1108). If so, then the node message circuitry 716 maintains the originally-assigned node colors for the sending/receiving node (block 1110). However, if both nodes are of the same color (block 1108), then a conflict could result if those original color settings are maintained. As such, the node message circuitry 716 sets the node with the smaller ID value to its originally assigned color, and flips (e.g., switch, change, reverse) the other node color assignment so that the nodes having a common link are of opposite colors (block 1112). The example network boundary circuitry 712 determines whether there are one or more nodes left to analyze (block 1114). If not, the example process 1100 of FIG. 11A is complete and the network is colored in a bipartite manner. However, if there are more nodes to analyze (block 1114), the node message circuitry 716 also determines if there is any unresolved conflict between nodes (block 1116), such as adjacent nodes having a same color (thereby causing conflict). If not, then another/next node is selected (block 1118) and the example process 1100 returns to block 1106. However, in response to conflict, the example node message circuitry 716 determines whether to invoke resolution via a greedy algorithm or an iterative algorithm.

Figure 11B:
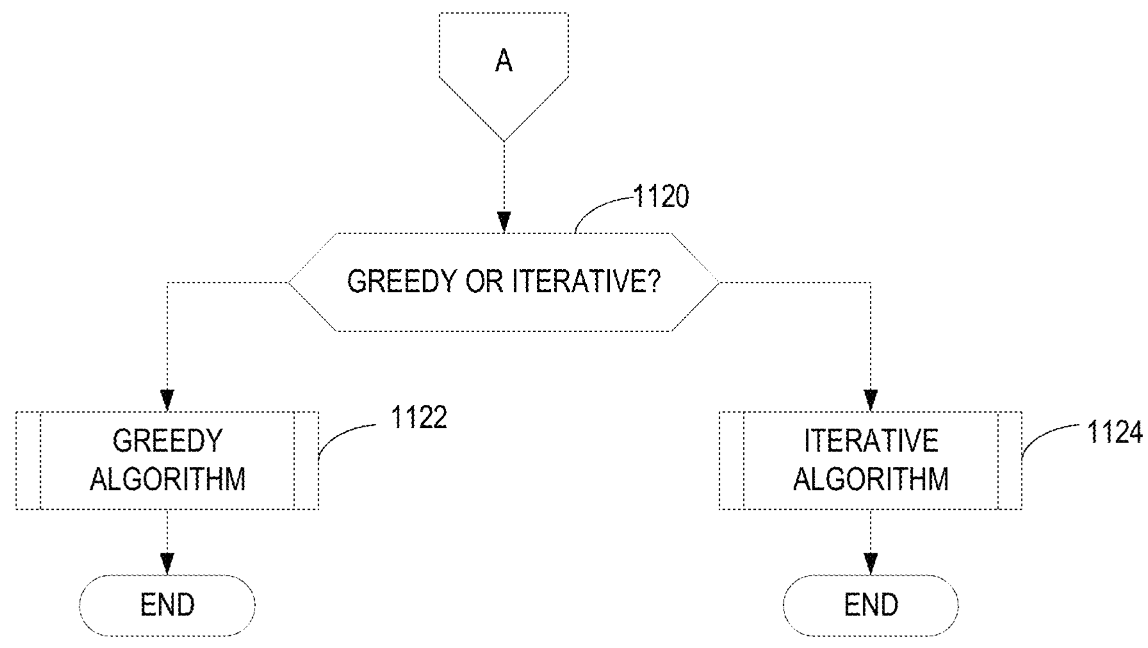

FIG. 11B illustrates additional detail corresponding to conflict resolution. To address such circumstances, the example node messaging circuitry 716 determines whether to apply a greedy algorithm or an iterative algorithm to the network under study (block 1120). In particular, the node messaging circuitry 716 may decide which algorithm to pursue based on whether one or more nodes of the network are observed to have a same ID value. In the event the example node messaging circuitry 716 selects the greedy algorithm (block 1122) in view of one or more instances of node ID parity, control advances to the illustrated example of FIG. 11C. However, in the event the example node messaging circuitry 716 selects the iterative algorithm (block 1124), control advances to the illustrated example of FIG. 11D.

Figure 11C:
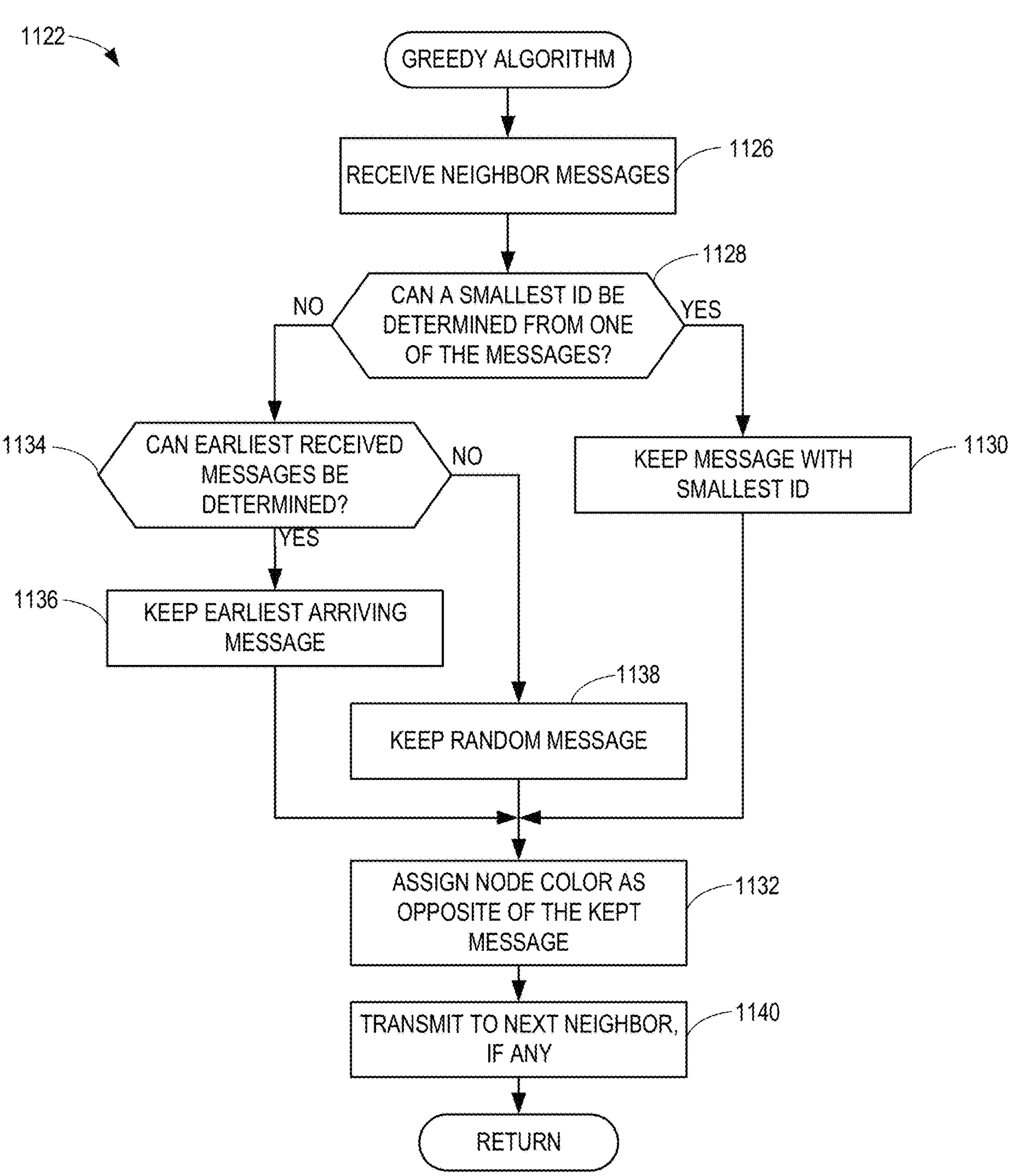

The illustrated example of FIG. 11C includes additional detail corresponding to instantiation of the greedy algorithm (block 1122). In the illustrated example of FIG. 11C, the node messaging circuitry 716 receives neighbor messages (block 1126) and determines if a smaller ID value can be determined from one or more of those messages (block 1128). If so, the example greedy algorithm circuitry 718 keeps and/or otherwise selects the received message having the relatively smaller ID value (block 1130) and the node message circuitry 716 assigns a node color as the opposite of the kept message (block 1132). However, if the node message circuitry 716 cannot determine which one of the received messages has a relatively smaller ID value associated with its node (block 1128), then it next attempts to determine which one of the received messages was received earliest (block 1134). If so, the greedy algorithm circuitry 718 keeps the earliest arriving message (blok 1136) and then the node message circuitry 716 assigns the node color as the opposite of the kept message (block 1132). In the event the node message circuitry 716 cannot determine which message arrived earliest (block 1134), then the greedy algorithm circuitry 718 keeps a random message (block 1138) before the node message circuitry 716 assigns the node color as the opposite of the kept message (block 1132) and then transmits to next neighbor(s), if any (block 1140).

Figure 11D:
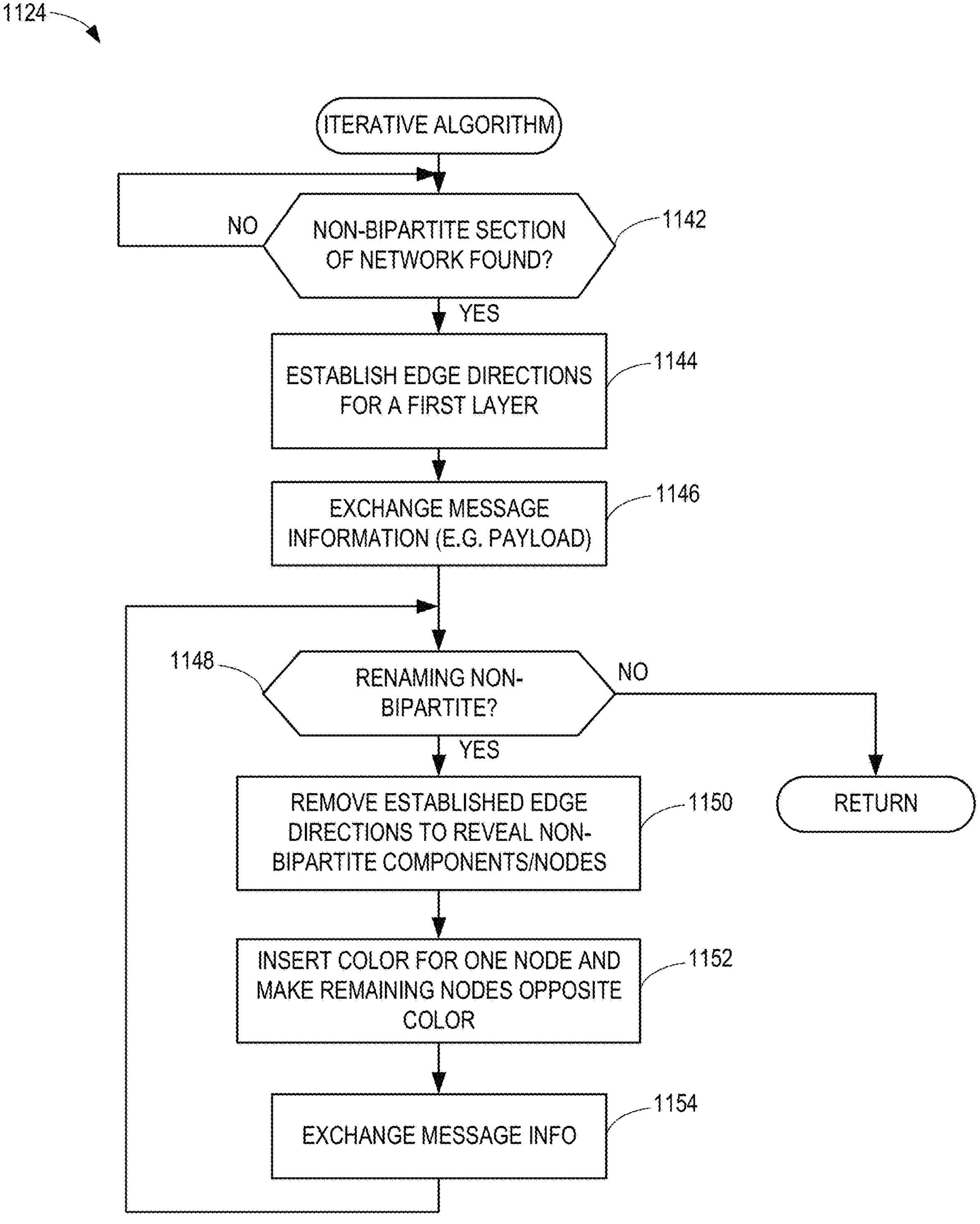

Briefly returning to the illustrated example of FIG. 11B, when the node message circuitry 716 determines a thshold quantity of network sections that are non-bipartite (thereby suggesting that an iterative algorithm approach will yield better/more efficient assignments) (block 1120), then it instantiates the iterative algorithm (block 1124). FIG. 11D illustrates additional detail corresponding to the iterative algorithm (block 1124) of FIG. 11B. In the illustrated example of FIG. 11D, the iterative algorithm circuitry 720 disaggregates a portion of the network that is non-bipartite (block 1142) and establishes edge directions (see arrowheads) for a first layer from a first color to a second color after assigning one node as the first color (block 1144). The node message circuitry 716 exchanges message information between edges/links that do not have any conflict (block 1146), and determines whether there are remaining non-bipartite sections of the first layer (block 1148). If not, control returns to FIG. 11B, otherwise the example iterative algorithm circuitry 720 removes the prior established edge directions (arrowheads) to reveal remaining non-bipartite components/nodes (block 1150). The example node message circuitry 716 inserts a color for one node and assigns all remaining nodes an opposite color (block 1152). The example node message circuitry 716 exchanges message information in view of any non-conflicting nodes (block 1154) and again determines whether there are remaining non-bipartite sections of the node portion being evaluated (block 1148).

Figure 11E:
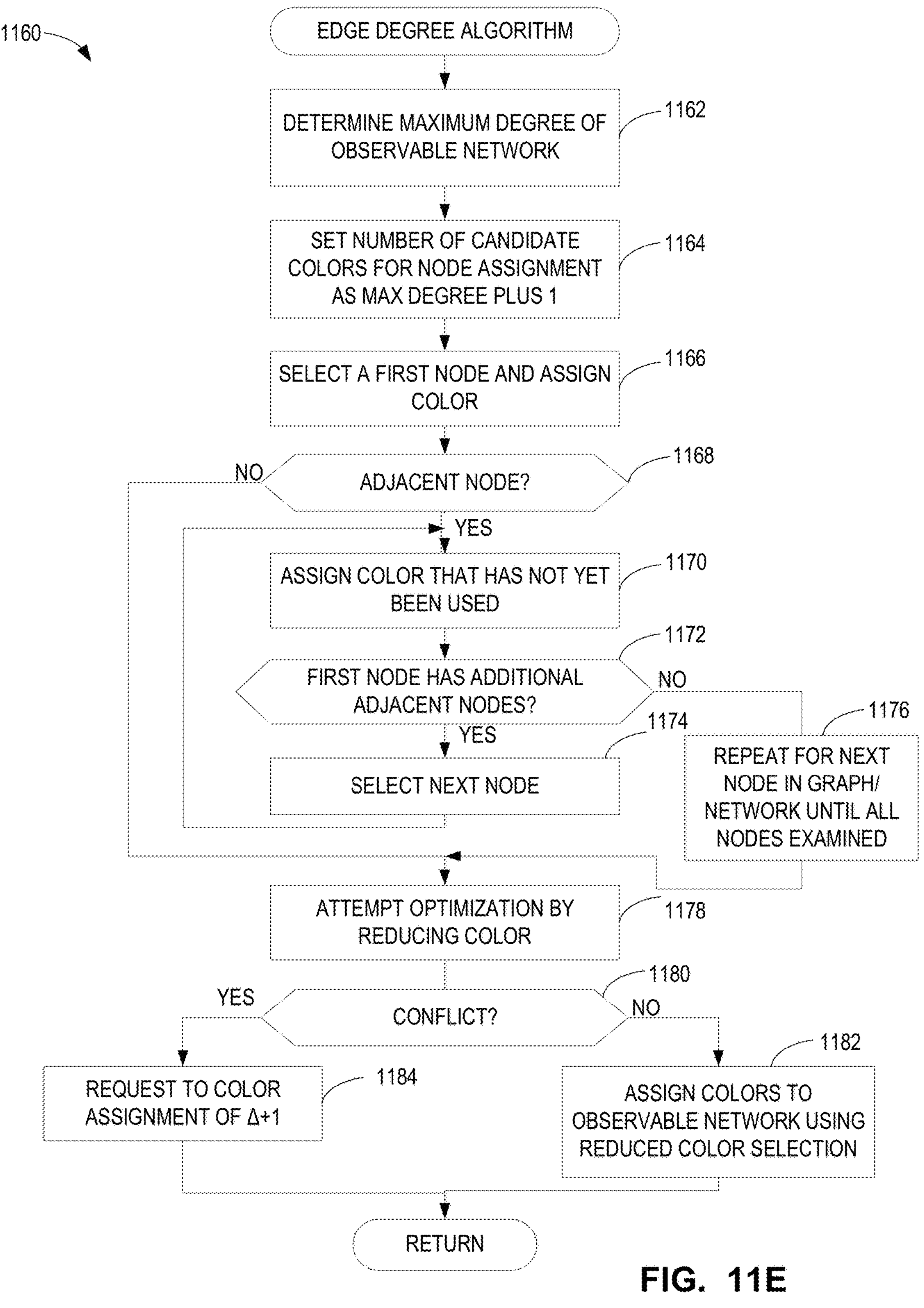

Briefly returning to the illustrated example of FIG. 11A, if the network node boundary is unknown (block 1102), the example SHEN exchange protocol circuitry 208 instantiates an edge degree algorithm to assign each network node a particular color (block 1160). FIG. 11E illustrates additional detail corresponding to the edge degree algorithm (block 1160) of FIG. 11A. In the illustrated example of FIG. 11E, the example edge degree algorithm circuitry 722 determines a maximum degree value (Δ) of the observable network (block 1162) and sets a number of candidate colors to assign to the network 770 as the maximum degree value (Δ) plus 1→(Δ+1) (block 1164). To begin the assignment process, the example node message circuitry 716 selects a first node and assigns one of the (Δ+1) colors (block 1166), determines whether the selected node has an adjacent node(s) (block 1168) and assigns it a different color (block 1170). The example node message circuitry 716 determines whether the first node has any additional nodes (block 1172) and if so, a next node is selected (block 1174) and again assigns a color that has not already been used (block 1170). This repeats as needed for each grouping of non-bipartite layers and for each node throughout the known network (block 1176).

In some examples, the edge degree algorithm circuitry 722 attempts to optimize by conservatively using a subset of colors despite having a particular color budget based on the maximum degree value (Δ) (block 1178). If no conflict is identified (block 1180), the edge degree algorithm circuitry 722 assigns colors to the observable network using the reduced color selection (block 1182) and further optimization is realized. On the other hand, if particular network topologies do not exhibit a possibility of using less than the color budget based on the maximum degree value (Δ), then all available colors are utilized (block 1184).

FIG. 12 is a block diagram of an example processor platform 1200 structured to execute and/or instantiate the machine readable instructions and/or the operations of FIGS. 8A-8E, 9, 10A-10C and 11A-11E to implement the SHEN circuitry 112 of FIGS. 1, 2, 3, 4A, 4B, 5A, 5B, 6 and 7B. The processor platform 1200 can be, for example, a server, a personal computer, a workstation, a self-learning machine (e.g., a neural network), a mobile device (e.g., a cell phone, a smart phone, a tablet such as an iPad™), an Internet appliance, a gaming console, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example SHEN formation circuitry 202, the example SHEN discovery circuitry 204, the example SHEN situation analysis circuitry 206, the example SHEN exchange protocol circuitry 208, the SHEN circuitry 112 and the example circuitry therein.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1232, which may be implemented by the machine readable instructions of FIGS. 8A-8E, 9, 10A-10C and 11A-11E, may be stored in the mass storage device 1228, in the volatile memory 1214, in the non-volatile memory 1216, and/or on a removable non-transitory computer readable storage medium such as a CD or DVD.

Figure 13:
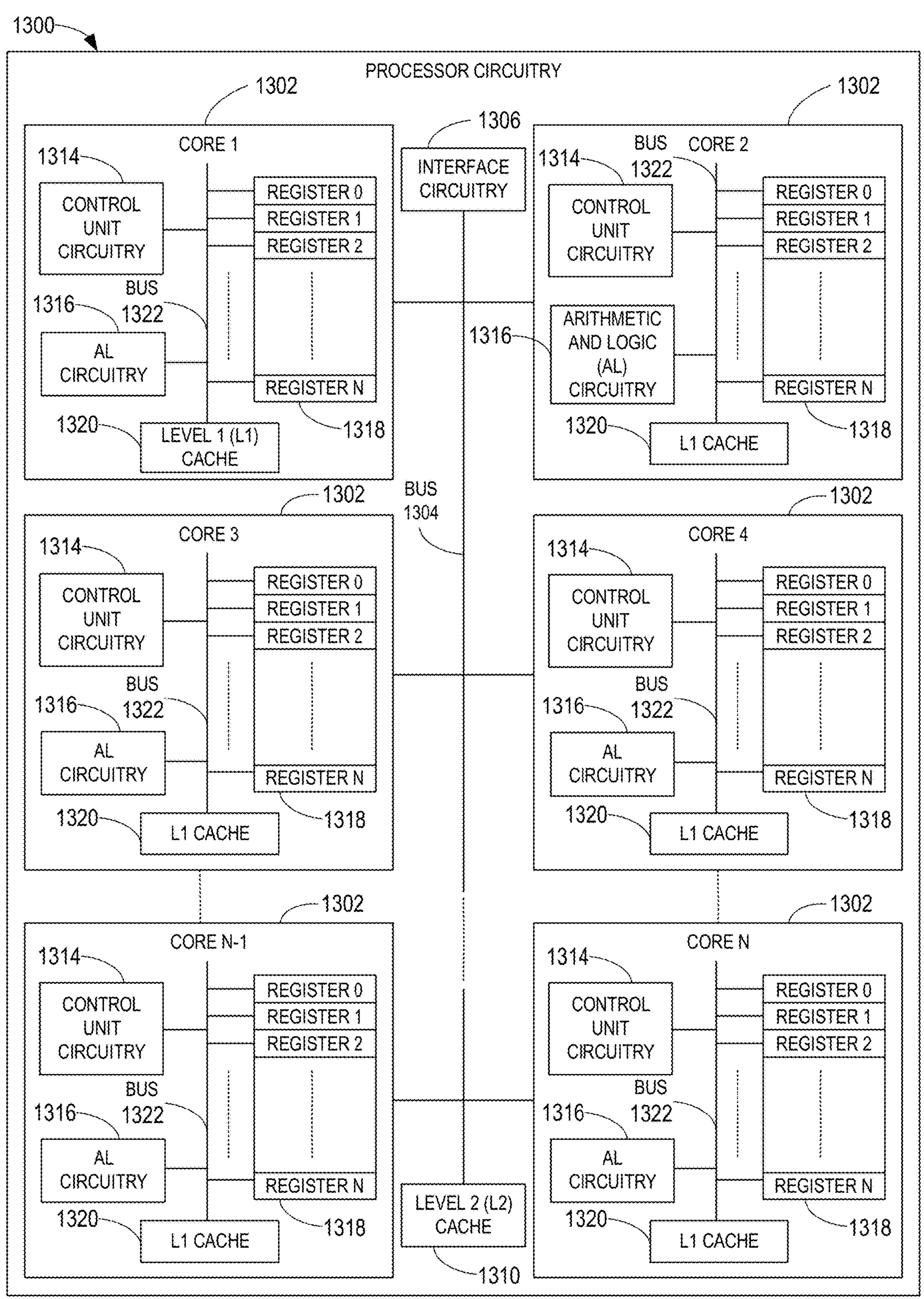
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may be a general purpose microprocessor (e.g., general purpose microprocessor circuitry). The microprocessor 1300 executes some or all of the machine readable instructions of the flowcharts of FIGS. 8A-8E, 9, 10A-10C and 11A-11E to effectively instantiate the circuitry of FIGS. 1 and 2 as logic circuits to perform the operations corresponding to those machine readable instructions. In some such examples, the circuitry of FIGS. 1 and 2 is instantiated by the hardware circuits of the microprocessor 1300 in combination with the instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 8A-8E, 9, 10A-10C and 11A-11E.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Additionally or alternatively, the first bus 1304 may be implemented by any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may be implemented by at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
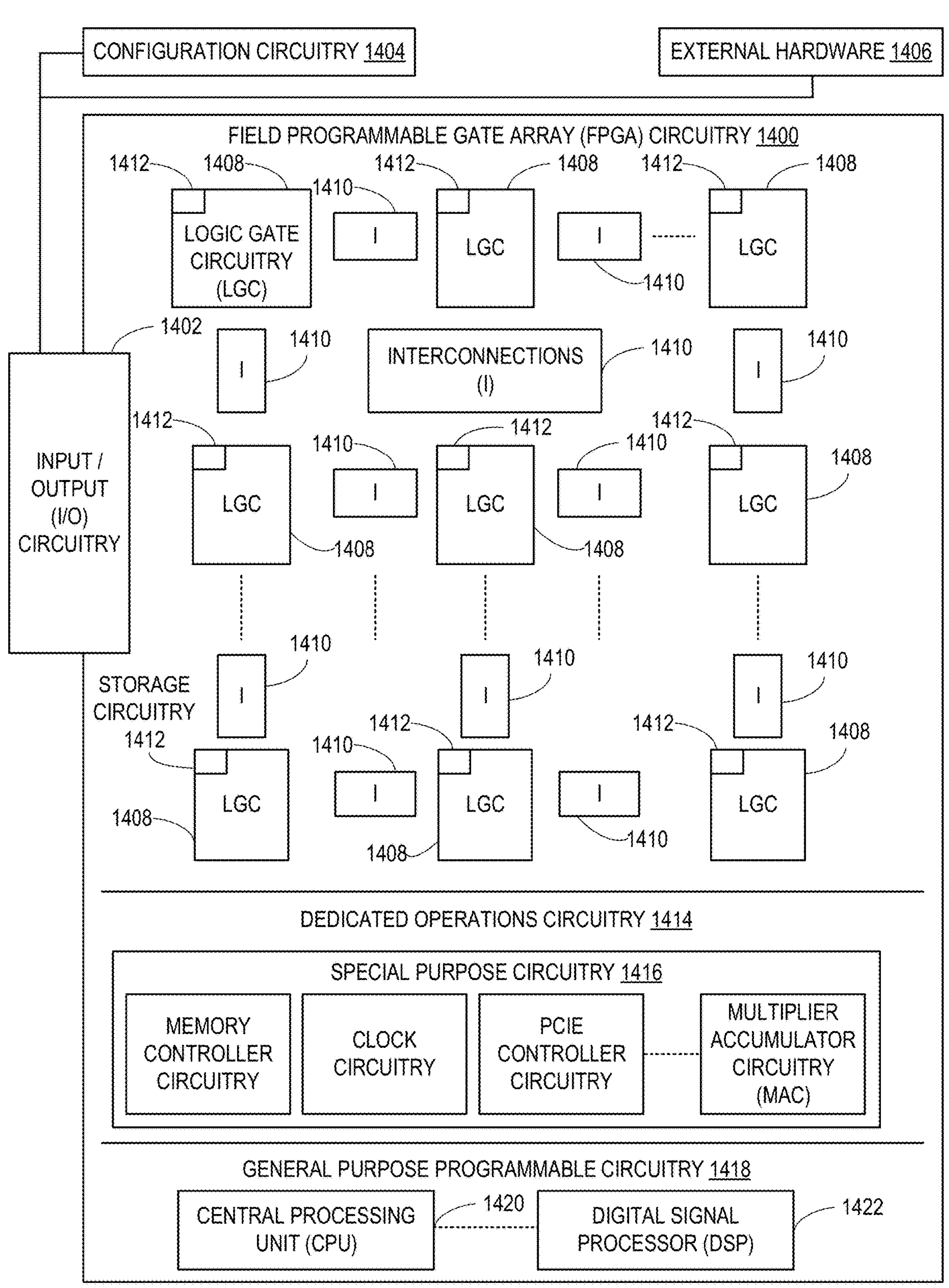
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowchart of FIGS. 8A-8E, 9, 10A-10C and 11A-11E but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 8A-8E, 9, 10A-10C and 11A-11E. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 8A-8E, 9, 10A-10C and 11A-11E. As such, the FPGA circuitry 1400 may be structured to effectively instantiate some or all of the machine readable instructions of the flowcharts of FIGS. 8A-8E, 9, 10A-10C and 11A-11E as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 8A-8E, 9, 10A-10C and 11A-11E faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may be implemented by interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may be implemented by external hardware circuitry. For example, the external hardware 1406 may be implemented by the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations that may correspond to at least some of the machine readable instructions of FIGS. 8A-8E, 9, 10A-10C and 11A-11E and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 8A-8E, 9, 10A-10C and 11A-11E may be executed by one or more of the cores 1302 of FIG. 13, a second portion of the machine readable instructions represented by the flowcharts of FIGS. 8A-8E, 9, 10A-10C and 11A-11E may be executed by the FPGA circuitry 1400 of FIG. 14, and/or a third portion of the machine readable instructions represented by the flowcharts of FIGS. 8A-8E, 9, 10A-10C and 11A-11E may be executed by an ASIC. It should be understood that some or all of the circuitry of FIGS. 1 and 2 may, thus, be instantiated at the same or different times. Some or all of the circuitry may be instantiated, for example, in one or more threads executing concurrently and/or in series. Moreover, in some examples, some or all of the circuitry of FIGS. 1 and 2 may be implemented within one or more virtual machines and/or containers executing on the microprocessor.

In some examples, the processor circuitry 1212 of FIG. 12 may be in one or more packages. For example, the microprocessor 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
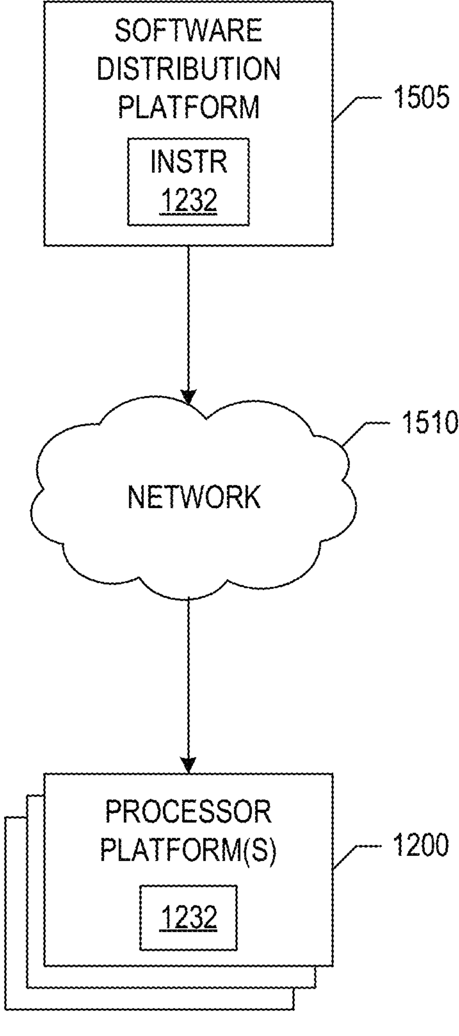
FIG. 15 is a block diagram of an example software distribution platform (e.g., one or more servers) to distribute software (e.g., software corresponding to the example machine readable instructions of FIGS. 8A-8E, 9, 10A-10C and 11A-11E) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions of FIGS. 8A-8E, 9, 10A-10C and 11A-11E, as described above. The one or more servers of the example software distribution platform 1505 are in communication with an example network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions of FIGS. 8A-8E, 9, 10A-10C and 11A-11E, may be downloaded to the example processor platform 1200, which is to execute the machine readable instructions 1232 to implement the circuitry of FIGS. 1 and/or 2. In some examples, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that manage a self-adaptive heterogeneous emergency network. Disclosed examples consider the varying network structure of networks during times of network failures. In particular, disclosed examples address the lack of common structure and corresponding procedures that are instantiated when a failure event occurs. Unlike standard network structure that enacts its own flavor of recovery, examples disclosed herein coordinate such recovery efforts to maintain security and reduce network broadcast storms when multiple devices attempt to re-establish communication with former peers.

Example methods, apparatus, systems, and articles of manufacture to manage a self-adaptive heterogeneous emergency network (SHEN) are disclosed herein. Further examples and combinations thereof include the following:

Example 1 includes an apparatus to establish recovery nodes, comprising at least one memory, machine readable instructions, and processor circuitry to at least one of instantiate or execute the machine readable instructions to determine a node initiated a reset procedure, suppress a native recovery procedure of the node, and initiate a heterogeneous recovery procedure to measure the node root of trust, broadcast heterogeneous recovery packets, and activate listener ports for responses to the heterogeneous recovery packets.

Example 2 includes the apparatus as defined in example 1, wherein the processor circuitry is to determine if a peer node supports the heterogeneous recovery procedure.

Example 3 includes the apparatus as defined in example 2, wherein the processor circuitry is to stop communication attempts with the peer node when the heterogeneous recovery procedure is not supported, and attest the peer node when the heterogeneous recovery procedure is supported.

Example 4 includes the apparatus as defined in example 3, wherein the processor circuitry is to add the peer node to a recovery node routing table if the attestation is successful.

Example 5 includes the apparatus as defined in example 2, wherein the processor circuitry is to add the peer node to a non-recovery node routing table when the heterogeneous recovery procedure is not supported.

Example 6 includes the apparatus as defined in example 1, wherein the processor circuitry is to determine a type of recovery role supported by a peer response from the broadcast heterogeneous recovery packet.

Example 7 includes the apparatus as defined in example 6, wherein the recovery role includes at least one of node orchestration, node discovery, node routing, node telemetry, or node security.

Example 8 includes the apparatus as defined in example 1, wherein the processor circuitry is to determine a type of the reset procedure.

Example 9 includes the apparatus as defined in example 8, wherein the type of the reset procedure includes an indication of multi-node failure.

Example 10 includes the apparatus as defined in example 1, wherein the processor circuitry is to include recovery override instructions in the heterogeneous recovery packets.

Example 11 includes the apparatus as defined in example 10, wherein the recovery override instructions are to cause a peer node to instantiate a particular type of the reset procedure.

Example 12 includes At least one non-transitory computer readable medium comprising instructions that, when executed, cause processor circuitry to at least determine a node initiated a failure response, suppress a native recovery procedure of the node, and initiate a heterogeneous recovery procedure to verify a trust status of the node, transmit heterogeneous recovery packets, and activate listener ports for responses to the heterogeneous recovery packets.

Example 13 includes the at least one non-transitory computer readable medium as defined in example 12, wherein the instructions, when executed, cause the processor circuitry to determine if a peer node supports the heterogeneous recovery procedure.

Example 14 includes the at least one non-transitory computer readable medium as defined in example 13, wherein the instructions, when executed, cause the processor circuitry to prohibit communication attempts with the peer node when the heterogeneous recovery procedure is not supported, and verify a trust status of the peer node when the heterogeneous recovery procedure is supported.

Example 15 includes the at least one non-transitory computer readable medium as defined in example 14, wherein the instructions, when executed, cause the processor circuitry to add the peer node to a recovery node routing table if the attestation is successful.

Example 16 includes the at least one non-transitory computer readable medium as defined in example 13, wherein the instructions, when executed, cause the processor circuitry to add the peer node to a non-recovery node routing table when the heterogeneous recovery procedure is not supported.

Example 17 includes the at least one non-transitory computer readable medium as defined in example 12, wherein the instructions, when executed, cause the processor circuitry to determine a type of recovery role supported by a peer response from the transmitted heterogeneous recovery packet.

Example 18 includes the at least one non-transitory computer readable medium as defined in example 17, wherein the instructions, when executed, cause the processor circuitry to identify the recovery role as at least one of a node orchestration role, a node discovery role, a node routing role, a telemetry role, or a node security role.

Example 19 includes the at least one non-transitory computer readable medium as defined in example 12, wherein the instructions, when executed, cause the processor circuitry to determine a type of the failure response.

Example 20 includes the at least one non-transitory computer readable medium as defined in example 19, wherein the instructions, when executed, cause the processor circuitry to determine the type of the failure response includes a multi-node failure.

Example 21 includes the at least one non-transitory computer readable medium as defined in example 12, wherein the instructions, when executed, cause the processor circuitry to embed recovery override instructions in the heterogeneous recovery packets.

Example 22 includes the at least one non-transitory computer readable medium as defined in example 21, wherein the recovery override instructions are to cause a peer node to instantiate a particular type of the failure response.

Example 23 includes an apparatus to establish recovery nodes, comprising failure detection circuitry to determine a node initiated a reset procedure, override circuitry to suppress a native recovery procedure of the node, formation circuitry to initiate a heterogeneous recovery procedure, and trust circuitry to measure a root of trust of the node, the formation circuitry further to broadcast heterogeneous recovery packets, and activate listener ports for responses to the heterogeneous recovery packets.

Example 24 includes the apparatus as defined in example 23, further including role assignment circuitry to determine if a peer node supports the heterogeneous recovery procedure.

Example 25 includes the apparatus as defined in example 24, wherein the override circuitry is to stop communication attempts with the peer node when the heterogeneous recovery procedure is not supported, and the trust circuitry is to attest the peer node when the heterogeneous recovery procedure is supported.

Example 26 includes the apparatus as defined in example 25, further including route table circuitry to add the peer node to a recovery node routing table when the attestation is successful.

Example 27 includes the apparatus as defined in example 22, further including route table circuitry to add the peer node to a non-recovery node routing table when the heterogeneous recovery procedure is not supported.

Example 28 includes the apparatus as defined in example 23, further including role assignment circuitry to determine a type of recovery role supported by a peer response from the broadcast heterogeneous recovery packet.

Example 29 includes the apparatus as defined in example 28, wherein the role assignment circuitry is to assign at least one of a node orchestration role, a node discovery role, a node routing role, a node telemetry role, or a node security role.

Example 30 includes the apparatus as defined in example 23, wherein the failure detection circuitry is to determine a type of the reset procedure.

Example 31 includes the apparatus as defined in example 30, wherein the type of the reset procedure includes an indication of multi-node failure.

Example 32 includes the apparatus as defined in example 23, wherein the override circuitry is to include recovery override instructions in the heterogeneous recovery packets, the recovery override instructions to cause a peer node to instantiate a particular type of the reset procedure.

Example 33 includes an apparatus to manage network recovery, comprising means for failure detections to determine a node initiated a reset procedure, means for override to suppress a native recovery procedure of the node, means for network formation to initiate a heterogeneous recovery procedure, and means for trust to measure a root of trust of the node, the means for network formation to broadcast heterogeneous recovery packets, and activate listener ports for responses to the heterogeneous recovery packets.

Example 34 includes the apparatus as defined in example 33, further including means for role assignment to determine if a peer node supports the heterogeneous recovery procedure.

Example 35 includes the apparatus as defined in example 34, wherein the means for override is to stop communication attempts with the peer node when the heterogeneous recovery procedure is not supported, and the means for trust is to attest the peer node when the heterogeneous recovery procedure is supported.

Example 36 includes the apparatus as defined in example 35, further including means for route table formation to add the peer node to a recovery node routing table when the attestation is successful.

Example 37 includes the apparatus as defined in example 32, further including route table formation circuitry to add the peer node to a non-recovery node routing table when the heterogeneous recovery procedure is not supported.

Example 38 includes the apparatus as defined in example 37, further including means for role assignment to determine a type of recovery role supported by a peer response from the broadcast heterogeneous recovery packet.

Example 39 includes the apparatus as defined in example 38, wherein the means for role assignment is to assign at least one of a node orchestration role, a node discovery role, a node routing role, a node telemetry role, or a node security role.

Example 40 includes the apparatus as defined in example 33, wherein the means for failure is to determine a type of the reset procedure.

Example 41 includes the apparatus as defined in example 40, wherein the type of the reset procedure includes an indication of multi-node failure.

Example 42 includes the apparatus as defined in example 33, wherein the means for override is to include recovery override instructions in the heterogeneous recovery packets, the recovery override instructions to cause a peer node to instantiate a particular type of the reset procedure.

Example 43 includes a method to establish recovery nodes, comprising determining, by executing an instruction with processor circuitry, a node initiated a failure response procedure, suppressing, by executing an instruction with the processor circuitry, a native recovery procedure of the node, verifying, by executing an instruction with the processor circuitry, a trust status of the node, transmitting, by executing an instruction with the processor circuitry, heterogeneous recovery packets, and activating, by executing an instruction with the processor circuitry, listener ports for responses to the heterogeneous recovery packets.

Example 44 includes the method as defined in example 43, further including determining if a peer node supports the heterogeneous recovery procedure.

Example 45 includes the method as defined in example 44, further including prohibiting communication attempts with the peer node when the heterogeneous recovery procedure is not supported, and verifying a trust status of the peer node when the heterogeneous recovery procedure is supported.

Example 46 includes the method as defined in example 45, further including adding the peer node to a recovery node routing table if the attestation is successful.

Example 47 includes the method as defined in example 44, further including adding the peer node to a non-recovery node routing table when the heterogeneous recovery procedure is not supported.

Example 48 includes the method as defined in example 43, further including determining a type of recovery role supported by a peer response from the transmitted heterogeneous recovery packet.

Example 49 includes the method as defined in example 48, further including identifying the recovery role as at least one of a node orchestration role, a node discovery role, a node routing role, a telemetry role, or a node security role.

Example 50 includes the method as defined in example 43, further including determining a type of the failure response.

Example 51 includes the method as defined in example 50, further including determining the type of the failure response includes a multi-node failure.

Example 52 includes the method as defined in example 43, further including embedding recovery override instructions in the heterogeneous recovery packets, the instructions to cause a peer node to instantiate a particular type of the failure response.

Example 53 includes an apparatus to facilitate node discovery, comprising at least one memory, machine readable instructions, and processor circuitry to at least one of instantiate or execute the machine readable instructions to determine if a discovery packet is requested, determine an alert level, determine current channel conditions, predict a hop count based on the alert level and the current channel conditions, and build a discovery packet corresponding to the predicted hop count.

Example 54 includes the apparatus as defined in example 53, wherein the processor circuitry is to suppress a default hop count value associated with a transmitting node.

Example 55 includes the apparatus as defined in example 54, wherein the processor circuitry is to replace the suppressed default hop count value with the predicted hop count.

Example 56 includes the apparatus as defined in example 55, wherein the processor circuitry is to transmit the discovery packet to a peer node, the discovery packet including the predicted hop count.

Example 57 includes the apparatus as defined in example 53, wherein the processor circuitry is to determine the alert level based on a safety integrity level corresponding to peer nodes associated with a path of the predicted hop count.

Example 58 includes the apparatus as defined in example 53, wherein the processor circuitry is to determine the alert level based on a network alert level associated with a recovering network.

Example 59 includes At least one non-transitory computer readable medium comprising instructions that, when executed, cause processor circuitry to at least determine if a discovery packet is requested, determine an alert level, determine current channel conditions, predict a hop count based on the alert level and the current channel conditions, and build a discovery packet corresponding to the predicted hop count.

Example 60 includes the at least one non-transitory computer readable medium as defined in example 59, wherein the instructions, when executed, cause the processor circuitry to suppress a default hop count value associated with a transmitting node.

Example 61 includes the at least one non-transitory computer readable medium as defined in example 60, wherein the instructions, when executed, cause the processor circuitry to replace the suppressed default hop count value with the predicted hop count.

Example 62 includes the at least one non-transitory computer readable medium as defined in example 61, wherein the instructions, when executed, cause the processor circuitry to transmit the discovery packet to a peer node, the discovery packet including the predicted hop count.

Example 63 includes the at least one non-transitory computer readable medium as defined in example 59, wherein the instructions, when executed, cause the processor circuitry to determine the alert level based on a safety integrity level corresponding to peer nodes associated with a path of the predicted hop count.

Example 64 includes the at least one non-transitory computer readable medium as defined in example 59, wherein the instructions, when executed, cause the processor circuitry to determine the alert level based on a network alert level associated with a recovering network.

Example 65 includes an apparatus to manage node discovery, comprising discovery channel circuitry to determine if a discovery packet is requested, network condition circuitry to determine an alert level, and determine current channel conditions, and hop count circuitry to predict a hop count based on the alert level and the current channel conditions, and build a discovery packet corresponding to the predicted hop count.

Example 66 includes the apparatus as defined in example 65, further including override circuitry to suppress a default hop count value associated with a transmitting node.

Example 67 includes the apparatus as defined in example 66, wherein the override circuitry is to replace the suppressed default hop count value with the predicted hop count.

Example 68 includes the apparatus as defined in example 67, further including discovery circuitry to transmit the discovery packet to a peer node, the discovery packet including the predicted hop count.

Example 69 includes the apparatus as defined in example 65, wherein the network condition circuitry is to determine the alert level based on a safety integrity level corresponding to peer nodes associated with a path of the predicted hop count.

Example 70 includes the apparatus as defined in example 65, wherein the network condition circuitry is to determine the alert level based on a network alert level associated with a recovering network.

Example 71 includes a system to discover available network nodes, comprising means for channel discovery to determine if a discovery packet is requested, means for network condition analysis to determine an alert level, and determine current channel conditions, and means for hop count prediction to predict a hop count based on the alert level and the current channel conditions, and build a discovery packet corresponding to the predicted hop count.

Example 72 includes the system as defined in example 71, further including means for override to suppress a default hop count value associated with a transmitting node.

Example 73 includes the system as defined in example 72, wherein the means for override is to replace the suppressed default hop count value with the predicted hop count.

Example 74 includes the system as defined in example 73, further including means for discovery to transmit the discovery packet to a peer node, the discovery packet including the predicted hop count.

Example 75 includes the system as defined in example 71, wherein the means for network condition analysis is to determine the alert level based on a safety integrity level corresponding to peer nodes associated with a path of the predicted hop count.

Example 76 includes the system as defined in example 71, wherein the means for network condition analysis is to determine the alert level based on a network alert level associated with a recovering network.

Example 77 includes a method to discover network nodes comprising determining, by executing an instruction with processor circuitry, if a discovery packet is requested, determining, by executing an instruction with the processor circuitry, an alert level, determining, by executing an instruction with the processor circuitry, current channel conditions, predicting, by executing an instruction with the processor circuitry, a hop count based on the alert level and the current channel conditions, and building, by executing an instruction with the processor circuitry, a discovery packet corresponding to the predicted hop count.

Example 78 includes the method as defined in example 77, further including suppressing a default hop count value associated with a transmitting node.

Example 79 includes the method as defined in example 78, further including replacing the suppressed default hop count value with the predicted hop count.

Example 80 includes the method as defined in example 79, further including transmitting the discovery packet to a peer node, the discovery packet including the predicted hop count.

Example 81 includes the method as defined in example 77, further including determining the alert level based on a safety integrity level corresponding to peer nodes associated with a path of the predicted hop count.

Example 82 includes the method as defined in example 77, further including determining the alert level based on a network alert level associated with a recovering network.

Example 83 includes an apparatus to facilitate node redundancy, comprising at least one memory, machine readable instructions, and processor circuitry to at least one of instantiate or execute the machine readable instructions to retain a network message corresponding to a non-failure condition of a computing device, override a default messaging technique when a failure condition is detected, determine a messaging task type based on the retained network message, determine available radio access technology (RAT) types corresponding to the computing device, determine current operating metrics corresponding to the available RAT types, generate a message redundancy profile based on the messaging task type, the available RAT types and the current operating metrics, and initiate an updated messaging technique to replace the default messaging technique based on the message redundancy profile.

Example 84 includes the apparatus as defined in example 83, wherein the processor circuitry is to determine the messaging task type by parsing the retained network message for header information indicative of an application type.

Example 85 includes the apparatus as defined in example 83, wherein the processor circuitry is to determine the messaging task type by parsing the retained network message for payload information associated with a data type.

Example 86 includes the apparatus as defined in example 83, wherein the processor circuitry is to transmit the redundancy profile to a neighboring peer, the redundancy profile to identify two or more RAT types for the updated messaging technique.

Example 87 includes the apparatus as defined in example 86, wherein the processor circuitry is to determine whether one of the two or more RAT types is non-responsive.

Example 88 includes the apparatus as defined in example 87, wherein the processor circuitry is to remove the one of the two or more RAT types that is non-responsive.

Example 89 includes the apparatus as defined in example 87, wherein the processor circuitry is to replace the one of the two or more RAT types that is non-responsive with an alternate RAT type to be used with the updated messaging technique.

Example 90 includes At least one non-transitory computer readable medium comprising instructions that, when executed, cause processor circuitry to at least store a network message corresponding to a non-failure condition of a computing device, suppress a default messaging technique when a failure condition is detected, determine an application type based on the stored network message, determine available radio access technology (RAT) types corresponding to the computing device, determine operating metrics corresponding to the available RAT types, build a redundancy profile based on the application type, the available RAT types and the operating metrics, and initiate an updated messaging technique to replace the default messaging technique based on the redundancy profile.

Example 91 includes the at least one non-transitory computer readable medium as defined in example 90, wherein the instructions, when executed, cause the processor circuitry to determine the application type by parsing the stored network message for header information indicative of the application type.

Example 92 includes the at least one non-transitory computer readable medium as defined in example 90, wherein the instructions, when executed, cause the processor circuitry to determine the application type by parsing the stored network message for payload information associated with a data type.

Example 93 includes the at least one non-transitory computer readable medium as defined in example 90, wherein the instructions, when executed, cause the processor circuitry to transmit the redundancy profile to a neighboring peer, the redundancy profile to identify two or more RAT types for the updated messaging technique.

Example 94 includes the at least one non-transitory computer readable medium as defined in example 93, wherein the instructions, when executed, cause the processor circuitry to determine whether one of the two or more RAT types is non-responsive.

Example 95 includes the at least one non-transitory computer readable medium as defined in example 94, wherein the instructions, when executed, cause the processor circuitry to remove the one of the two or more RAT types that is non-responsive.

Example 96 includes an apparatus to manage network redundancy comprising message history circuitry to retain a network message corresponding to a non-failure condition of a computing device, override circuitry to override a default messaging technique when a failure condition is detected, the message history circuitry to determine a messaging task type based on the retained network message, radio access technology (RAT) circuitry to determine available RAT types corresponding to the computing device, and determine operating metrics corresponding to the available RAT types, and repetition recommendation circuitry to generate a message redundancy profile based on the messaging task type, the available RAT types and the operating metrics, and initiate an updated messaging technique to replace the default messaging technique based on the message redundancy profile.

Example 97 includes the apparatus as defined in example 96, wherein the message history circuitry is to determine the messaging task type by parsing the retained network message for header information indicative of an application type.

Example 98 includes the apparatus as defined in example 96, wherein the message history circuitry is to determine the messaging task type by parsing the retained network message for payload information associated with a data type.

Example 99 includes the apparatus as defined in example 96, wherein the repetition recommendation circuitry is to transmit the redundancy profile to a neighboring peer, the redundancy profile to identify two or more RAT types for the updated messaging technique.

Example 100 includes the apparatus as defined in example 99, wherein the RAT circuitry is to determine whether one of the two or more RAT types is non-responsive.

Example 101 includes the apparatus as defined in example 100, wherein the RAT circuitry is to remove the one of the two or more RAT types that is non-responsive.

Example 102 includes the apparatus as defined in example 100, wherein the RAT circuitry is to replace the one of the two or more RAT types that is non-responsive with an alternate RAT type to be used with the updated messaging technique.

Example 103 includes a system to manage message redundancy comprising means for message history to retain a network message corresponding to a non-failure condition of a computing device, and determine a messaging task type based on the retained network message, means for override to override a default messaging technique when a failure condition is detected, means for radio access technology (RAT) management to determine available RAT types corresponding to the computing device, and determine operating metrics corresponding to the available RAT types, and means for repetition recommendation to generate a message redundancy profile based on the messaging task type, the available RAT types and the operating metrics, and initiate an updated messaging technique to replace the default messaging technique based on the message redundancy profile.

Example 104 includes the system as defined in example 103, wherein the means for message history is to determine the messaging task type by parsing the retained network message for header information indicative of an application type.

Example 105 includes the system as defined in example 103, wherein the means for message history is to determine the messaging task type by parsing the retained network message for payload information associated with a data type.

Example 106 includes the system as defined in example 103, wherein the means for repetition recommendation is to transmit the redundancy profile to a neighboring peer, the redundancy profile to identify two or more RAT types for the updated messaging technique.

Example 107 includes the system as defined in example 106, wherein the means for RAT management is to determine whether one of the two or more RAT types is non-responsive.

Example 108 includes the system as defined in example 107, wherein the means for RAT management is to remove the one of the two or more RAT types that is non-responsive.

Example 109 includes the system as defined in example 107, wherein the means for RAT management is to replace the one of the two or more RAT types that is non-responsive with an alternate RAT type to be used with the updated messaging technique.

Example 110 includes a method to manage network redundancy comprising retaining, by executing an instruction with processor circuitry, a network message corresponding to a non-failure condition of a computing device, overriding, by executing an instruction with the processor circuitry, a default messaging technique when a failure condition is detected, determining, by executing an instruction with the processor circuitry, a messaging task type based on the retained network message, determining, by executing an instruction with the processor circuitry, available radio access technology (RAT) types corresponding to the computing device, determining, by executing an instruction with the processor circuitry, operating metrics corresponding to the available RAT types, generating, by executing an instruction with the processor circuitry, a message redundancy profile based on the messaging task type, the available RAT types and the operating metrics, and initiating, by executing an instruction with the processor circuitry, an updated messaging technique to replace the default messaging technique based on the message redundancy profile.

Example 111 includes the method as defined in example 110, further including determining the messaging task type by parsing the retained network message for header information indicative of an application type.

Example 112 includes the method as defined in example 110, further including determining the messaging task type by parsing the retained network message for payload information associated with a data type.

Example 113 includes the method as defined in example 110, further including transmitting the redundancy profile to a neighboring peer, the redundancy profile to identify two or more RAT types for the updated messaging technique.

Example 114 includes the method as defined in example 113, further including determining whether one of the two or more RAT types is non-responsive.

Example 115 includes the method as defined in example 114, further including removing the one of the two or more RAT types that is non-responsive.

Example 116 includes the method as defined in example 114, further including replacing the one of the two or more RAT types that is non-responsive with an alternate RAT type to be used with the updated messaging technique.

Example 117 includes an apparatus to assign node time slots, comprising at least one memory, machine readable instructions, and processor circuitry to at least one of instantiate or execute the machine readable instructions to assign a known quantity of nodes random time slot values, the known quantity of nodes including a query node and a first neighbor node, determine if the first neighbor node has a time slot value different than the query node, and either (a) maintain the random node time slot values when the first neighbor node time slot value is different than the query node, or (b) further determine identifier (ID) values corresponding to the first neighbor node and the query node when the first neighbor time slot value is the same as the query node.

Example 118 includes the apparatus as defined in example 117, wherein the processor circuitry is to determine the known quantity of nodes based on a network node count maintaining a first value for a threshold time period.

Example 119 includes the apparatus as defined in example 117, wherein the processor circuitry is to assign one of the query node or the first neighbor node to the random time slot value based on a lower one of the ID values and modify the other one of the query node or the first neighbor node associated with a higher one of the ID values.

Example 120 includes the apparatus as defined in example 117, wherein the processor circuitry is to assign time slot values for the query node and the first neighbor node based on arrival timestamps.

Example 121 includes the apparatus as defined in example 120, wherein the processor circuitry is to select a first time slot value for an earliest one of the arrival timestamps and a second time slot value for a latest one of the arrival timestamps.

Example 122 includes the apparatus as defined in example 117, wherein the processor circuitry is to assign the random time slot values as color values.

Example 123 includes the apparatus as defined in example 117, wherein first ones of the random time slot values permit node transmission during a first time period, and second ones of the random time slot values permit node transmission during a second time period.

Example 124 includes the apparatus as defined in example 117, wherein the processor circuitry is to cause a first assigner node to collaborate with a second assigner node within the known quantity of nodes to establish one of the first or second assigner nodes as a controller for assigning the known quantity of nodes the random time slot values.

Example 125 includes the apparatus as defined in example 124, wherein the processor circuitry is to instantiate a distributed control system to establish the first or second assigner nodes as the controller.

Example 126 includes At least one non-transitory computer readable medium comprising instructions that, when executed, cause processor circuitry to at least assign a known quantity of nodes random time slot values, the known quantity of nodes including a query node and a first neighbor node, determine if the first neighbor node has a time slot value different than the query node, and either maintain the random node time slot values when the first neighbor node time slot value is different than the query node, or determine identifier (ID) values corresponding to the first neighbor node and the query node when the first neighbor time slot value is the same as the query node.

Example 127 includes the at least one non-transitory computer readable medium as defined in example 126, wherein the instructions, when executed, cause the processor circuitry to determine the known quantity of nodes based on a network node count maintaining a first value for a threshold time period.

Example 128 includes the at least one non-transitory computer readable medium as defined in example 126, wherein the instructions, when executed, cause the processor circuitry to assign one of the query node or the first neighbor node to the random time slot value based on a lower one of the ID values and modify the other one of the query node or the first neighbor node associated with a higher one of the ID values.

Example 129 includes the at least one non-transitory computer readable medium as defined in example 126, wherein the instructions, when executed, cause the processor circuitry to assign time slot values for the query node and the first neighbor node based on arrival timestamps.

Example 130 includes the at least one non-transitory computer readable medium as defined in example 129, wherein the instructions, when executed, cause the processor circuitry to select a first time slot value for an earliest one of the arrival timestamps and a second time slot value for a latest one of the arrival timestamps.

Example 131 includes the at least one non-transitory computer readable medium as defined in example 126, wherein the instructions, when executed, cause the processor circuitry to assign the random time slot values as color values.

Example 132 includes the at least one non-transitory computer readable medium as defined in example 126, wherein the instructions, when executed, cause the processor circuitry to permit first ones of the random time slot values to transmit during a first time period, and to permit second ones of the random time slot values to transmit during a second time period.

Example 133 includes an apparatus to assign network communication time slots comprising node message circuitry to assign a known quantity of nodes random time slot values, the known quantity of nodes including a query node and a first neighbor node, and determine if the first neighbor node has a time slot value different than the query node, and exchange protocol circuitry to either maintain the random time slot values when the first neighbor node time slot value is different than the query node, or determine identifier (ID) values corresponding to the first neighbor node and the query node when the first neighbor time slot value is the same as the query node.

Example 134 includes the apparatus as defined in example 133, further including network boundary circuitry to determine the known quantity of nodes based on a network node count maintaining a first value for a threshold time period.

Example 135 includes the apparatus as defined in example 133, wherein the node message circuitry is to assign one of the query node or the first neighbor node to the random time slot value based on a lower one of the ID values and modify the other one of the query node or the first neighbor node associated with a higher one of the ID values.

Example 136 includes the apparatus as defined in example 133, wherein the node message circuitry is to assign time slot values for the query node and the first neighbor node based on arrival timestamps.

Example 137 includes the apparatus as defined in example 136, wherein the node message circuitry is to select a first time slot value for an earliest one of the arrival timestamps and a second time slot value for a latest one of the arrival timestamps.

Example 138 includes the apparatus as defined in example 133, wherein the node message circuitry is to assign the random time slot values as color values.

Example 139 includes the apparatus as defined in example 133, wherein the exchange protocol circuitry is to permit first ones of the random time slot values to transmit during a first time period, and to permit second ones of the random time slot values to transmit during a second time period.

Example 140 includes a system to assign network time slots comprising means for node messaging to assign a known quantity of nodes random time slot values, the known quantity of nodes including a query node and a first neighbor node, and determine if the first neighbor node has a time slot value different than the query node, and means for protocol exchange to either maintain the random time slot values when the first neighbor node time slot value is different than the query node, or determine identifier (ID) values corresponding to the first neighbor node and the query node when the first neighbor time slot value is the same as the query node.

Example 141 includes the system as defined in example 140, further including means for network boundary determination to determine the known quantity of nodes based on a network node count maintaining a first value for a threshold time period.

Example 142 includes the system as defined in example 140, wherein the means for node messaging is to assign one of the query node or the first neighbor node to the random time slot value based on a lower one of the ID values and modify the other one of the query node or the first neighbor node associated with a higher one of the ID values.

Example 143 includes the system as defined in example 140, wherein the means for node messaging is to assign time slot values for the query node and the first neighbor node based on arrival timestamps.

Example 144 includes the system as defined in example 143, wherein the means for node messaging is to select a first time slot value for an earliest one of the arrival timestamps and a second time slot value for a latest one of the arrival timestamps.

Example 145 includes the system as defined in example 140, wherein the means for node messaging is to assign the random time slot values as color values.

Example 146 includes the system as defined in example 140, wherein the means for exchange protocol management is to permit first ones of the random time slot values to transmit during a first time period, and to permit second ones of the random time slot values to transmit during a second time period.

Example 147 includes a method to manage network time slots comprising assigning, by executing an instruction with processor circuitry, a known quantity of nodes random time slot values, the known quantity of nodes including a query node and a first neighbor node, determining, by executing an instruction with the processor circuitry, if the first neighbor node has a time slot value different than the query node, and either maintaining the random node time slot values when the first neighbor time slot value is different than the query node, or determining identifier (ID) values corresponding to the first neighbor node and the query node when the first neighbor time slot value is the same as the query node.

Example 148 includes the method as defined in example 147, further including determining the known quantity of nodes based on a network node count maintaining a first value for a threshold time period.

Example 149 includes the method as defined in example 147, further including assigning one of the query node or the first neighbor node to the random time slot value based on a lower one of the ID values and modify the other one of the query node or the first neighbor node associated with a higher one of the ID values.

Example 150 includes the method as defined in example 147, further including assigning time slot values for the query node and the first neighbor node based on arrival timestamps.

Example 151 includes the method as defined in example 150, further including selecting a first time slot value for an earliest one of the arrival timestamps and a second time slot value for a latest one of the arrival timestamps.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to establish recovery nodes, the apparatus comprising:

at least one memory;

machine readable instructions; and at least one processor circuit to at least one of instantiate or execute the machine readable instructions to:

determine a node initiated a reset procedure;

suppress a native recovery procedure of the node; and initiate a heterogeneous recovery procedure to:

measure a root of trust of the node;

broadcast heterogeneous recovery packets; and activate listener ports for responses to the heterogeneous recovery packets.

2. The apparatus as defined in claim 1, wherein one or more of the at least one processor circuit is to determine if a peer node supports the heterogeneous recovery procedure.

3. The apparatus as defined in claim 2, wherein one or more of the at least one processor circuit circuitry is to:

stop communication attempts with the peer node when the heterogeneous recovery procedure is not supported; and attest the peer node when the heterogeneous recovery procedure is supported.

4. The apparatus as defined in claim 3, wherein one or more of the at least one processor circuit is to add the peer node to a recovery node routing table if the attestation is successful.

5. The apparatus as defined in claim 2, wherein one or more of the at least one processor circuit is to add the peer node to a non-recovery node routing table when the heterogeneous recovery procedure is not supported.

6. The apparatus as defined in claim 1, wherein one or more of the at least one processor circuit is to determine a type of recovery role supported by a peer response from the broadcast heterogeneous recovery packet.

7. The apparatus as defined in claim 6, wherein the recovery role includes at least one of node orchestration, node discovery, node routing, node telemetry, or node security.

8. At least one non-transitory computer readable medium comprising instructions that cause at least one processor circuit to at least:

determine a node initiated a failure response;

suppress a native recovery procedure of the node; and initiate a heterogeneous recovery procedure to:

verify a trust status of the node;

transmit heterogeneous recovery packets; and activate listener ports for responses to the heterogeneous recovery packets.

9. The at least one non-transitory computer readable medium as defined in claim 8, wherein the instructions cause one or more of the at least one processor circuit to determine a type of recovery role supported by a peer response from the transmitted heterogeneous recovery packet.

10. The at least one non-transitory computer readable medium as defined in claim 9, wherein the instructions cause one or more of the at least one processor circuit to identify the recovery role as at least one of a node orchestration role, a node discovery role, a node routing role, a telemetry role, or a node security role.

11. The at least one non-transitory computer readable medium as defined in claim 8, wherein the instructions cause at least one of the one or more processor circuit to determine a type of the failure response.

12. The at least one non-transitory computer readable medium as defined in claim 11, wherein the instructions cause at least one of the one or more processor circuit to determine the type of the failure response includes a multi-node failure.

13. The at least one non-transitory computer readable medium as defined in claim 11, wherein the instructions cause at least one of the one or more processor circuit to embed recovery override instructions in the heterogeneous recovery packets.

14. The at least one non-transitory computer readable medium as defined in claim 13, wherein the recovery override instructions are to cause a peer node to instantiate a particular type of the failure response.

15. An apparatus comprising:

failure detection circuitry to determine a node initiated a reset procedure;

override circuitry to suppress a native recovery procedure of the node;

formation circuitry to initiate a heterogeneous recovery procedure; and trust circuitry to measure a root of trust of the node, the formation circuitry further to:

broadcast heterogeneous recovery packets; and activate listener ports for responses to the heterogeneous recovery packets.

16. The apparatus as defined in claim 15, further including role assignment circuitry to determine if a peer node supports the heterogeneous recovery procedure.

17. The apparatus as defined in claim 16, wherein the override circuitry is to stop communication attempts with the peer node when the heterogeneous recovery procedure is not supported, and the trust circuitry is to attest the peer node when the heterogeneous recovery procedure is supported.

18. The apparatus as defined in claim 17, further including route table circuitry to add the peer node to a recovery node routing table when the attestation is successful.

19. A method to establish recovery nodes, comprising:

determining, by executing an instruction with at least one processor circuitry, a node initiated a failure response procedure;

suppressing, by executing an instruction with one or more of the at least one processor circuit, a native recovery procedure of the node;

verifying, by executing an instruction with one or more of the at least one processor circuit, a trust status of the node;

transmitting, by executing an instruction with one or more of the at least one processor circuit, heterogeneous recovery packets; and activating, by executing an instruction with one or more of the at least one processor circuit, listener ports for responses to the heterogeneous recovery packets.

20. The method as defined in claim 19, further including determining a type of the failure response.

21. The method as defined in claim 20, further including determining the type of the failure response includes a multi-node failure.

22. The method as defined in claim 19, further including embedding recovery override instructions in the heterogeneous recovery packets, the instructions to cause a peer node to instantiate a particular type of the failure response.

23. An apparatus to manage network recovery, comprising:

means for failure determining a node initiated a reset procedure;

means for suppressing a native recovery procedure of the node;

means for measuring a root of trust of the node; and means for initiating a heterogeneous recovery procedure by:

broadcasting heterogeneous recovery packets; and activating listener ports to obtain responses to the heterogeneous recovery packets.

24. The apparatus as defined in claim 23, including means for determining if a peer node supports the heterogeneous recovery procedure.

25. The apparatus as defined in claim 24, wherein the means for suppressing is to stop communication attempts with the peer node when the heterogeneous recovery procedure is not supported, and the means for measuring is to attest the peer node when the heterogeneous recovery procedure is supported.

* * * * *